(12) United States Patent
Kawasaki et al.

(10) Patent No.: US 7,830,463 B2
(45) Date of Patent: Nov. 9, 2010

(54) LIQUID CRYSTAL DISPLAY DEVICE HAVING PARTICULAR SOURCE WIRES AND MANUFACTURING METHOD THEREOF

(75) Inventors: Kiyohiro Kawasaki, Osaka (JP); Jia-Tsung Lee, Tao Yuan Shien (TW); Chien-Hung Chen, Tao Yuan Shien (TW)

(73) Assignee: Quanta Display, Inc., Tao Yuan Shien (TW)

( * ) Notice: Subject to any disclaimer, the term of this patent is extended or adjusted under 35 U.S.C. 154(b) by 624 days.

(21) Appl. No.: 11/501,008

(22) Filed: Aug. 9, 2006

(65) Prior Publication Data

US 2007/0242178 A1    Oct. 18, 2007

(30) Foreign Application Priority Data

Aug. 11, 2005  (JP)  ............... 2005-232700

(51) Int. Cl.
 G02F 1/136   (2006.01)
 G02F 1/1343  (2006.01)
 G02F 1/1337  (2006.01)
(52) U.S. Cl. .................. 349/43; 349/141; 349/130
(58) Field of Classification Search .............. 349/43, 349/130, 141
 See application file for complete search history.

(56) References Cited

U.S. PATENT DOCUMENTS 6,843,904 B1* 1/2005 Kawasaki ............... 205/791.5
7,292,288 B2* 11/2007 Kawasaki .................. 349/46
7,321,404 B2* 1/2008 Kawasaki .................. 349/43
7,391,483 B2* 6/2008 Kawasaki .................. 349/43
7,417,693 B2* 8/2008 Kawasaki .................. 349/43
2005/0157236 A1* 7/2005 Kawasaki ................. 349/139
2005/0168667 A1* 8/2005 Kawasaki et al. ........... 349/43
2005/0250308 A1* 11/2005 Yamaguchi et al. ........ 438/618
2006/0289871 A1* 12/2006 Yoon ....................... 257/72

* cited by examiner

Primary Examiner—Mike Qi
(74) Attorney, Agent, or Firm—Bacon & Thomas, PLLC

(57) ABSTRACT

Development of 3-mask process to reduce the manufacturing cost of LCD-display device successively following 4-mask process. Opening formation process and pixel electrode formation process which is sequentially done following the opening formation process are treated with one photo-mask without using halftone exposure technology by forming source-drain wires comprising a low-resistance metal layer and a heat-resistant metal layer, the latter is capable of being removed with etching gas for etching gate insulating layer (and passivation insulating layer), giving protection means at least for the channel and the data line of the insulating gate transistor, forming openings in the insulating layers including the gate insulating layer with photosensitive resins having counter-taper cross sections, removing the exposed low-resistance metal in the openings, forming pixel electrode with the photosensitive resins as a lift-off material to lift off the conductive thin film for pixel electrode.

19 Claims, 18 Drawing Sheets

LIQUID CRYSTAL DISPLAY DEVICE HAVING PARTICULAR SOURCE WIRES AND MANUFACTURING METHOD THEREOF

BACKGROUND OF THE INVENTION

1. Field of the Invention

The present invention relates to a liquid crystal display device with a color image display function, and in particular to an active type liquid crystal display device that has a switching-element in each pixel.

2. Description of Related Art

In recent years, the increase in scale of glass substrate, corresponding elements and manufacturing devices, TVs and other commercially-available display devices have been produced with diagonal dimensions ranging from 5 to 100 cm. In addition, color display has been obtained easily by forming an RGB colored layer on one of the two glass substrates that are part of a liquid crystal panel. The active-type liquid crystal panels that have switching elements in each pixel, especially, are able to provide less cross talk, and therefore quick response speed, and images with high contrast ratio are ensured.

These liquid crystal display devices (liquid crystal panels) usually have a matrix formation of approximately 200-1,200 scanning lines and 300-1,600 data lines, but larger screens and higher precision are being offered simultaneously nowadays in order to meet the requirements of display capacity.

FIG. 19 shows the packaging structures of the liquid crystal panel. For example, the packing methods to provide electric signals to the active area include the COG (Chip-On-Glass) method, which is achieved by coupling a semiconductor integrated circuit chip 3 that provides driving signals with the electrode terminals 5 of scanning lines formed on one of the transparent insulating substrates that compose the liquid crystal 1 (for example, a glass substrate 2) through a conductive adhesive, or the TCP (Tape-Carrier-Package) method, which is achieved by pressure-coupling and fixing the TCP film 4 that has terminals of gold or solder-plated copper foil on a thin polyimide resin film base with the electrode terminals 6 of data lines through an appropriate adhesive that includes a conductive medium. For convenience, both of the packaging structures are shown in FIG. 19, but the most appropriate packaging structure between the two is selected in actual cases.

The wiring paths 7 and 8, which connect the pixels within the active area located in the near center part of the liquid crystal panel 1 and the electrode terminals 5 and 6 of scanning lines and data lines do not need to be composed of the same conductive material as the electrode terminals 5 and 6. Numeral 9 refers to a color filter or an opposed glass substrate that is a transparent insulating substrate having transparent conductive opposed electrodes respectively on its opposing surfaces, wherein the transparent conductive opposing electrodes electrically cover all the liquid crystal cells.

FIG. 20 shows the equivalent circuit of an active liquid crystal display device having an insulating gate type transistor 10 functioning as a switching element disposed in each pixel, wherein 11 (7 in FIG. 20) refers to the scanning line, 12 (8 in FIG. 20) refers to the data line, and 13 refers to a liquid crystal cell. The liquid crystal cells 13 are treated as capacitors for electricity. Elements drawn in solid lines are formed on glass substrate 2, which is a substrate of the liquid crystal panel. The opposing electrode 14 electrically covers all the liquid crystal cells 13 and shown by dotted lines in the figures formed on the opposed main surface of another glass substrate 9. In the case that the off resistance of the insulating gate type transistor 10 is low, the resistance of the liquid crystal cells 13 is low, or the tone of the display images is emphasized, a circuit processing such as adding an auxiliary storage capacitance 15 in parallel with the liquid crystal cell 13 is available in order to increase the time constant of the liquid cell 13 as a load. In addition, 16 refers to a storage capacitance line or a common electrode functioning as the common bus bar of the storage capacitance 15.

FIG. 21 shows the cross section view of the essential part of the active area of a liquid crystal display device. The two glass substrates 2 and 9 composing the liquid crystal panel 1 are separated in a specified distance of several μm by spacer materials (not shown) such as pillar-shaped spacers formed on the color filter 9, resin-based fibers, or resin-based beads. The gap between the glass substrates 2 and 9 is sealed to form a closed space by disposing a sealing material and an encapsulating material of an organic resin (not shown) at the periphery of the glass substrate 9. The closed space is filled with liquid crystal 17.

To obtain color display, a colored layer, which is a thin organic film of 1 to 2 μm in thickness containing a dye and/or pigment, is disposed on the lateral side of the closed space side of the glass substrate 9 to give the color display function. In such a case, the glass substrate 9 is called color filter (CF). Depending on the characteristics of the liquid crystal material 17, a polarizer 19 is attached to the upper surface of the glass substrate 9 and/or lower surface of the glass substrate 2 Therefore, the liquid crystal panel 1 can function as an electro-optical device. So far, most of the commercially available liquid crystal display panels use TN (Twisted Nematic)-type liquid crystal material, and normally require two polarizers 19. Transmissive liquid crystal panels, though not shown here, use back lighting as a light source that radiates white light up from a lower position.

Alignment films, for example, the polyimide based thin resin film 20 of approximately 0.1 μm in thickness formed on the glass substrate 2 and 9 in contact with the liquid crystal are used to orientate the liquid crystal molecules into specific directions. Numeral 21 refers to a drain electrode (wire) that connects a drain of the insulating gate type transistor 10 and a transparent conductive pixel electrode 22, and is normally formed at the same time as the data (source) lines 12 is formed. A semiconductor layer 23 positioned between the data lines 12 and the drain electrode 21 is explained later in detail. The Cr thin film layer 24 of about 0.1 μm in thickness is formed at the periphery of the adjacent colored layer 18 on the color filter 9, and is a light shielding component that prevents outside light from coming into the semiconductor layer 23, the scanning lines 11, and the data lines 12. This established technology is commonly known as black matrix (BM). Usually, the black matrix is made of black-pigment-dispersed type photosensitive resin with a thickness of around 1 μm.

Manufacturing an active substrate having pixel electrodes and insulating bottom gate transistors that include the scan lines, the data lines, and the switch elements need plural photolithography processes (developing and etching) that use masks to treat a semiconductor integrated circuit. Briefly, by rationalizing the processes of islanding the semiconductor layer and decreasing the processes of forming the contact with the scan line, the manufacturing method, which conventionally requires seven to eight photomasks and the introduction of dry etching, currently has been simplified to use five photomasks to decrease process costs. To reduce the production cost of the liquid crystal display device effectively, decreasing the process cost of the manufacturing processes of the active substrate, or the material cost of the panel assembling process and the module assembling process are well-known targets of development. Therefore, the manufacturing processes of the active substrate including photolithography processes are reduced, the yield of the liquid crystal display device is enhanced, and the cost of the liquid crystal display device is reduced.

As described above, the method for manufacturing an active substrate generally needs five photolithography processes. Part of the conventional methods for reducing manufacturing cost is introduced in the following description. A patent document 1, Unexamined Patent Application Number 7-74368 2000-206571, is an example of the prior art, which introduces a four-mask process. The four-mask process comprises rationalizing or reducing processes of islanding the semiconductor layer including a channel using halftone exposure technology and forming source/drain wires by one photomask. FIG. 22 is a plan view of a unit pixel of an active substrate corresponding to four-mask processes. Cross-section views of lines A-A' (insulating-gate-type-transistor region), B-B' (electrode-terminal region of scan line) and C-C' (electrode-terminal region of data line) in FIG. 22(f) are shown in FIG. 23. So far, two types of the insulating gate type transistors are often applied more than others. Among them, a channel etch type insulating gate transistor is applied in the following example.

As shown in FIG. 22(a) and FIG. 23(a), a first metal layer of approximately 0.1-0.3 μm in film thickness is deposited on a main surface of a glass substrate 2 of 0.5-1.1 mm in thickness, such as Corning's product number 1737 as an example of an insulating substrate with high heat-resistance, high chemical-resistance, and high transparency, using a vacuum film-depositing equipment such as an SPT (sputtering). Besides, scanning lines 11 functioning as gate electrodes 11A and storage capacity lines 16 are formed selectively using fine-processing technology. The scanning line material is selected after considering the all-around heat resistance, chemical resistance, fluorinated acid resist, and conductivity, but a metal with high-heat resistance such as Cr, and Ta or an alloy such as MoW is commonly used.

In response to requirements for large screens and high precision of liquid crystal panels, it is reasonable to use Al (aluminum) as a material for scanning lines for lowering the resistance value of the scan lines. However, the general technique used today is a lamination of the heat resistant metals such as Cr, Ta, Mo, or their silicides because Al alone has low heat resistance. In other words, a scan line 11 consists of one or more metal layers.

Next, three kinds of thin film layers, such a first silicon nitride (SiNx) layer 30 functioning as a gate insulating layer, a first amorphous silicon (a-Si) layer 31 containing almost no impurities and functioning as a channel of an insulating gate type transistor, and a second amorphous silicon (n$^+$a-Si) layer 32 containing phosphorous impurities and functioning as a source/drain of the insulating gate type transistor, are deposited in sequence over the entire surface of the glass substrate 2 by using a PCVD (plasma chemical vapor deposition) equipment with thicknesses of 0.3, 0.05, and 0.1 μm respectively for example. Subsequently, as shown in FIG. 22(b) and FIG. 23(b), a heat-resistant metal layer such as a Ti thin film layer 34 of about 0.1 μm in thickness, a low-resistance metal layer such as an Al (aluminum) thin film layer 35 of about 0.3 μm in thickness, and an intermediate conductive layer such as another Ti thin film layer 36 of about 0.1 μm in thickness are deposited in sequence by using a vacuum film-depositing equipment such as the SPT.

Then, the data line 12 functioning as the source electrode of the insulating gate type transistor composed of a laminate of the heat-resistant metal layer 34A, the low-resistance metal layer 35A, and the intermediate conductive metal layer 36A partially overlapping the gate electrode 11A, and the drain electrode 21 of the insulating gate type transistor composed of a laminate of the heat-resistant metal layer 34B, the low-resistance metal layer 35B, and the intermediate conductive metal layer 36B partially overlapping the gate electrode 11A are selectively formed at the same time by fine-processing technology. The formation of selective pattern is done by halftone exposure technology. As shown in FIG. 22(c) and FIG. 23(c), a notable feature of four-mask process is that the photosensitive resin pattern in the channel-forming-region 80B (diagonal line) between the source/drain electrodes is about 1.5 μm in thickness, and the photosensitive resin in the source/drain wires-forming-region 80A (12) and 80A (21) is about 3 μm in thickness, for example.

Photosensitive resin patterns 80A and 80B normally use positive photosensitive resin in the formation of the active substrate. Therefore, the photomask used here is black in the source/drain wires-forming area 80A, i.e. forming Cr thin film, gray (middle tone) in the channel-forming-region 80B, i.e. forming line-and-space (L&S) Cr patterns of 0.5-1 μm in width for example, to reduce the quantity of light passing through the photomask, and white in other areas, i.e. the photomask with removed Cr thin film. Line and space problems are not resolved since resolution of the exposure equipment is low in the gray area, and about half of the light from the lamp may be transmitted through the photomask. Accordingly, it possible to obtain photosensitive resin patterns 80A and 80B having a concave cross section as shown in FIG. 23(c) through the property of positive photosensitive resin. In addition, the gray area can be formed with a slit pattern by forming a metal layer with different thickness or transmittance, such as MoSi$_2$ layer.

Then, as shown in FIG. 22(c) and FIG. 23(c), Ti thin film layer 36, Al thin film layer 35, Ti thin film layer 34, second amorphous silicon layer 33, and first amorphous silicon layer 31 are etched by using the photosensitive resin patterns 80A and 80B as a mask, and the gate insulating layer 30 is exposed. After that, more than 1.5 μm of the thickness of the photosensitive resin patterns 80A and 80B is reduced by an ashing method such as oxygen plasma ashing method to eliminate the photosensitive resin patterns 80B. Therefore, the Ti thin film 36 (not shown) in the channel-forming-region is exposed, and photosensitive resin patterns 80C (12) and 80C (21) the thicknesses of which are reduced, are formed in the source/drain wires-forming region.

The Ti thin film layer between the source/drain wires (i.e. the channel-forming-region), Al thin film layer, Ti thin film layer, second amorphous silicon layer 33A, and first amorphous silicon layer 31A are etched by using the photosensitive resin patterns 80C(12) and 80C(21) as the mask, and the residual thickness of the first amorphous silicon layer 31A is approximately 0.05-0.1 μm. Accordingly, the source electrode 33S and drain electrode 33D, which are both composed of the second amorphous silicon layer, are separated. The insulating gate type transistor manufactured in this method is called channel-etched type, and this method is achieved by leaving the first amorphous silicon layer 31A of approximately 0.05-0.1 μm in thickness after etching the metal layers for forming the source/drain wires. Furthermore, for the resist pattern 80A that is converted to 80C after its film is thinned down in the oxygen plasma treatment, it is desirable to strengthen anisotropy in order to regulate the pattern dimension changes. In general, oxygen plasma treatment of the RIE (Reactive Ion Etching) method, ICP (Inductive Coupled Plasma) method using high density plasma source, or TCP (Transfer Coupled Plasma) method high density plasma source is desirable.

Next, after removing the photosensitive resin patterns 80C (12) and 80C(21), a second SiNx layer of approximately 0.3 μm in thickness functioning as a passivation insulating layer 37 is deposited on the entire surface of the glass substrate 2. As shown in FIG. 22(e) and FIG. 23(e), openings 62, 63, and 64 are respectively formed on the drain electrode 21, and the electrode-terminal-forming-region of the scan line 11 and the data line 12 outside the active area by removing the passivation insulating layer 37 and the gate insulating layer 30 within the openings 63 to expose part 5 of scan lines, and removing the passivation insulating layer 37 within the openings 62, 64 to expose part of the drain wire 21 and part 6 of the data line at the same time. Similarly opening 65 is formed on the storage capacitor lines 16 and expose part of the storage capacitor lines 16.

Finally, a transparent conductive layer of approximately 0.1-0.2 μm in thickness, such as ITO (Indium-Tin Oxide), IZO (Indium-Zinc Oxide), or the mixture thereof, is deposited by using a vacuum film-depositing equipment such as the SPT. As shown in FIG. 22(f) and FIG. 23(f), a complete active substrate 2 is obtained by selectively forming a transparent conductive pixel electrode 22 containing the openings 62 in the passivation insulating layer 37 by using micro-processing technology. As for the storage capacitance 15, the storage capacitance 15 is formed in the area 50 (a diagonal line going up to the right hand side), where the storage capacity line 16 and the drain electrode 21 are overlapped level with the gate insulating layer 30, the first amorphous silicon layer 31A, and the second amorphous silicon layer 33D sandwiched therebetween. As for the electrode terminals, transparent conductive electrode terminals 5A and 6A are formed on the passivation insulating layer 37 and the openings 63 and 64.

As the material of the source/drain wires 12 and 13 comprises Al, each of the source/drain wires 12 and 13 is a laminate of three layers because the source/drain wires 12 and 13 need the heat-resistance metal layer 34 to ensure the electrical connection between the second amorphous silicon layer and the source/drain wires, and the intermediate conductive layer 36 to avoid an oxidation-reduction reaction occurring between the transparent conductive layer and the source/drain wires. Moreover, it is difficult to avoid using the low-resistance metal layer in the liquid crystal display device with large panel size or high picture quality due to the strict electrical resistance of the source/drain wires. In addition, as the materials of the heat-resistant metal layer 34 and the intermediate metal layer 36 are both Ti, they must be dry etched by using chlorinated gas for example, and spontaneously the layer of Al is dry etched by chlorinated gas. Thus, burdens of the material choice and the production equipment are increased. On the other hand, as the materials of the heat-resistant metal layer 34 and the intermediate metal layer 36 are Mo, it is possible to etch a laminate of Mo/Al/Mo (three layers) at a time by using a solution of phosphoric acid and nitric acid. Thus, the cost of production equipment can be reduced, and obviously the production cost of the source/drain wires can be reduced.

As the contact formation process for the drain electrode 21 and the scan lines 11 is done simultaneously in the four-mask process as described above, the insulating layers corresponding openings 62 and 63 are different in thickness and type. Compared to the gate insulating layer 30, the passivation insulating layer 37 has a lower temperature of film-depositing and inferior film quality. Thus, the etching speeds of the insulating layers corresponding openings 62 and 63 are several 1000 A/minute and several 100 A/minute, respectively, and a 1-digit difference in the etching speed is generated. Considering that an excessive etching occurs on the upper part of the cross section at the openings 62 on the drain electrodes 21 causes difficulty in regulating the aperture diameters of the openings, fluorinated gas-based dry etching process is preferred.

However, after the dry etching method, the opening 62 on drain electrodes 21 only has the passivation insulating layer 37 therein. Compared to the opening 63 on the scan line 11, it is impossible to avoid excessive etching occurring at the openings 62. As a result, film of the intermediate inductive layer 36A may be reduced due to the etching gas, depending on the material used for the layer. Furthermore, when removing the photosensitive resin patterns after etching, it is usually done by eliminating approximately 0.1-0.3 μm of the photosensitive resin pattern surface by oxygen plasma ashing in order to remove polymers from the fluorinated surface, and this is then followed by applying chemical treatment, e.g. using an organic stripping solution such as Tokyo Ohka Kogyo's stripping solution 106. However, when the film of the intermediate conductive layer 36A is reduced to expose the aluminum layer 35A thereunder, an insulator Al2O3 is formed on the surface of the aluminum layer 35A by oxygen plasma ashing treatment, and therefore, no ohmic contact occurring between the drain electrode 36B and the pixel electrode 22 is not unusual.

Thus, there is an attempt to avoid this problem by setting up the film 0.2 μm in thickness in order to allow the reduced film thickness of the intermediate inductive layer 36A. Another way to avoid this problem is to remove the aluminum layer 35B to expose the Ti thin layer 34B functioning as the heat-resistant metal layer, and form the pixel electrode 22 when forming openings 62-65. In this case, there is a merit in not having to have an intermediate conductive layer 36 from the beginning.

However, the ways described above do not always work as effectively as expected if the thin film's homogeneity, or the etching speed's homogeneity within the surface is not good. Besides, although the latter way described above does not require the intermediate inductive layer 36B, it needs the process of removing the aluminum layer 35B and difficulty exists in controlling the correction shape of the opening 62. Thus, a possibility of pixel electrode 22 being cut off may occur.

Furthermore, in the 4-mask process, the channel-forming process is achieved by removing the source/drain wire materials and the semiconductor layer containing impurities between the source wire 12 and the drain wire 21. Therefore, the channel-forming process determines the channel length (4-6 μm in contemporary mass produced goods), which largely affects the On-state properties of insulating gate type transistors. The channel length fluctuation has significant effects on the On-state current of insulating gate type transistors. Accordingly, the requirements of fabricating management of the channel length are strict. The pattern dimension of the halftone exposure area is affected by many parameters such as exposure value (light source intensity and photomask pattern precision, especially line and space dimensions), coat thickness of the photosensitive resin, treatment conditions of photosensitive resin development, and the film reduction volume of the photosensitive resin in the etching process. The channel length is not always stable nor high-yielding due to the homogeneity of the parameters within the surface. As a result, fabricating management even stricter than before is needed. In other words, such management has not reached the optimum high-level yet. Accompanying the reduced thickness of the photosensitive resin pattern 80A(12) and 80A(21), the tendency is clearer especially when the channel length is 6 μm or below.

Increasing the size of the photomask is the easy way to avoid lessening the pattern size that corresponds to the reduced thickness of the photosensitive resin. However, the gap between the photosensitive resin 80C(12) and 80C(21) in the channel-region cannot be smaller than the resolution (at least 3 μm) of the exposure equipment. Hence, the channel length increases to two times of the reduced amount of the film of the photosensitive resin pattern in the horizontal direction. Besides, the reduced amount of the film of the photosensitive resin pattern in the glass substrate has great variation. Accordingly, the four-mask process cannot be introduced to the production line, in which the glass substrate has a dimension of more than 1 m, at present Taking these situations into consideration, the present invention is provided to simplify the structure of the data line 12 without strict pattern accuracy management, to rationalize the process of forming the pixel electrode, and to reduce the manufacturing processes.

[Patent document 1] Japanese Unexamined Patent Application Publication H7-74368.

[Patent document 2] Japanese Unexamined Patent Application Publication 2004-317685.

[Patent document 3] Japanese Unexamined Patent Application Publication 2005-17669.

[Patent document 4] Japanese Unexamined Patent Application Publication 2005-19664.

[Non-patent document 1] November 2002 issue of the monthly publication of "Polymer Processing".

SUMMARY OF THE INVENTION

In the present invention, the insulating layer in the pixel-electrode-forming-region is removed to expose the glass substrate in the process of forming the opening where the pixel electrode is formed and connects to the drain electrode, and the pixel electrode can be formed on the exposed glass substrate containing the drain electrode by lift-off. As a result, the manufacturing processes of the liquid crystal display device in the present invention are fewer than in the equivalent prior art. Besides, in order to form pixel electrodes easily by lift-off, the photosensitive resin pattern used in the process of removing the insulating layer has an counter-taper cross section. Additionally, the low-resistance metal layer, which is the upper layer of the drain electrode composed of a laminate of the low-resistance metal layer and the heat-resistant metal layer, is removed to expose the heat-resistant metal layer that is the lower layer of the drain electrode to avoid disconnection and obtain good electrical connection between the pixel electrode and the drain electrode.

The liquid crystal display device of claim 1 is characterized in that:

the insulating gate type transistor is a bottom gate type;

the source/drain wires of a laminate of a low-resistance metal layer, and a heat-resistant metal layer which can be removed by an etching gas for etching an insulating layer is formed;

means for protecting at least a channel and the data line of the insulating gate type transistor is provided; (The means is also labeled as a protective layer)

openings are formed in a pixel-electrode-forming-region containing part of the drain wire inside the active area, an electrode-terminal-forming-region of the scan line containing part of the scan line outside the active area, and an electrode-terminal-forming-region of the data line containing part of the data line outside the active area and the partial drain wire formed by the heat-resistant metal layer, part of the first transparent insulating substrate, part of the scan line, and part of the data line made of the heat-resistant metal layer are exposed by removing the insulating layer in the openings; and the pixel electrode formed in the pixel-electrode-forming-region containing part of the drain wire, an electrode terminal of the scan line formed in the electrode-terminal-forming-region of the scan line containing part of the scan line, and an electrode terminal of the data line formed in the electrode-terminal-forming-region of the data line containing part of the data line are made from the same conductive film.

By the assistance of the structure of the liquid crystal display device, both of the electric connection between the pixel electrode and part of the drain electrode, which is formed by the heat-resistant metal layer, and the electric connection between the electrode terminal of the data line and part of the drain electrode, which is formed by the heat-resistant metal layer, can be ensured. Moreover, the source/drain wires are a laminate of two layers (i.e. the low-resistance metal layer and the heat-resistant metal layer), therefore, the source/drain wires are simplified.

The liquid crystal display device of claim 2 is as claimed in claim 1, wherein on the active substrate:

the insulating bottom gate type transistor is a channel etch type;

a first amorphous silicon layer containing no impurity is formed in a shape of an island on a gate insulating layer and above the gate electrode, and the width of the first amorphous silicon layer is greater than that of the gate electrode;

a pair of second amorphous silicon layers containing impurities, which simultaneously function as a source electrode and a drain electrode of the insulating gate type transistor, are formed on the first amorphous silicon layer and partially overlap the gate electrode;

the source/drain wires are formed on the source electrode, the drain electrode, and the gate insulating layer; and a passivation insulating layer is formed on the topmost layer on the first transparent insulating substrate except in the regions where the openings are located.

In this structure of the liquid crystal display device, the insulating gate type transistor containing the channel, the scan line, and the data line (i.e. all the elements of the active substrate except the pixel electrode) are protected by the passivation insulating layer. Therefore, the reliability of the liquid crystal display device can be confirmed.

The liquid crystal display device of claim 3 is as claimed in claim 1, wherein on the active substrate:

the insulating bottom gate type transistor is a channel etch type;

a first amorphous silicon layer containing no impurity and formed in a gate insulating layer has a thin thickness in a channel region and has a high thickness in the region where the first amorphous silicon layer partially overlaps the gate electrode and is connected to the channel region;

a second amorphous silicon layer containing impurities is formed on the first amorphous silicon layer except in the channel region;

the self-integrated source/drain wires are formed on the second amorphous silicon layer in the channel region;

a passivation insulating layer is formed on the topmost layer on the first transparent insulating substrate except in the regions where the openings are located.

In this structure of the liquid crystal display device, the semiconductor layer containing the channel of the channel etching insulating gate type transistor can be formed by the halftone exposure technology with one photomask. These processes of forming source/drain wires and semiconductor layer are the same as those of the conventional four-mask process. In addition, the active substrate is protected by the passivation insulating layer as the liquid crystal display device claimed in claim 2.

The liquid crystal display device of claim 4 is as claimed in claim 1, wherein on the active substrate:

the insulating bottom gate type transistor is a channel etch type;

the scan line which simultaneously functions as the gate electrode, is formed on the main surface of the first transparent insulating substrate;

a gate insulating layer is formed on the scan line, and simultaneously another insulating layer (which is also labeled as a lateral insulating layer) different from the gate insulating layer is formed on the lateral sides of the scan line;

a first amorphous silicon layer containing no impurity and functioning as a channel is formed in a shape of an island on the gate insulating layer and above the gate electrode;

a pair of second amorphous silicon layers containing impurities and simultaneously functioning as a source electrode and a drain electrode of the insulating gate type transistor are formed on the first amorphous silicon layer;

the source/drain wires are formed on the source electrode, the drain electrode, and the first transparent insulating substrate; and a passivation insulating layer is formed on the topmost layer on the first transparent insulating substrate except in the regions where the openings locate.

In the structure of the liquid crystal display device, the scan line and the semiconductor layer containing the channel of the channel etching insulating gate type transistor can be formed by the halftone exposure technology with one photomask. Therefore, the number of the photolithography processes can be reduced relative to the prior art. In addition, the exposed lateral side of the scan line can be covered with the insulating layer that is different to the gate insulating layer. Thus, the scan line can cross the data line in the structure of the liquid crystal display device. The active substrate is protected by the passivation insulating layer as the liquid crystal display device claimed in claim 2.

The liquid crystal display device of claim 5 is as described in claim 1, wherein on the active substrate:

the insulating bottom gate type transistor is an etch stop type transistor having a protective insulating layer on a channel;

the source/drain wire partially overlapping the protective insulating layer and of a laminate of a second amorphous silicon layers containing impurities and simultaneously functioning as a source electrode and a drain electrode of the insulating gate type transistor, the heat-resistant metal layer, and the low-resistance metal layer is formed; and a passivation insulating layer is formed on the topmost layer on the first transparent insulating substrate except in the regions where the openings are located.

In this structure of the liquid crystal display device, the channel of the insulating gate type transistor is protected by a laminate of the protective insulating layer and the passivation insulating layer that is conventionally made of SiNx. In addition, the source/drain wires are protected by the passivation insulating layer that is conventionally made of SiNx. Therefore, the reliability of the liquid crystal display device can be confirmed.

The liquid crystal display device of claim 6 is as described in claim 1, wherein on the active substrate:

the insulating bottom gate type transistor is an etch stop type transistor having a protective insulating layer on a channel;

the source/drain wires partially overlapping the protective insulating layer and of a laminate of a second amorphous silicon layer containing impurities and simultaneously functioning as a source electrode and a drain electrode of the insulating gate type transistor, the heat-resistant metal layer, and the low-resistance metal layer are formed; and a photosensitive organic insulating layer is formed on the data line except in the electrode-terminal-region outside the active area.

In the structure of this liquid crystal display device, the channel of the insulating gate type transistor is protected by the protective insulating layer. Moreover, the data line is protected by the photosensitive organic insulating layer. Therefore, the reliability of the liquid crystal display device can be confirmed without using the passivation insulating layer that is conventionally made of SiNx.

The liquid crystal display device of claim 7 is as described in claim 1, wherein on the active substrate:

the insulating bottom gate type transistor is an etch stop type transistor having a protective insulating layer on a channel;

the scan line simultaneously functioning as the gate electrode is formed on the main surface of the first transparent insulating substrate;

a gate insulating layer is formed on the scan line, and simultaneously another insulating layer (which is also labeled as a lateral insulating layer) different from the gate insulating layer is formed on the lateral sides of the scan line;

a first amorphous silicon layer containing no impurity and functioning as a channel is formed in a shape of an island on the gate insulating layer and above the gate electrode;

the scan line and the self-integrated protective insulating layer of which the width is less than the first amorphous silicon layer is formed on the first amorphous silicon layer;

the source/drain wires of a laminate of a second amorphous silicon layer containing impurities and simultaneously functioning as a source electrode and a drain electrode of the insulating gate type transistor, the heat-resistant metal layer, and the low-resistance metal layer are formed on part of the protective insulating layer, the first amorphous silicon layer, and the first transparent insulating substrate; and a photosensitive organic insulating layer is formed on the data line except in the electrode-terminal-region outside the active area.

In the structure of this liquid crystal display device, the scan line and the protective insulating layer of the etching-stop insulating gate type transistor can be formed by the halftone exposure technology with one photomask. Therefore, the number of the photolithography processes can be reduced relative to prior art. In addition, the exposed lateral side of the scan line can be covered with the insulating layer that is different to the gate insulating layer. Thus, the scan line can cross the data line in the structure of the liquid crystal display device. Moreover, the channel of the insulating gate type transistor is protected by the protective insulating layer as the liquid crystal display device claimed in claim 5, and the data line is protected by the photosensitive organic insulating layer. Thus, no passivation insulating layer, which is conventionally made of is SiNx, is needed in the structure of this liquid crystal display device.

The method of claim 8 is for manufacturing a liquid crystal display device of claim 1, which comprises:

forming a scan line, a gate insulating layer of a channel-etching insulating gate type transistor, a semiconductor layer of the channel-etching insulating gate type transistor, and source/drain wires of a laminate of a low-resistance metal layer, and a heat-resistant metal layer which can be removed by an etching gas for etching an insulating layer on a main surface of a first transparent insulating substrate;

forming a photosensitive resin with a counter-taper cross section and of a pattern having openings in a pixel-electrode-forming-region containing part of the drain wire inside the active area, in an electrode-terminal-forming-region containing part of the scan line outside the active area, and in an electrode-terminal-forming-region containing part of the data line outside the active area on a passivation insulating layer after the passivation insulating layer is coated on the first transparent insulating substrate;

removing the passivation insulating layer and the gate insulating layer in the openings by using the patterned photosensitive resin as a mask and exposing part of the drain wire, the first transparent insulating substrate, part of the scan line, and part of the data line in the openings;

removing the exposed low-resistance metal layer in the openings to expose part of the drain wires and part of the data line formed by the heat-resistant metal layer;

coating a conductive film on the first transparent insulating substrate; and removing the patterned photosensitive resin to form a pixel electrode in the pixel-electrode-forming-region containing part of the drain wire, an electrode terminal of the scan line in the electrode-terminal-forming-region of the scan line containing part of the scan line, and an electrode terminal of the data line in the electrode-terminal-forming-region of the data line containing part of the data line.

As described above, the channel-etching insulating gate type transistor and the source/drain wires, which are a laminate of the low-resistance metal layer, the passivation insulating layer, and the heat-resistant metal layer that can be removed by the etching gas for etching the gate insulating layer are formed. After coating the passivation insulating layer, the photosensitive resin with an counter-taper cross section and of a pattern having openings in a pixel-electrode-forming-region containing part of the drain wire, in an electrode-terminal-forming-region containing part of the scan line, and in an electrode-terminal-forming-region containing part of the data line is formed. Then, the passivation insulating layer and the gate insulating layer in the openings are removed by using the patterned photosensitive resin as a mask, and simultaneously part of the heat-resistant metal layer (and the semiconductor layer, and the gate insulating layer) is removed by using the low-resistance metal layer as a mask. According the overhang of the low-resistance metal layer is generated. After removing the low-resistance metal layer, the overhang is eliminated, and part of the drain wire and part of the data line that are formed by the heat-resistant metal layer are exposed in the openings. The thin film functioning as the pixel electrode is then formed. Subsequently, the photosensitive resin, which is used to form the openings, is removed, and the self-integrated pixel electrode and the self-integrated electrode terminal of the data line are formed in the openings. Moreover, part of the scan line in the electrode-terminal-region of the scan line is not affected by the process of removing the low-resistance metal layer. Thus, the self-integrated electrode terminal of the scan line is formed; meanwhile, the pixel electrode and the electrode terminal of the data line are formed. Therefore, the processes of forming openings and forming pixel electrodes, that are carried out to make connection between the scan line, the data line, and the drain electrode, can be achieved by using one photomask. Thus, the number of the manufacturing processes can be reduced relative to prior art.

The method of claim 9 is for manufacturing a liquid crystal display device of claim 2, wherein the semiconductor layer is formed by the following steps:

forming an island-shaped semiconductor layer by stacking a first amorphous silicon layer containing no impurity, and a second amorphous silicon layer containing impurities, after the gate insulating layer is coated;

forming the source/drain wires; and selectively removing the second amorphous silicon layer between the source/drain wires by using the patterned photosensitive resin for forming the source/drain wires as a mask to form the source/drain wires.

This method can be achieved through the process of forming the scan line, the process of islanding the semiconductor layer, the process of forming the source/drain wires, and the process of forming the openings and the pixel electrode simultaneously without using halftone exposure technology. Therefore, the active substrate can be manufactured with four photomasks without using the halftone exposure technology.

The method of claim 10 is for manufacturing a liquid crystal display device of claim 3, wherein the semiconductor layer is formed by the following steps:

forming the gate insulating layer, a first amorphous silicon layer containing no impurity, a second amorphous silicon layer containing impurities, the heat-resistant metal layer which can be removed by an etching gas for etching an insulating layer, and the low-resistance metal layer in sequence after the scan line is formed;

forming a patterned photosensitive resin in the region corresponding to the source/drain wires and the channel regions, wherein the thickness of the photosensitive resin in the channel-forming-region is thinner than that in the source/drain-wires-forming-region;

removing the low-resistance metal layer, the heat-resistant metal layer, the second amorphous silicon layer, and the first amorphous silicon layer by using the patterned photosensitive resin as a mask to expose the gate insulating layer;

reducing the thickness of the patterned photosensitive resin to expose the low-resistance metal layer in the channel-forming region; and removing the low-resistance metal layer, the heat-resistant metal layer, and the second amorphous silicon layer between the source/drain wires by using the patterned photosensitive resin the thickness of which has been reduced as a mask.

This method can be achieved through the process of forming the scan line, the process of forming semiconductor layer and source/drain wires simultaneously by halftone exposure technology, and the process of forming the openings and the pixel electrode simultaneously. Therefore, the active substrate can be manufactured by using three photomasks.

The method of claim 11 is for manufacturing a liquid crystal display device of claim 4, wherein the semiconductor layer is formed by the following steps:

forming the gate insulating layer, a first amorphous silicon layer containing no impurity, and a second amorphous silicon layer containing impurities in sequence after a metal layer functioning as the scan line is coated;

forming a patterned photosensitive resin in the region corresponding to the semiconductor layer located on the scan line and a gate electrode, and the thickness of the formed patterned photosensitive resin in the semiconductor-forming-region is higher than that in other regions;

removing the second amorphous silicon layer, the first amorphous silicon layer, the gate insulating layer, and the metal layer functioning as the scan line by using the patterned photosensitive resin as a mask to expose the first transparent insulating substrate;

reducing the thickness of the photosensitive resin to expose the second amorphous silicon layer;

forming the semiconductor region of a laminate of the second amorphous silicon layer, and the first amorphous silicon layer by using the photosensitive resin the thickness of which has been reduced, and exposing the gate insulating layer;

forming another insulating layer (which is also labeled as a lateral insulating layer) different from the gate insulating layer on the exposed lateral side of the scan line;

forming the source/drain wires of a laminate of the heat-resistant metal layer which can be removed by an etching gas for etching an insulating layer, and the low-resistance metal layer; and removing the second amorphous silicon layer between the source/drain wires by using another patterned photosensitive resin for forming the source/drain wires as a mask.

This method can be achieved through the process of forming the scan line and the semiconductor layer simultaneously by using halftone exposure technology, the process of forming source/drain wires, and the process of forming openings and the pixel electrode simultaneously. Therefore, the active substrate can be manufactured with three photomasks.

The method of claim 12 is another method for manufacturing a liquid crystal display device of claim 1, which comprises:

forming a scan line, a gate insulating layer of an etch-stop insulating gate type transistor, a semiconductor layer of the etch-stop insulating gate type transistor, and a protective insulating layer on a main surface of a first transparent insulating substrate;

coating a second amorphous silicon layer containing impurities, a heat-resistant metal layer which can be removed by an etching gas for etching an insulating layer, and a low-resistance metal layer;

forming source/drain wires;

forming an insulating layer for protecting at least the data line in the active layer;

forming a photosensitive resin with an counter-taper cross section and of a pattern having openings in a pixel-electrode-forming-region containing part of the drain wire inside the active area, in an electrode-terminal-forming-region containing part of the scan line outside the active area, and in an electrode-terminal-forming-region containing part of the data line outside the active area on the first transparent insulating substrate;

removing the gate insulating layer (and the insulating layer for protecting the data line) in the openings by using the patterned photosensitive resin as a mask, and exposing part of the drain wire, the first transparent insulating substrate, part of the scan line, and part of the data line in the openings;

removing the exposed low-resistance metal layer in the openings to expose part of the drain wires and part of the data line formed by the heat-resistant metal layer;

coating a conductive film on the first transparent insulating substrate; and removing the patterned photosensitive resin to form a pixel electrode in the pixel-electrode-forming-region containing part of the drain wire, an electrode terminal of the scan line in the electrode-terminal-forming-region of the scan line containing part of the scan line, and an electrode terminal of the data line in the electrode-terminal-forming-region of the data line containing part of the data line.

As described above, the channel-stop insulating gate type transistor and the source/drain wires of a laminate of the low-resistance metal layer, and the heat-resistant metal layer that can be removed by the etching gas for etching the gate insulating layer are formed. The active substrate can be protected by forming the passivation insulating layer. Otherwise, the data line can be protected by forming the photosensitive organic insulating layer on the source/drain wires except part of the data line outside the active area. The photosensitive resin with an counter-taper cross section and of a pattern having openings in a pixel-electrode-forming-region containing part of the drain wire, in an electrode-terminal-forming-region containing part of the scan line, and in an electrode-terminal-forming-region containing part of the data line is formed. Then, the gate insulating layer (and the passivation insulating layer) in the openings is removed by using the patterned photosensitive resin as a mask. After removing the low-resistance metal layer, the thin film functioning as the pixel electrode is coated. Then, the self-integrated pixel electrode, the self-integrated electrode terminal of the scan line, and the self-integrated electrode terminal of the data line are formed in the openings as the photosensitive resin is removed. Therefore, this method is as claimed in claim 8, and the processes of forming openings and forming pixel electrode, that are carried out to make connection between the scan line, the data line, and the drain electrode, can be achieved by using one photomask. Thus, the number of the manufacturing processes can be reduced relative to the prior art.

The method of claim 13 is for manufacturing a liquid crystal display device of claim 5, wherein steps of forming the semiconductor layer, and the protective insulating layer are characterized by:

forming the gate insulating layer, a first amorphous silicon layer containing no impurity, and the insulating layer for protecting a channel after the scan line is coated;

retaining the protective insulating layer on a gate electrode with a width less than that of the gate electrode, and exposing the first amorphous silicon layer; and forming a passivation insulating layer on the first transparent insulating substrate functioning as an insulating layer for protecting the scan line.

This method can be achieved through the process of forming the scan line, the process of forming protective insulating layer, the process of forming source/drain wires, and the process of forming the openings and the pixel electrode simultaneously. Therefore, the active substrate can be manufactured with four photomasks.

The method of claim 14 is for manufacturing a liquid crystal display device of claim 6, wherein steps of forming the semiconductor layer, and the protective insulating layer are characterized by:

forming the gate insulating layer, a first amorphous silicon layer containing no impurity, and the protective insulating layer for protecting a channel after the scan line is coated;

retaining the protective insulating layer on a gate electrode with a width less than that of the gate electrode, and exposing the first amorphous silicon layer; and forming another insulating layer for protecting the data line;

wherein the photosensitive organic insulating layer is corresponding to the source/drain wires, the thickness of the patterned photosensitive organic insulating layer in a drain-wire-forming-region and a data-line-forming-region outside the active area is thinner than that in the data-line-forming-region inside the active area;

removing the low-resistance metal layer, the heat-resistant metal layer, the first amorphous silicon layer, and the second amorphous silicon layer by using the patterned photosensitive organic insulating layer as a mask to expose the gate insulating layer, and the protective insulating layer; and reducing the thickness of the patterned photosensitive organic insulating layer to expose the drain wire, and part of the data line.

This method can be achieved through the process of forming the scan line, the process of forming the protective insulating layer, the process of forming source/drain wires by using halftone exposure technology, and the process of forming the openings and the pixel electrode simultaneously. Therefore, the active substrate can be manufactured with four photomasks.

The method of claim 15 is for manufacturing a liquid crystal display device of claim 7, wherein steps of forming the semiconductor layer, and the protective insulating layer are characterized by:

forming a metal layer functioning as the scan line, the gate insulating layer, a first amorphous silicon layer containing no impurities, and an insulating layer for protecting a channel;

forming a photosensitive resin corresponding to the scan line and the protective insulating layer, wherein the thickness of the photosensitive resin in a scan-line-forming-region is thinner than that in a protective-insulating-layer-forming-region;

removing the insulating layer for protecting the channel, the first amorphous silicon layer containing no impurities, the gate insulating layer, and the metal layer functioning as the scan line by using the patterned photosensitive resin as a mask to expose the first transparent insulating substrate;

reducing the thickness of the patterned photosensitive resin to expose the insulating layer for protecting the channel;

retaining the protective insulating layer on a gate electrode with a width less than that of the gate electrode by using the patterned photosensitive resin the thickness of which has been reduced as a mask, and exposing the first amorphous silicon layer;

forming an insulating layer (which is also labeled as a lateral insulating layer) different from the gate insulating layer on the expose lateral sides of the scan line;

forming another insulating layer (which is also labeled as a photosensitive organic insulating layer pattern) for protecting the data line, wherein the photosensitive organic insulating layer is corresponding to the source/drain wires, the thickness of the patterned photosensitive organic insulating layer in a drain-wire-forming-region and a data-line-forming-region outside the active area is thinner than that in the data-line-forming-region inside the active area;

removing the low-resistance metal layer, the heat-resistant metal layer, the second amorphous silicon layer, and the first amorphous silicon layer by using the patterned photosensitive organic insulating layer as a mask to expose the gate insulating layer, and the protective insulating layer; and reducing the thickness of the patterned photosensitive organic insulating layer to expose the drain wire, and part of the data line.

This method can be achieved through the process of forming the protective insulating layer and the scan line by using halftone exposure technology, the process of forming source/drain wires using halftone exposure technology, and the process of forming the openings and the pixel electrode simultaneously. Therefore, the active substrate can be manufactured with three photomasks.

The liquid crystal display device of claim 16 is characterized in that an opposed electrode that is formed together with the scan line simultaneously on the first transparent insulating substrate, and the pixel electrode that is separated from the opposed electrode in a predetermined distance and in pair with the opposed electrodes control the electric field in the horizontal direction.

This liquid crystal display device is an in-plain-switching (IPS) type with a wide view angle. In addition, there is no insulating layer existing on the pixel electrode. Accordingly, the liquid crystal display device does not suffer from burn-in.

The liquid crystal display device of claim 17 is characterized in that a common electrode is formed together with the scan line on the first transparent insulating substrate simultaneously, an opening is formed in an opposed-electrode-forming-region containing part of the common electrode, an insulating layer in the openings is removed to expose part of the common electrode and the first transparent insulating substrate, an opposed electrode is formed in the opposed-electrode-forming-region containing part of the common electrode, and the opposed electrode and the pixel electrode, which are separated from the opposed electrode in a predetermined distance and in pair with the opposed electrodes, control the electric field in the horizontal direction.

This liquid crystal display device is an in-plain-switching (IPS) type with a wide view angle. Moreover, the alignment treatment is easy and the contrast ratio of the liquid crystal display device is improved because the pixel electrode and the opposed electrode are formed on the first transparent insulating substrate simultaneously. In addition, there is no insulating layer existing on the pixel electrode. Accordingly, the liquid crystal display device is hard to suffer from burn-in.

The liquid crystal display device of claim 18 is characterized in that, the liquid crystal is a homeotropic liquid crystal that is vertically aligned when no voltage is applied;

a first alignment-regulating means (which is also labeled as the first alignment-regulating component) is formed on the first transparent insulating substrate for controlling the alignment direction of the liquid crystal when a voltage is applied to the liquid crystal, and the first alignment-regulating means is the insulating layer or the first transparent insulating substrate locating between the plural zone-shaped pixel electrodes that are formed by the plural transparent conductive layers on the first transparent insulating substrate;

a second alignment-regulating means (which is also labeled as the second alignment-regulating component) is formed on the second transparent insulating substrate or the color filter for controlling the alignment direction of the liquid crystal when a voltage is applied to the liquid crystal.

In this structure, the laminate of the passivation insulating layer and the gate insulating layer locating between the zone-shaped pixel electrodes, the gate insulating layer, the passivation insulating layer, or the slits (cut-holes) of the pixel electrode can function as the homeotropic liquid crystal's alignment-regulating means that results in divided alignment in the liquid crystal cell. Therefore, the viewing angle of the vertical-align (VA) type liquid crystal display device is better than that of the TN type liquid crystal display device. Thus, the response speed of this liquid crystal display device is enhanced due to its outstanding ability of alignment regulation.

The method of claim 19 is for manufacturing the liquid crystal display device of claim 18, wherein the size of the zone-shaped pixel electrode is controlled by the shape of the cross section of the counter-taper photosensitive resin.

With this structure, the alignment ability of at least the transparent conductive layer formed on the lateral side of the insulating layer locating between the zone-shaped pixel electrodes is superior than that of the first alignment-regulating means. Thus, the response speed of the liquid crystal display device can be improved relative to the prior art.

Effect of the Invention

Principally, the invention is achieved by the process of forming at least the gate insulating layer and the semiconductor layer on the scan line and the insulating gate type transistor that are formed on the first transparent insulating substrate; the process of forming the source/drain wires of a laminate of the low-resistance metal layer and the heat-resistant metal layer that can be removed by the etching gas for etching the gate insulating layer (and the passivation insulating layer); the process of providing protective means to at least the channel of the insulating gate type transistor and the data line; the process of forming a photosensitive resin with an counter-taper cross section and of a pattern having openings in a pixel-electrode-forming-region containing part of the drain wire, in an electrode-terminal-forming-region containing part of the scan line, and in an electrode-terminal-forming-region containing part of the data line; the process of removing the gate insulating layer (and the passivation insulating layer) to expose part of the drain wire, the first transparent insulating substrate, part of the scan line, and part of the data line in the openings using the patterned photosensitive resin as a mask; a process of removing the low-resistance metal layer in the openings to expose part of the drain wire and part of the data line that are both formed by the heat-resistant metal layer; the process of coating the conductive thin film functioning as the pixel electrode on the first transparent insulating substrate; and the process of removing the patterned photosensitive resin and forming the pixel electrode in the pixel-electrode-forming-region containing part of the drain wire, the electrode terminal of the scan line in the electrode-terminal-forming-region of the scan line containing part of the scan line, and the electrode terminal of the data line in the electrode-terminal-forming-region of the data line containing part of the data line. Through this method, the process of forming the openings of the gate insulating layer and the process of forming the pixel electrode can be treated with one photomask. Therefore, the number of the manufacturing processes can be reduced relative to the prior art.

In addition, the electrical resistance of the data line can be decreased because the source/drain wires are laminates of the heat-resistant metal layer and the low-resistance metal layer. Moreover, the structure of the source/drain wires is simpler than that of the conventional source/drain wires containing the intermediate conductive layer. Accordingly, the cost can be reduced relative to the prior art.

The active substrate using the channel-etching gate insulating type transistor can be manufactured by using four photomasks without the halftone exposure technology. Thus, no halftone mask, which is expensive, and no strict management of pattern size are needed. In other words, the yield and the quality are stable. Also, the active substrate using the etching-stop gate insulating type transistor can be manufactured by using four photomasks without the halftone exposure technology as the conventional passivation insulating layer is used. However, as the variation of the pattern precision is inside the tolerance range, the active substrate can be manufactured by using four photomasks with the halftone exposure technology.

The halftone exposure technology can be used in the process of forming the semiconductor layer and the source/drain wires of the channel-etching gate insulating type transistor, the process of forming the scan line and the semiconductor layer of the channel-etching gate insulating type transistor, or the process of forming the scan line and the protective insulating layer of the etching-stop gate insulating type transistor. Thus, the number of the manufacturing process can be reduced, and the active substrate can be manufactured by using three photomasks so as to reduce the manufacturing cost relative to the prior art. The channel-etching insulating gate type transistor, the semiconductor layer of which and source/drain wires are formed simultaneously with the halftone exposure technology, needs to have its channel length managed strictly. However, the management of the channel length of the channel-etching insulating gate type transistor and the etching-stop insulating gate type transistor, the scan line and semiconductor layer of which are formed simultaneously with the halftone exposure technology, is easy.

As the quality and thickness of the conductive thin film functioning as the pixel electrode do not hinder the lift-off of the pixel electrode, the conductive thin film does not need to be controlled strictly, and the transparency of the conductive thin film is of little significance. However, to avoid the veiling reflection occurring on the reflective electrode (not shown in the figures) of the reflective type liquid crystal display device, the layer under the reflective electrode is not a flat layer, but is a lumpy layer of 0.5-1 μm depth in roughness. Mostly, the lumpy layer, which is under the reflective electrode, is made of photosensitive acrylic acid resin. Thus, a cost problem occurs. The photosensitive acrylic acid resin is formed with a lumpy surface in suitable time after coating the gate insulating layer. In the method of manufacturing the active substrate, the process of forming the openings of the gate insulating layer and the process of forming the reflective electrode or the transparent electrode functioning as the pixel electrode can be achieved by using a photomask. Accordingly, the number of the manufacturing processes can be reduced relative to the prior art. Preferably, after coating the transparent conductive layer (and the Mo (molybdenum) thin layer, which is used to restrain the alkali reaction) and the Al thin film layer with high reflectivity, a laminate of the transparent conductive layer (and the Mo thin layer) and the Al thin film layer functioning as a pseudo-pixel-electrode is formed and then processed with the fine-processing technology to remove the Al thin film layer (and the Mo thin layer) in the transparent-electrode-forming-region. The detailed illustration is provided later.

This invention can be applied to the transparent type liquid crystal display device, the reflective type liquid crystal display device, and the semi-transparent type liquid crystal display device. In addition, this invention can also be applied to the TN liquid crystal mode, the IPS liquid crystal mode, and the homeotropic liquid crystal mode while changing the pattern of the transparent conductive pixel electrode due to same manufacturing method. Accordingly, this invention provides a fine technology for reducing the number of the manufacturing process and improving the viewing angle at the same time for an LD screen.

As described above, this invention is principally achieved by forming the source/drain wires of a laminate of the low-resistance metal layer, and the heat-resistant metal layer, which can be removed by the etching gas for etching the gate insulating layer (and the passivation insulating layer); providing the protective means to at least the channel of the insulating gate type transistor and the data line; forming a photosensitive resin with an counter-taper cross section and of a pattern having openings in the insulating layer containing the gate insulating layer (and the passivation insulating layer); removing the exposed electrode formed by the low-resistance metal layer in the openings to expose the heat-resistance metal layer thereunder; and lifting off the conductive thin layer functioning as the pixel electrode to form the pixel electrode by using the photosensitive resin as the lift-off material. Accordingly, the process for forming the openings and the process of forming the pixel electrode thereafter can be achieved by using one photomask without need for the halftone exposure technology. Therefore, excepting the elements described above, the differences in a liquid crystal display device, such as the material or thickness of the scan line, the gate insulating layer, etc., and in the manufacturing method thereof are within the technique scope of this invention and these differences can be anticipated easily. Thus, this invention can be applied to the transparent type liquid crystal display device, the reflective liquid crystal display device, and the semi-transparent liquid crystal display device. Moreover, the semiconductor layer of the insulating gate type transistor is not restricted to the amorphous silicon layer.

DETAILED DESCRIPTION OF THE PREFERRED EMBODIMENT

Figure 1:
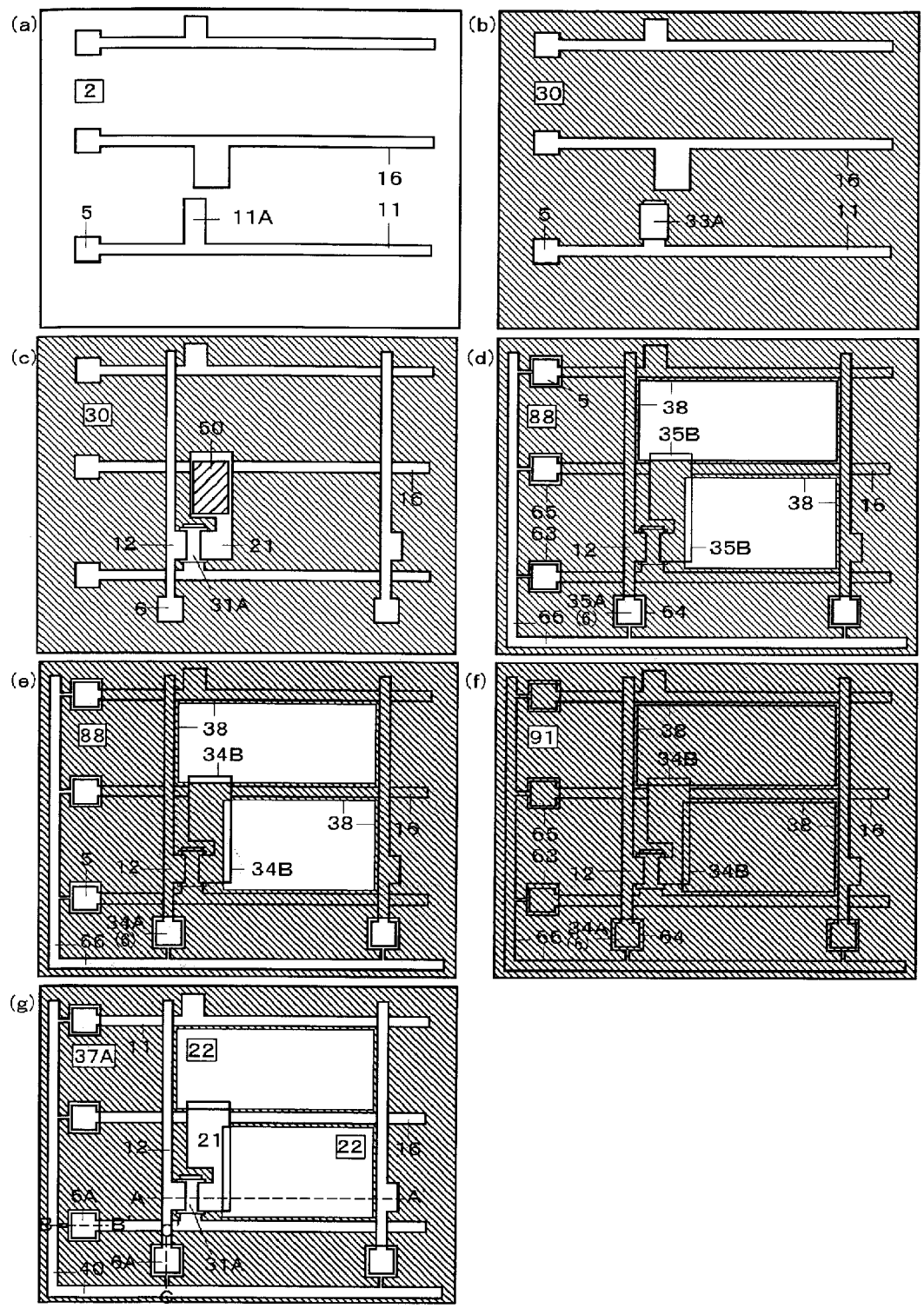
FIG. 1 is a plane view of the active substrate according to Embodiment 1 of the present invention.
Figure 2:
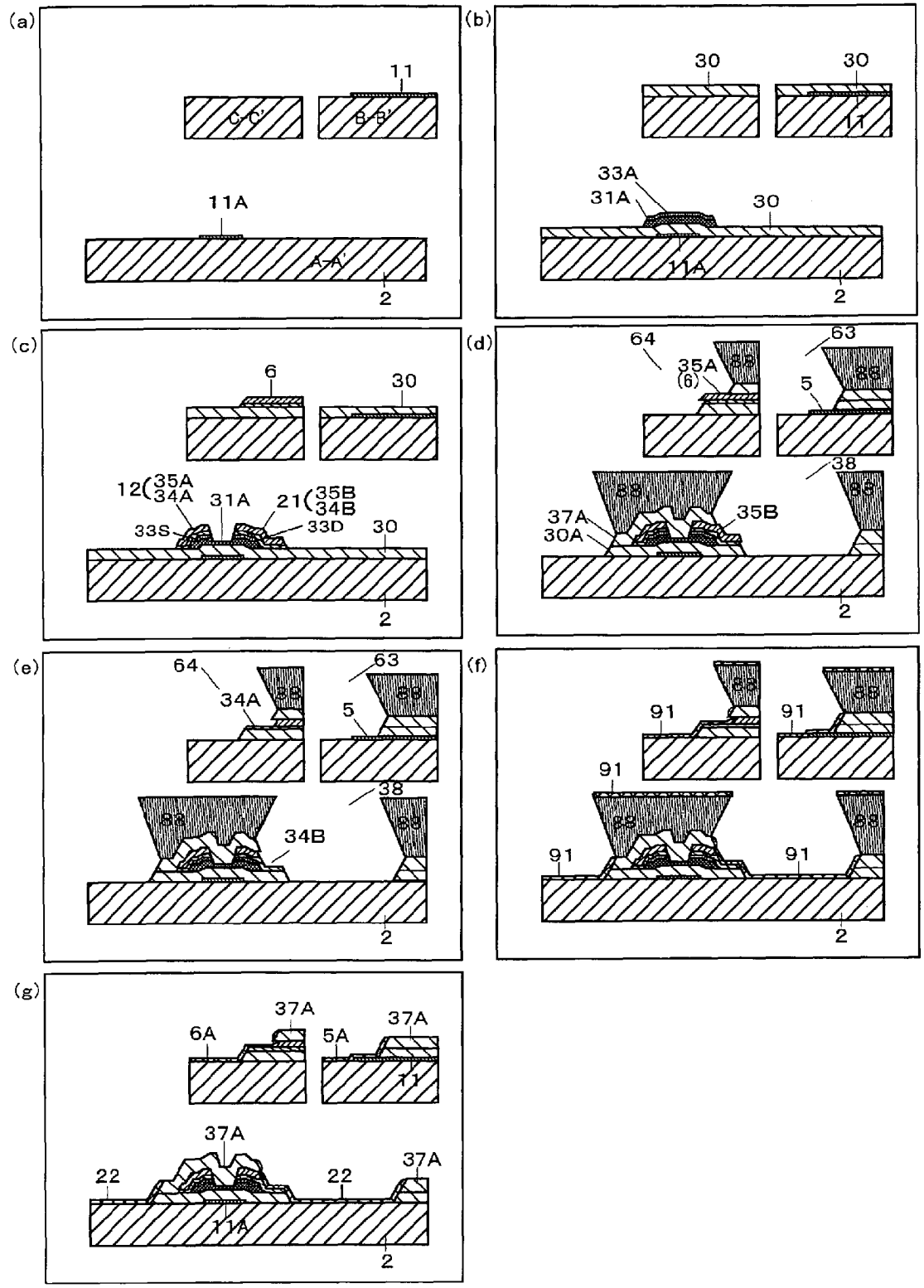
FIG. 2 is a cross section view of the manufacturing processes for the active substrate according to Embodiment 1 of the present invention.
Figure 5:
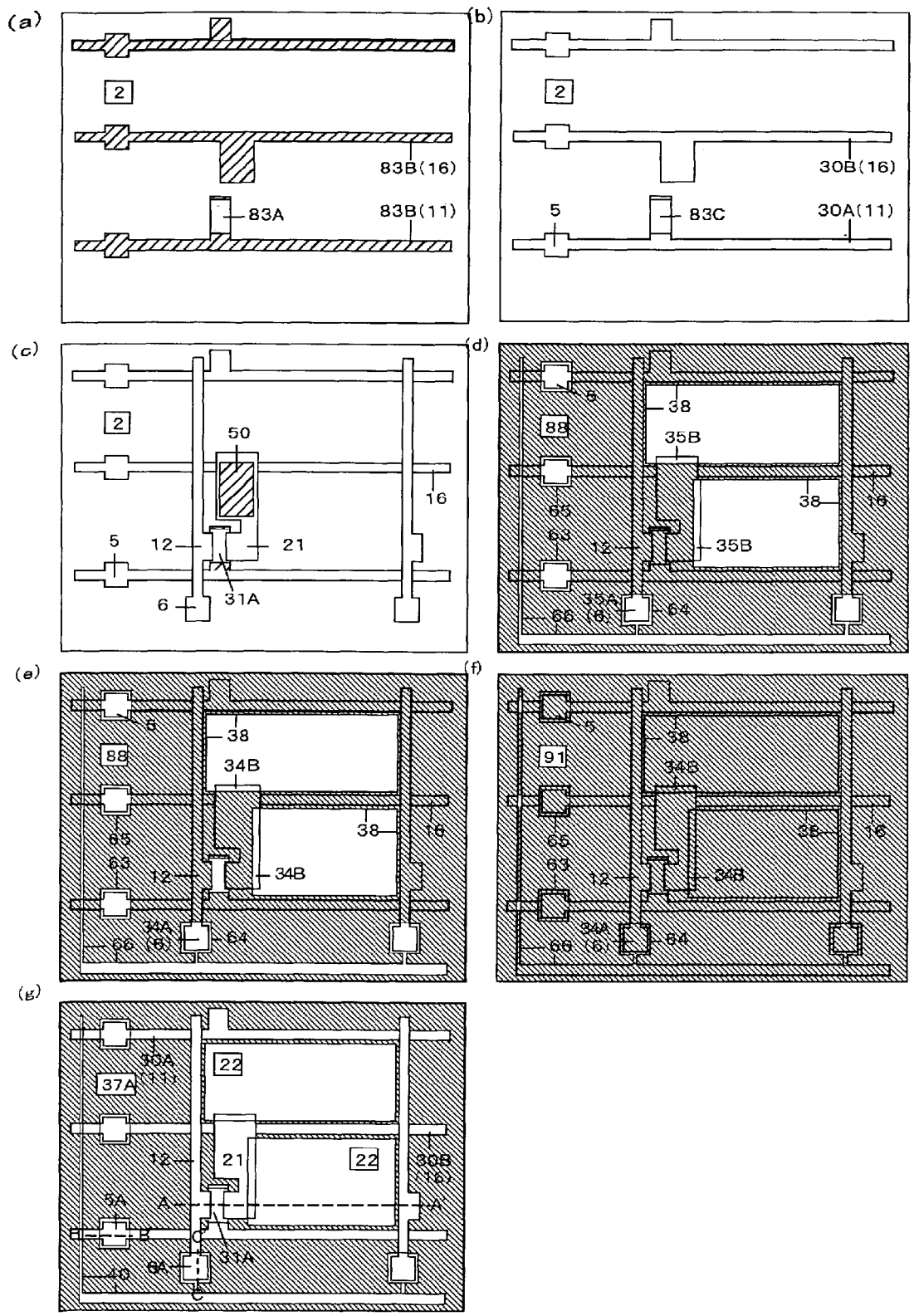
FIG. 5 is a plane view of the active substrate according to Embodiment 3 of the present invention.
Figure 6:
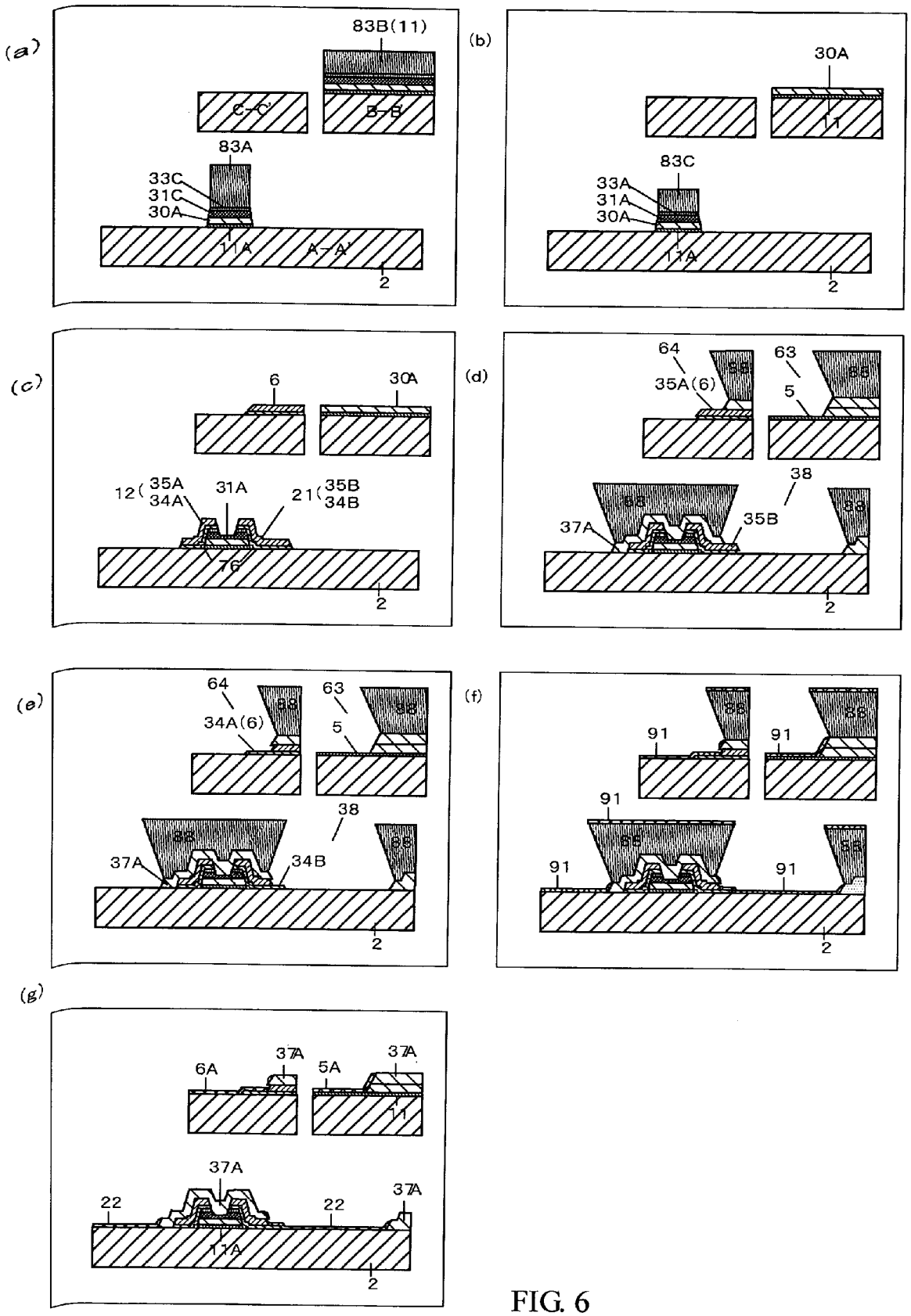
FIG. 6 is a cross section view of the manufacturing processes for the active substrate according to Embodiment 3 of the present invention.
Figure 7:
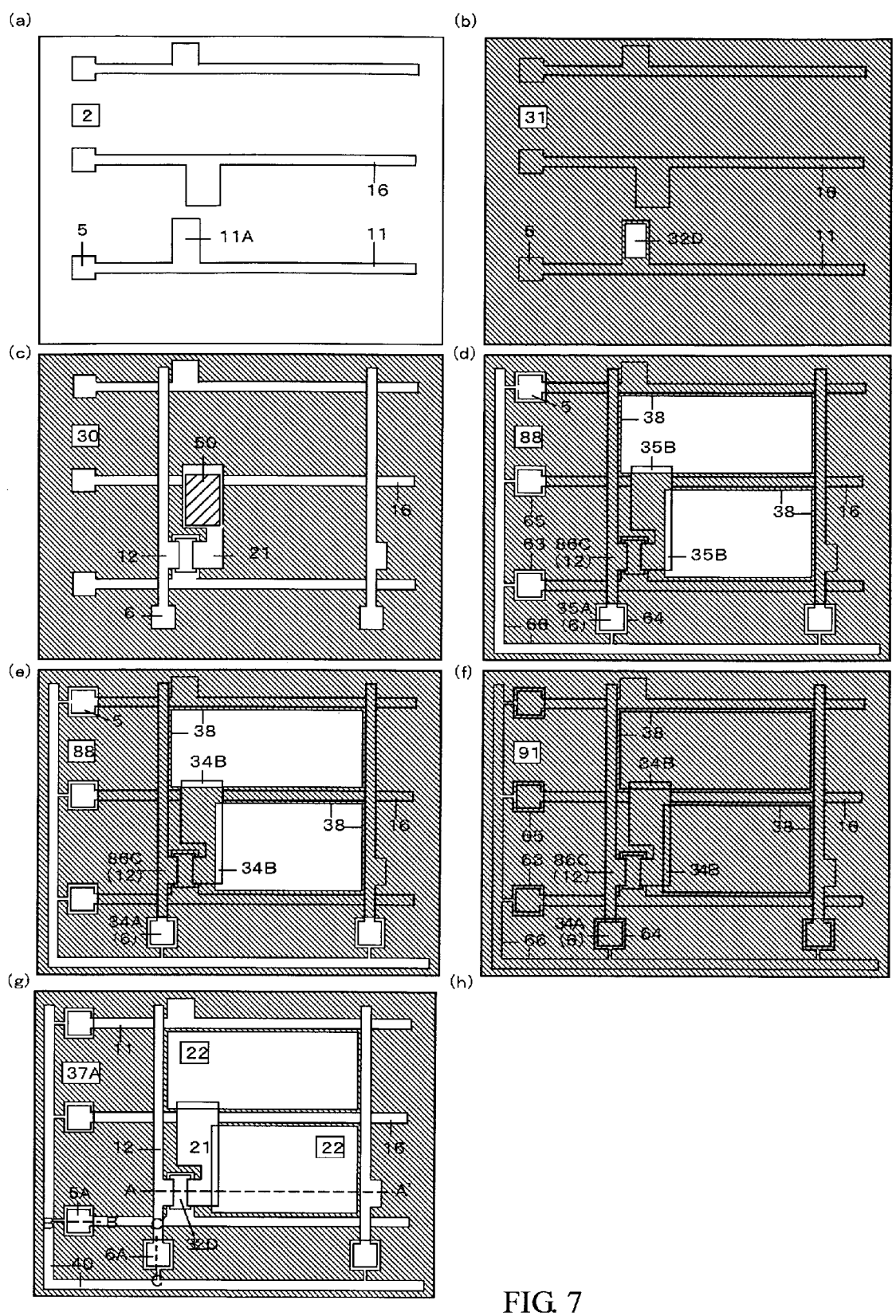
FIG. 7 is a plane view of the active substrate according to Embodiment 4 of the present invention.
Figure 8:
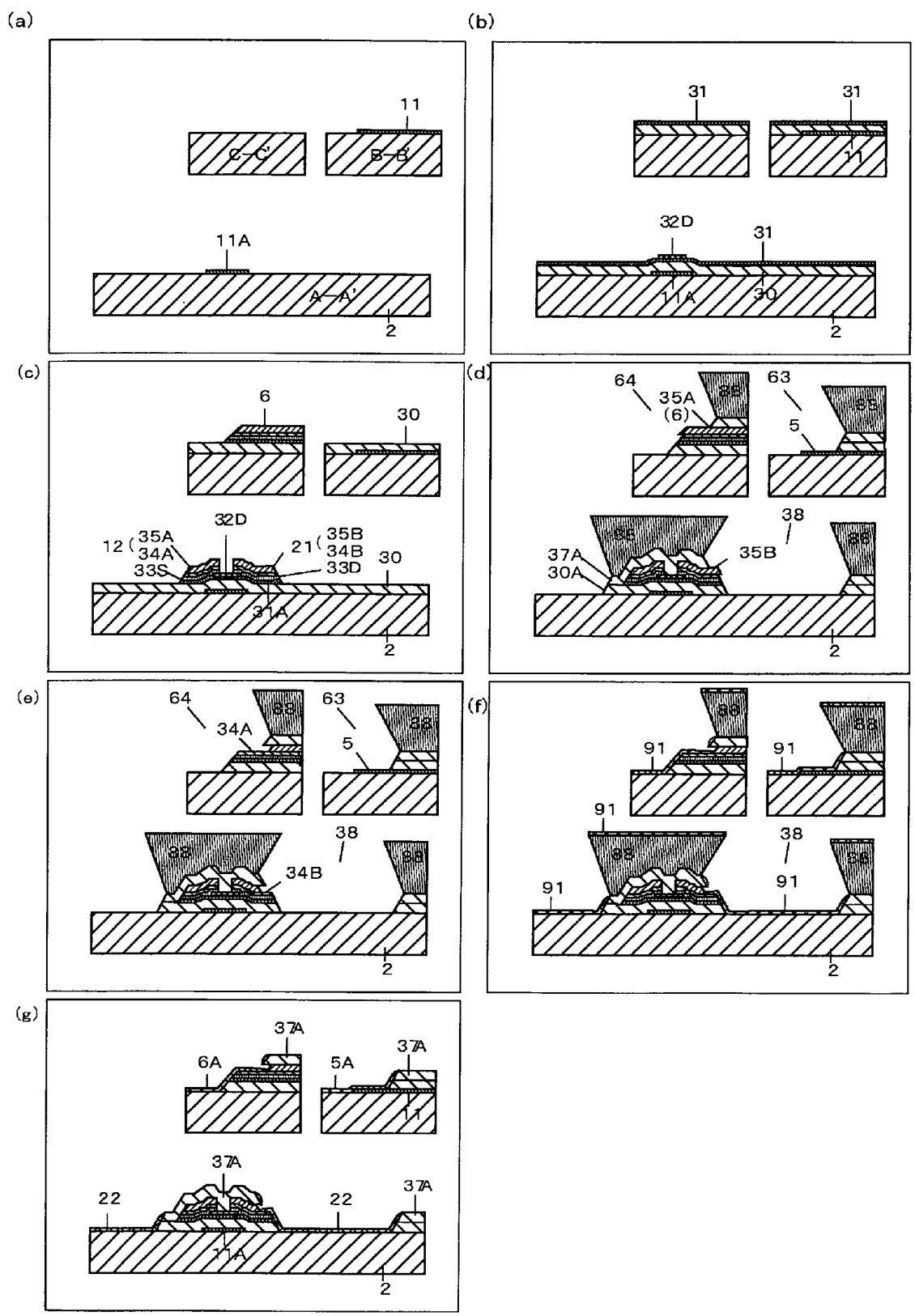
FIG. 8 is a cross section view of the manufacturing processes for the active substrate according to Embodiment 4 of the present invention.
Figure 9:
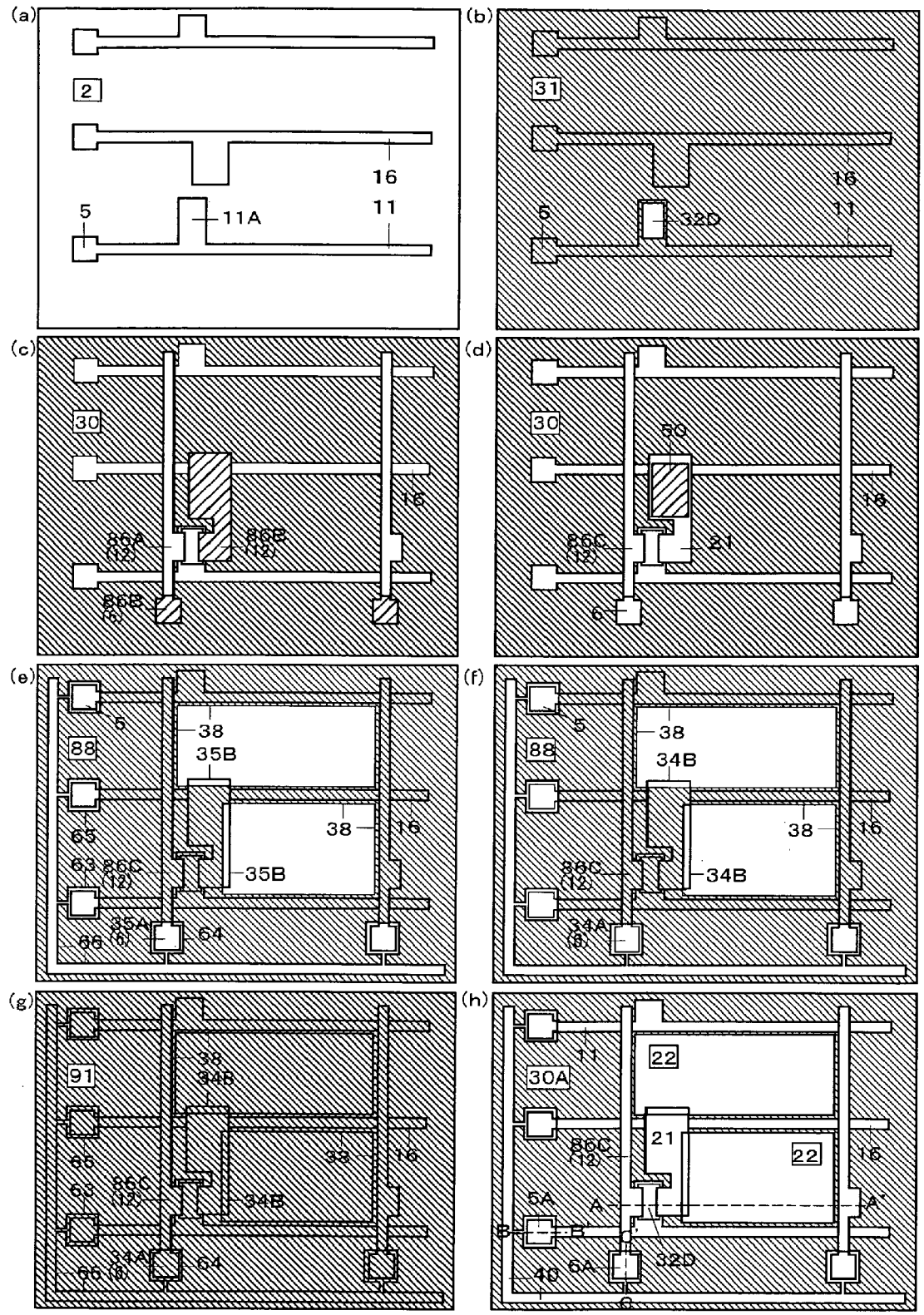
FIG. 9 is a plane view of the active substrate according to Embodiment 5 of the present invention.
Figure 10:
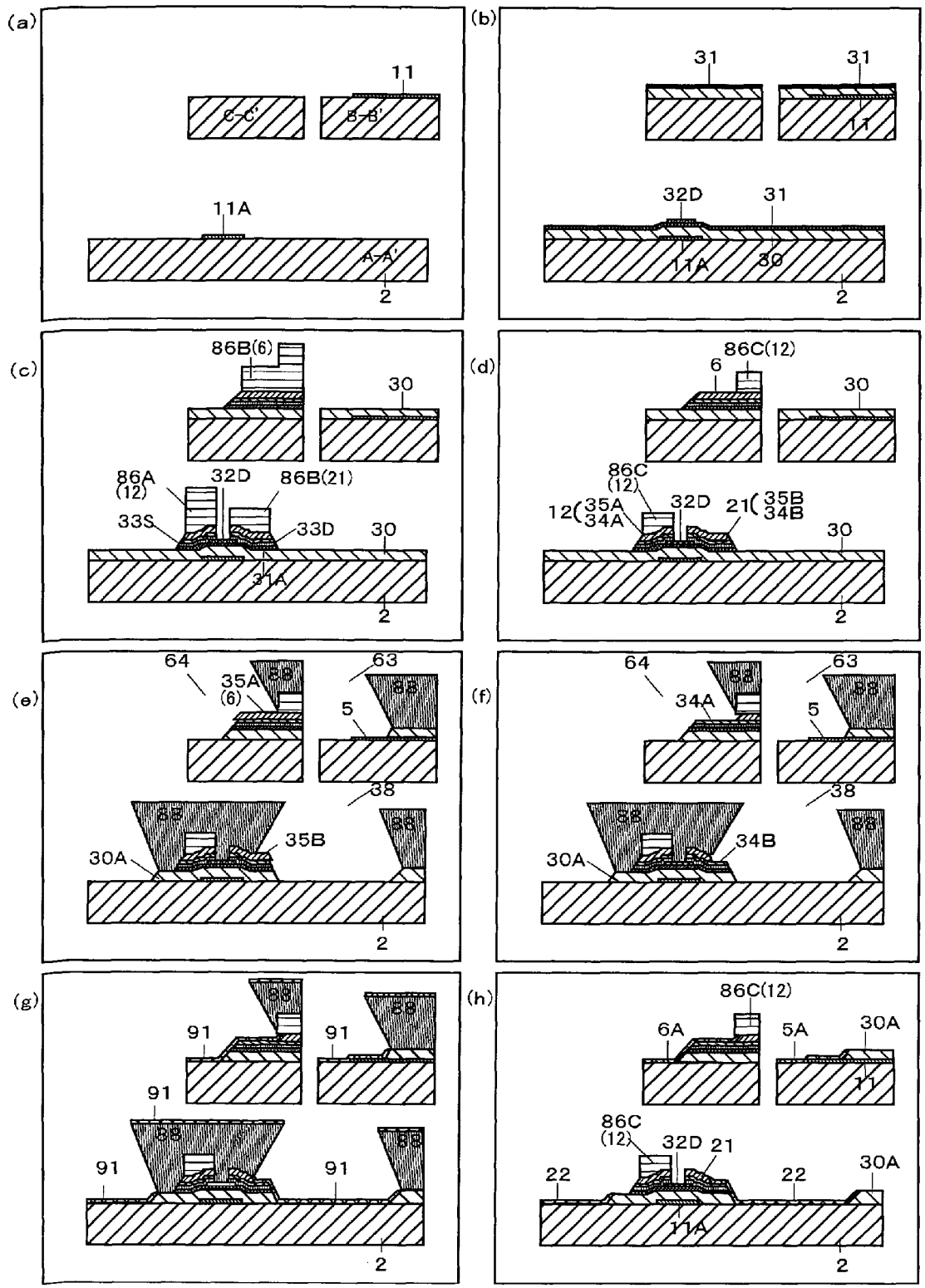
FIG. 10 is a cross sectional view of the manufacturing processes for the active substrate according to Embodiment 5 of the present invention.
Figure 11:
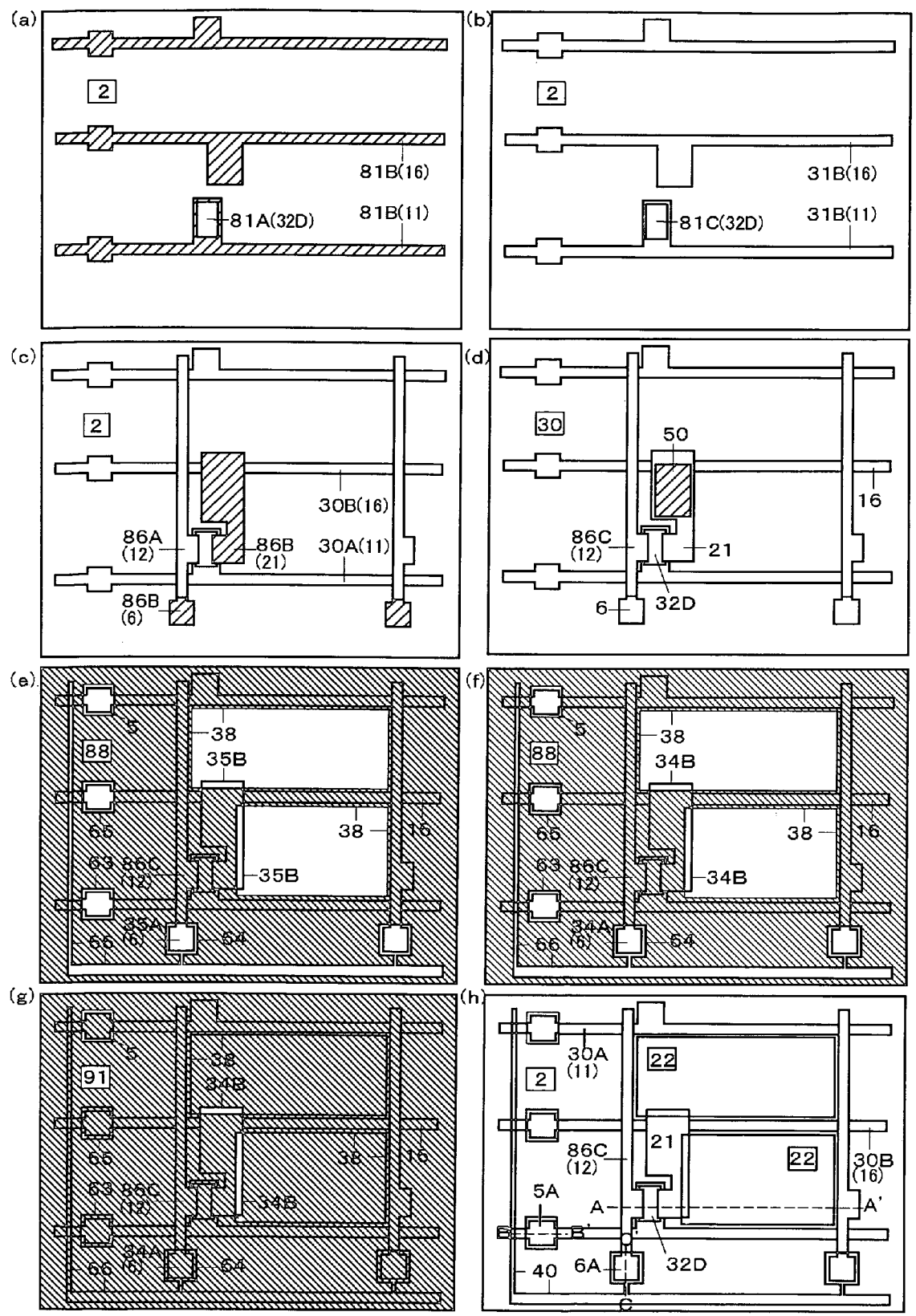
FIG. 11 is a plane view of the active substrate according to Embodiment 6 of the present invention.
Figure 12:
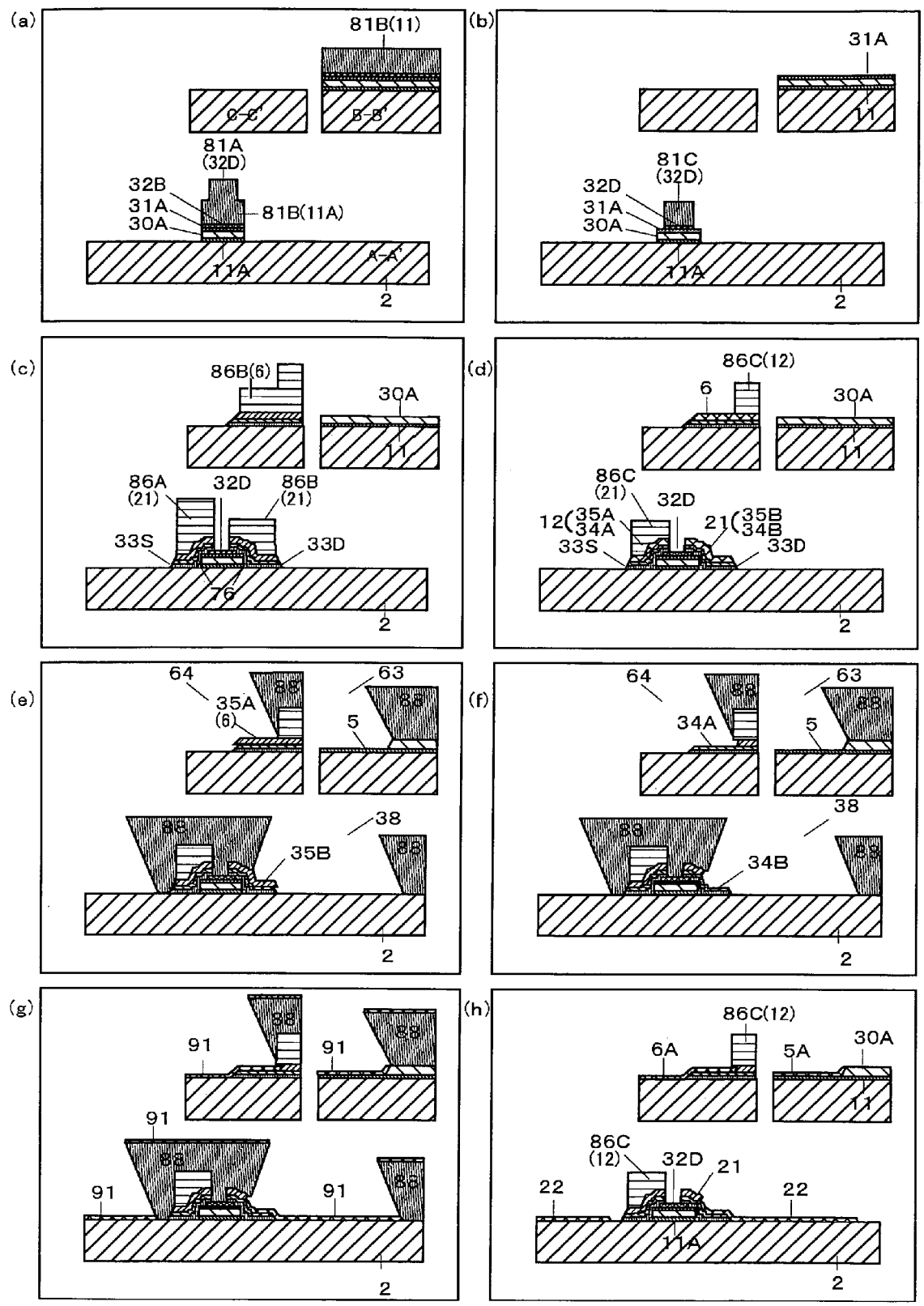
FIG. 12 is a cross sectional view of the manufacturing processes of the active substrate according to Embodiment 6 of the present invention.
Figure 16:
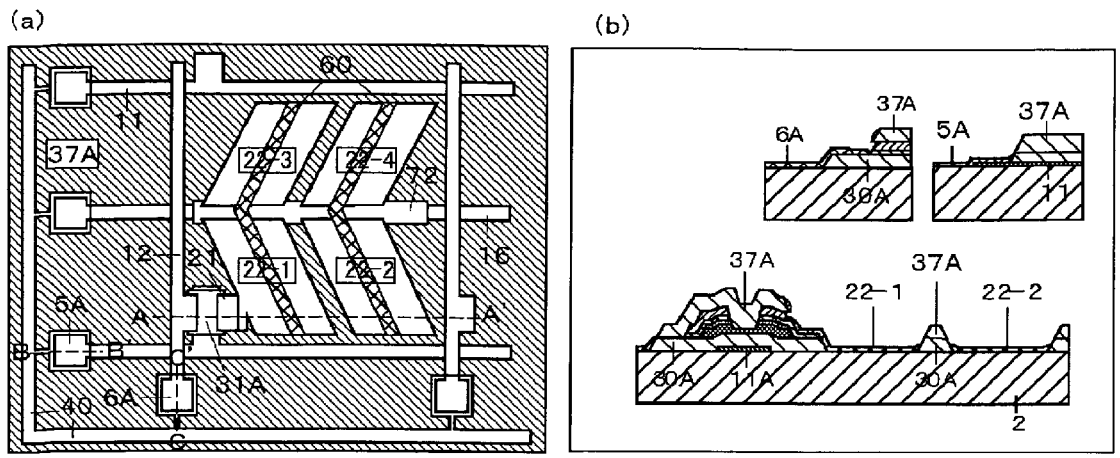
FIG. 16 is a plane view and a cross sectional view of the active substrate according to Embodiment 10 of the present invention.
Figure 17:
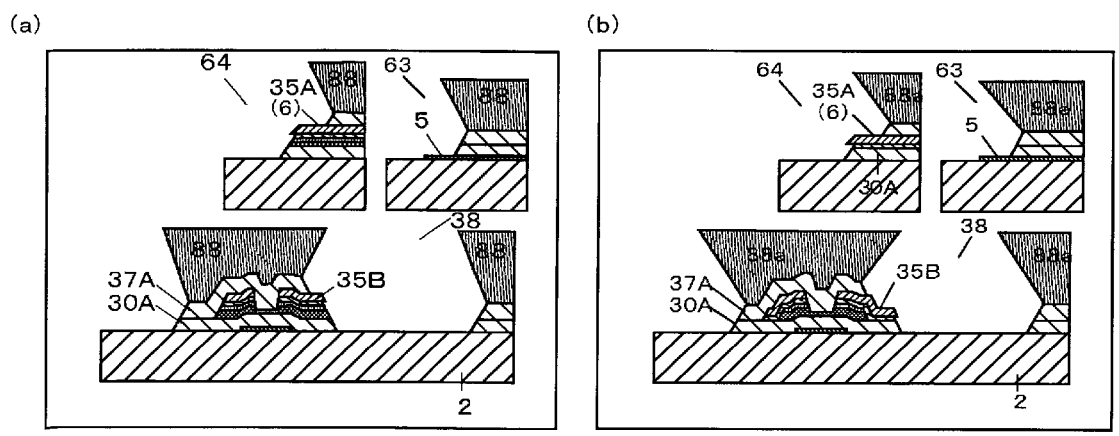
FIG. 17 is a cross sectional view of the manufacturing processes of the active substrate according to Embodiment 1 and Embodiment 10 of the present invention.
Figure 18:
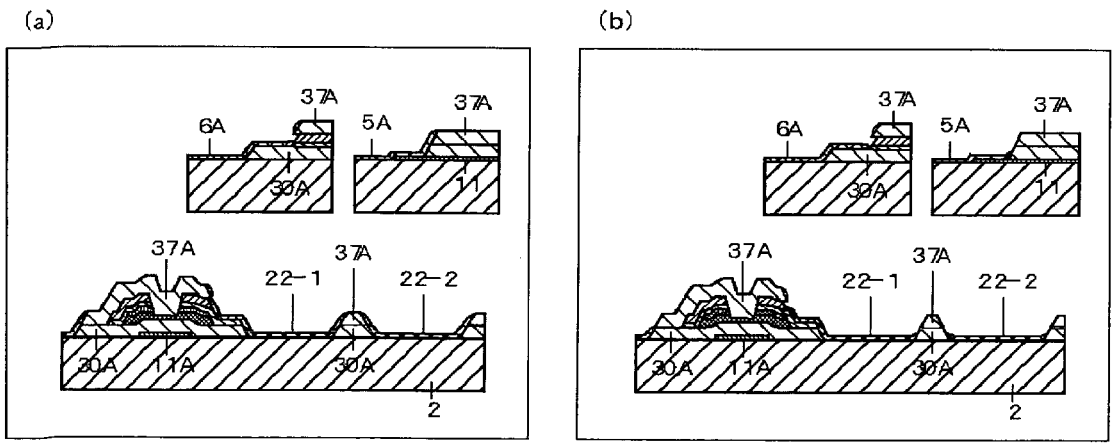
FIG. 18 is a cross sectional view of the manufacturing processes of the active substrate according to Embodiment 1 and Embodiment 10 of the present invention.
Figure 19:
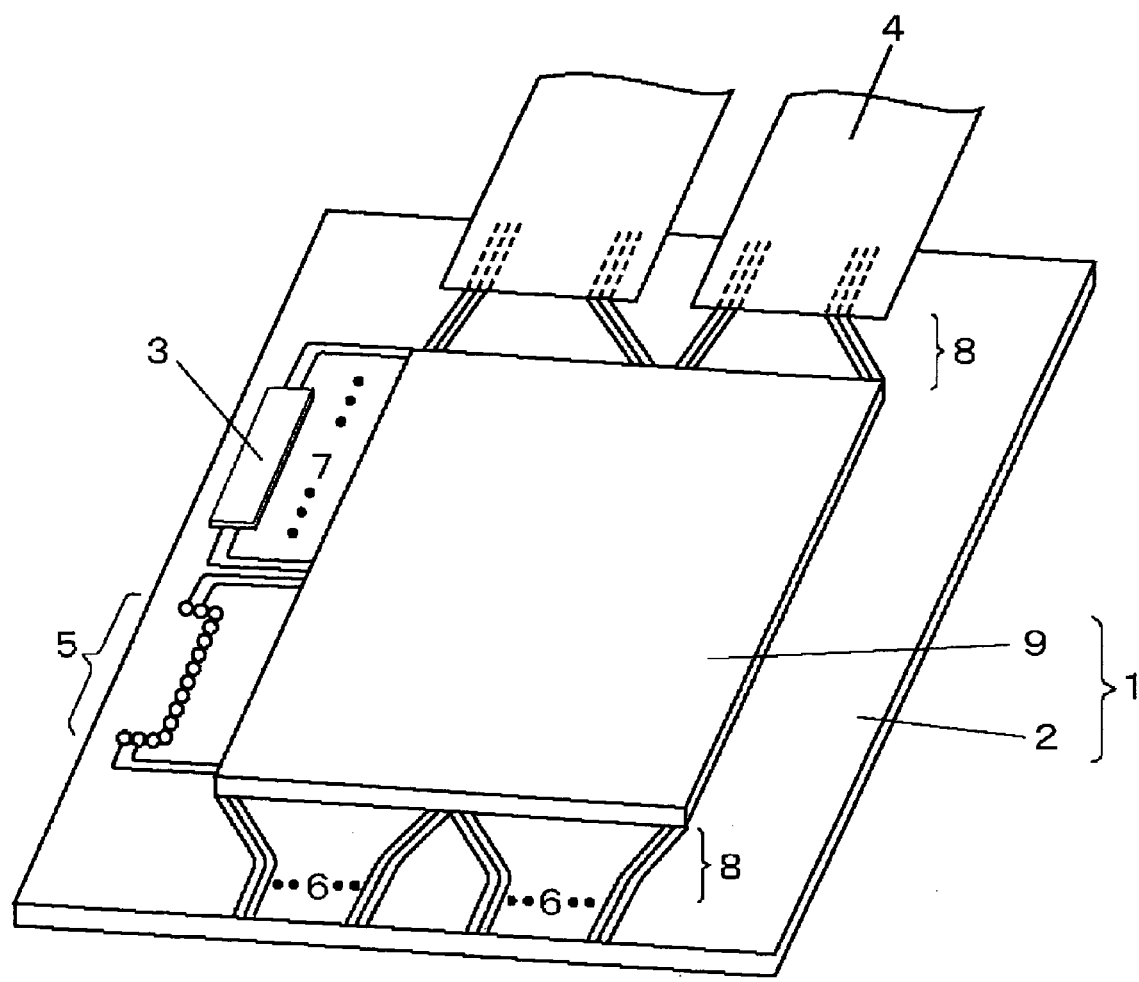
FIG. 19 is an oblique view of the assembled liquid crystal panel.
Figure 20:
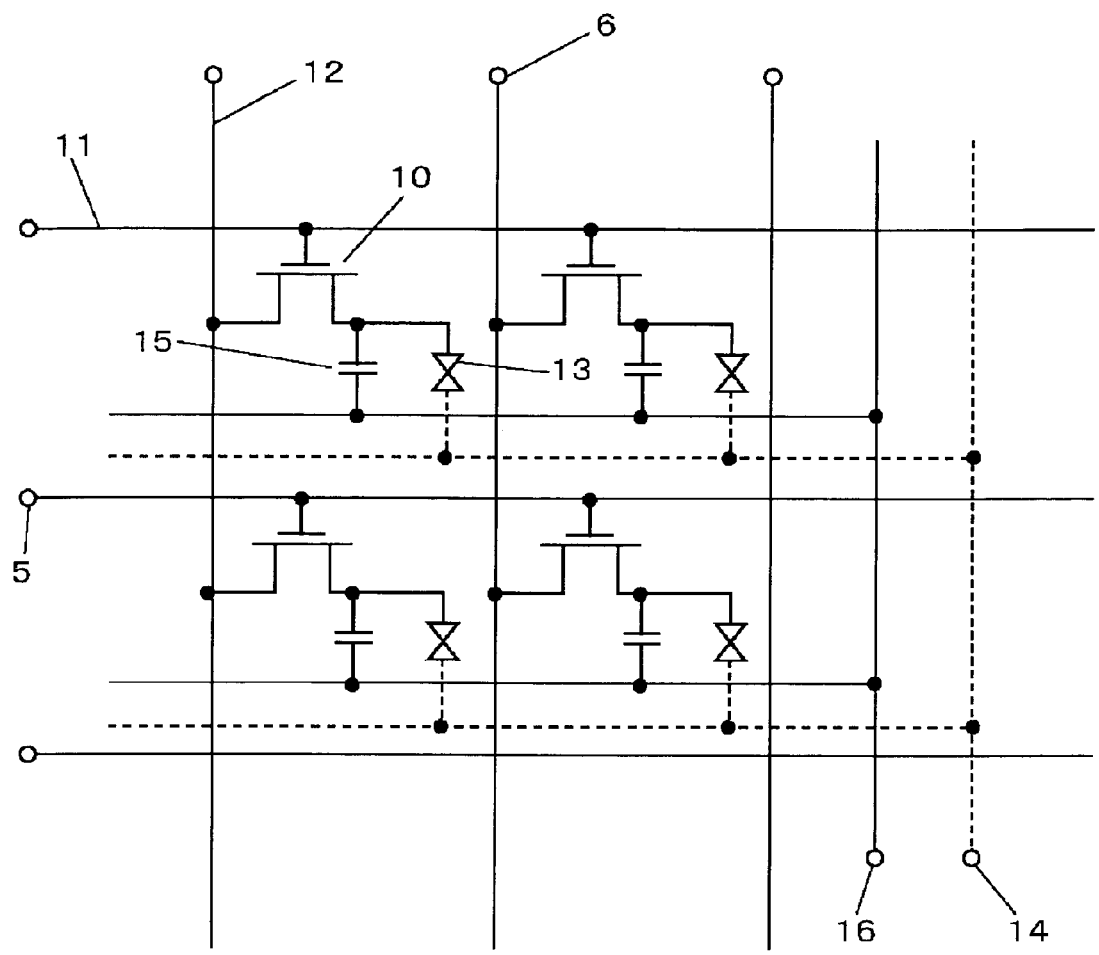
FIG. 20 is an equivalent circuit of the liquid crystal panel.
Figure 21:
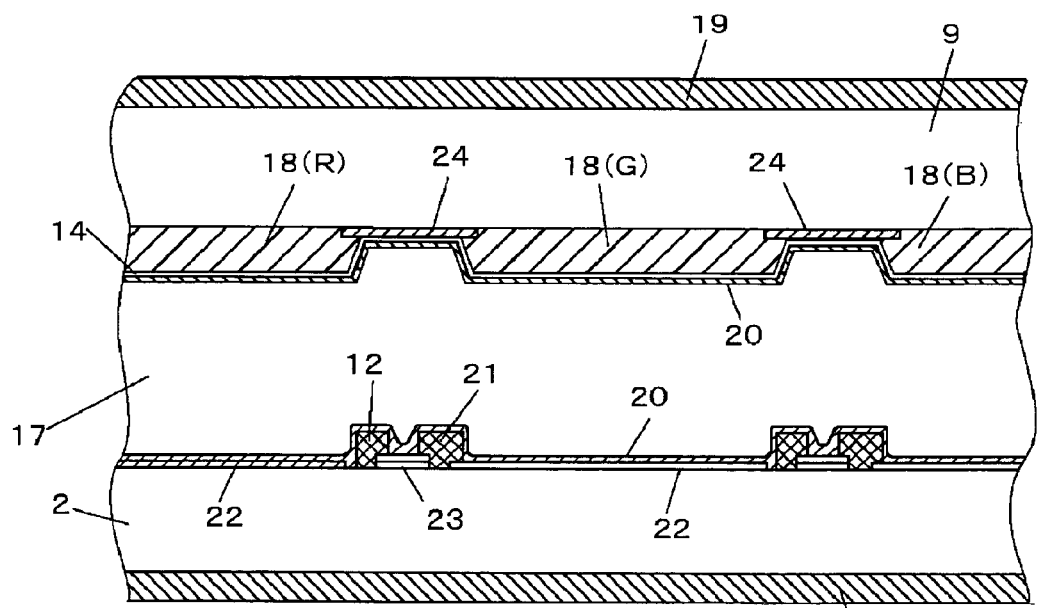
FIG. 21 is a cross sectional view of the conventional liquid crystal panel.
Figure 22:
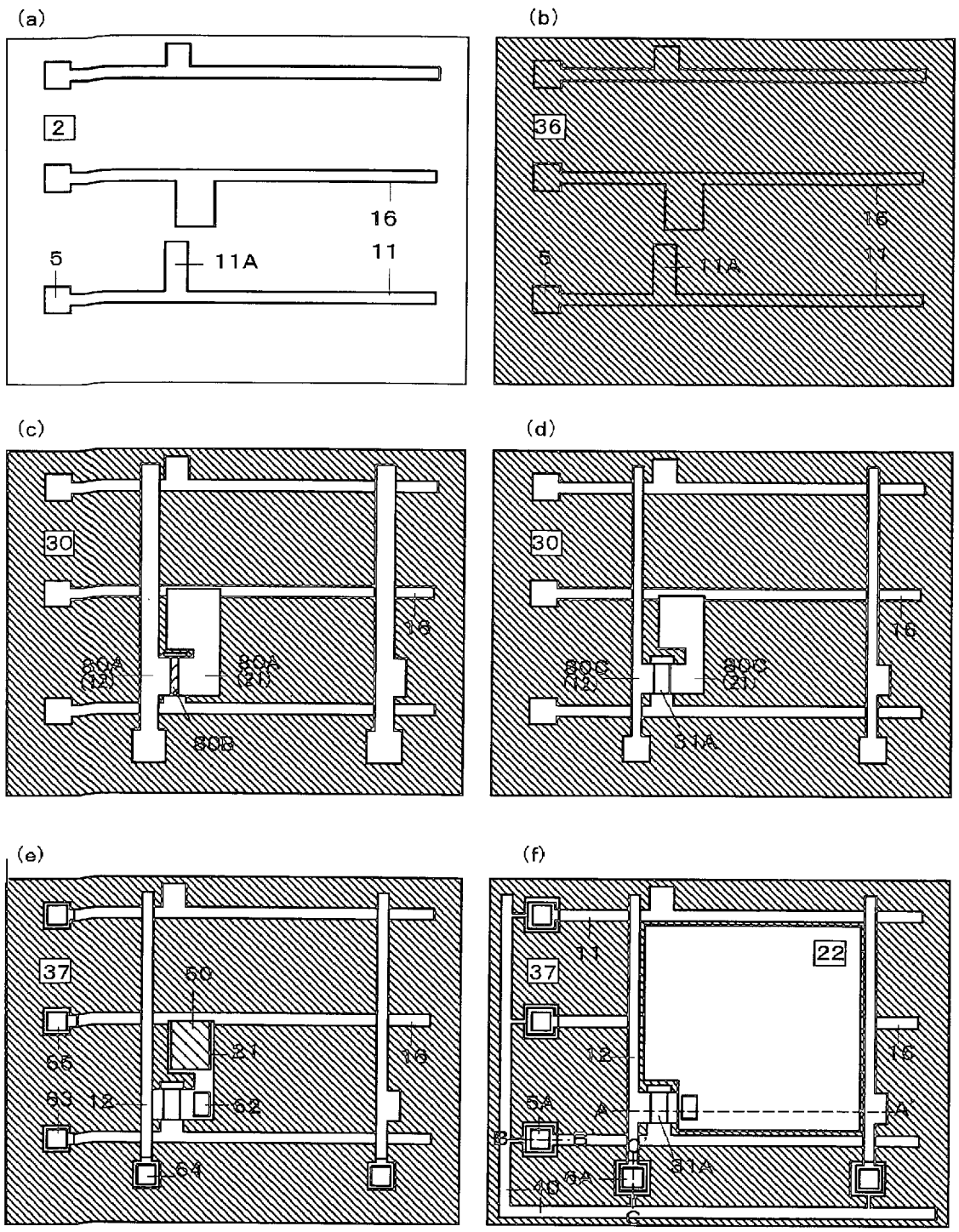
FIG. 22 is a plan view of the conventional active substrate.
Figure 23:
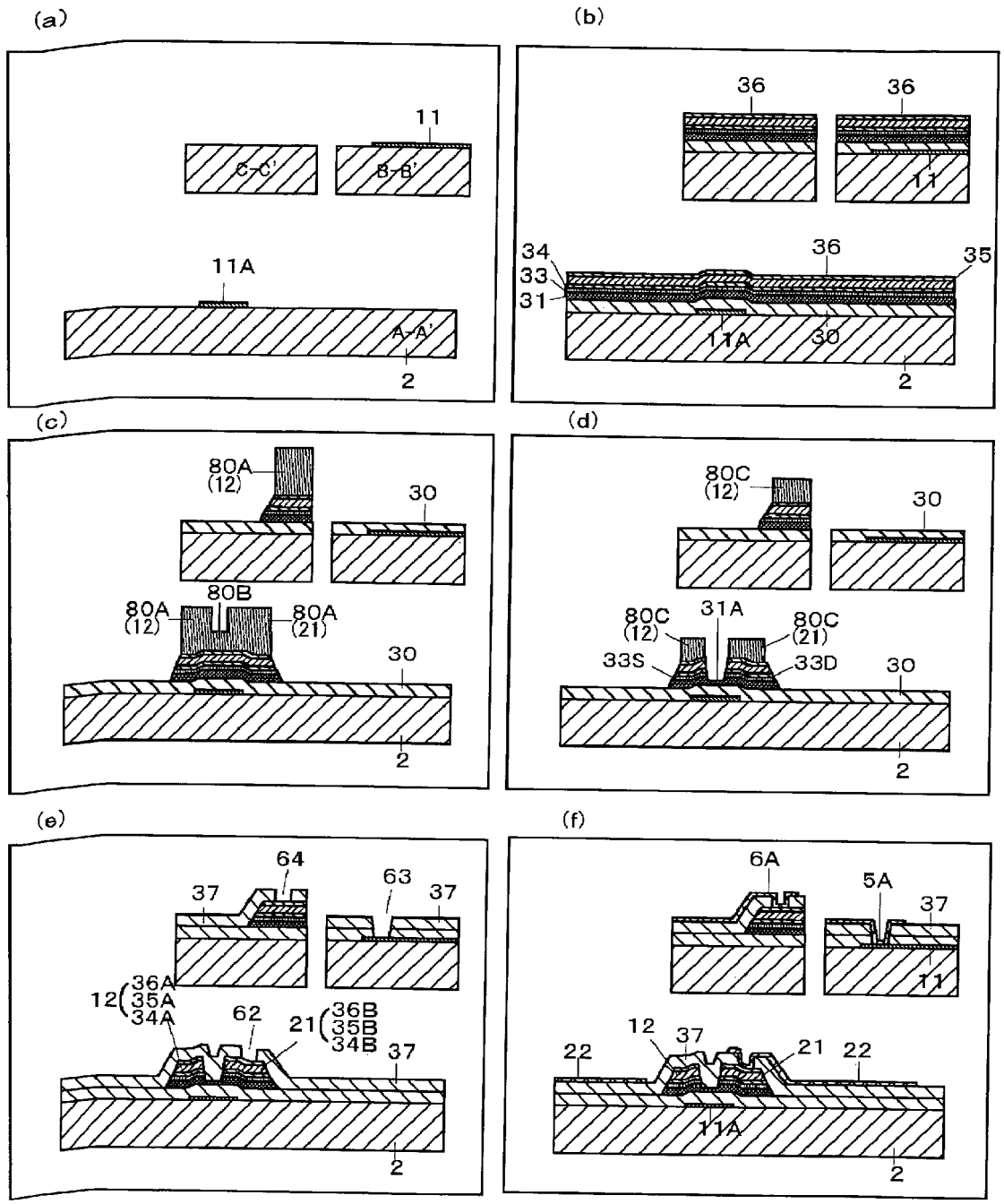
FIG. 23 is a cross sectional view of the manufacturing processes of the conventional active substrate.

The embodiments of this invention are explained, using FIGS. 1-18. FIG. 1 shows a plane view of an active substrate that is related to Embodiment 1, and FIG. 2 shows the cross sectional of manufacturing processes corresponding to A-A' line, B-B' line, and C-C' line of FIG. 1(g). Likewise, each plan view of active substrates and cross sectional view of manufacturing processes are shown as follows: Embodiment 2 shown in FIGS. 3 and 4, Embodiment 3 in FIGS. 5 and 6, Embodiment 4 in FIGS. 7 and 8, Embodiment 5 in FIGS. 9 and 10, Embodiment 6 in FIGS. 11 and 12, Embodiment 7 in FIG. 13, Embodiment 8 in FIG. 14, Embodiment 9 in FIG. 15, and Embodiment 10 in FIG. 16. In addition, FIGS. 17 and 18 are the cross sectional views of partial manufacturing processes of the active substrates. Please note that the parts that are the same as the conventional embodiments use the same symbols and do not have detailed descriptions.

Embodiment 1

As shown in FIG. 1(a) and FIG. 2(a), a first metal layer, such as Cr as an example of a metal layer with high heat-resistance, of approximately 0.1-0.3 μm in film thickness is deposited on a main surface of a glass substrate 2 of 0.5-1.1 mm in thickness using vacuum film-depositing equipment such as an SPT. Then, a gate electrode 11A functioning as a scan line 11, and a storage capacity line 16 are formed selectively using fine-processing technology. If Al is used as the material of the scan line, the scan line is preferably a laminate of Al and the heat-resistance metal layer thereunder to lower the resistance of the scan line. Otherwise, a laminate of suitable heat-resistant metal layer and Al alloy containing metal with high heat resistance (e.g. Ta, Nd, Hf, Ni etc.) can be used. The reasons are provided later.

Next, three kinds of thin film layers including a first silicon nitride (SiNx) layer 30 functioning as a gate insulating layer, a first amorphous silicon layer 31 containing no impurities and functioning as the channel of the insulating gate type transistor, and a second amorphous silicon layer 32 containing impurities and functioning as a source/drain electrode of the insulating gate type transistor, are deposited in sequence over the entire surface of the glass substrate 2 by using PCVD equipment with thicknesses of 0.3, 0.2, and 0.05 μm respectively for example. Subsequently, an island-shaped semiconductor layer composed of a laminate of the second amorphous silicon layer 33A and the first amorphous silicon layer 31A is formed on the gate electrode 11A by fine-processing technology and the width of the island-shaped semiconductor layer is smaller than that of the gate electrode 11A to expose the gate insulating layer 30 as shown in FIG. 1(b) and FIG. 2(b).

Then, a heat-resistant metal layer such as a $MoSi_2$ thin film layer 34 of about 0.1 μm in thickness, and a low-resistance metal layer such as an Al thin film layer 35 of about 0.3 μm in thickness are deposited in sequence by using vacuum-film-depositing equipment such as the SPT in the process of forming the source/drain wires. In this embodiment, the heat-resistant metal layer can be removed by the fluorinated etching gas used in the following process of forming openings. The heat-resistant metal layer used in this embodiment can be a metal with a high melting point such as Mo, W, Ta or the alloy thereof, or a silicide of a metal with a high melting point such as Cr, Ti, Mo, W, or Ta, for example. The material of the low-resistance metal layer is Cu preferably. Afterward, as shown in FIG. 1(c) and FIG. 2(c), the thin film layers described above are etched by fine-processing technology using a photosensitive resin pattern, and a source wire functioning as a data line 12, that is composed of a laminate of the heat-resistant metal layer 34A and the low-resistance metal layer 35A partially overlapping the gate electrode 11A, of the insulating gate type transistor, and a drain electrode 21, that is composed of a laminate of the heat-resistant metal layer 34B and the low-resistance metal layer 35B partially overlapping the gate electrode 11A, of the insulating gate type transistor, are selectively formed. Then, the second amorphous silicon layer 33A and the first amorphous silicon layer are etched in sequence by using the photosensitive resin pattern until the residual first amorphous silicon layer is 0.05-0.1 µm in thickness. Therefore, the source electrode 33S and the drain electrode 33D formed by the second amorphous silicon layer are separated.

After forming the source/drain wires 12 and 21, a transparent and insulating second SiNx layer functioning as a passivation insulating layer 37 is formed over the entire surface of the glass substrate 2 by the method of the conventional four-photomask process with a thickness of 0.3 µm. As shown in FIG. 1(d) and FIG. 2(d), a photosensitive resin 88 with a counter-taper cross section and of a pattern having openings 38, 63, 64, and 65 in a pixel-electrode-forming-region containing part of the drain wire 21, in part 5 of the scan line 11 outside the active area, in part 6 of the data line 12 outside the active area, and in part of the storage capacity lines 16 is formed. This photosensitive resin is a product of Tokyo Ohka Kogyo labeled as TELR-N101PM, for example. The photosensitive resin with a thickness of at least 1 µm is preferred. For this product formed with an counter-taper cross section in the electrode-forming process after forming the organic EL light emitting layer as manufacturing an organic EL display device, a chemical enhancement negative photosensitive resin is developed to separate the coated conductive thin film layer functioning as the electrode in the openings. The difference between the chemical enhancement negative photosensitive resin and the conventional positive photosensitive resin is that the chemical enhancement negative photosensitive resin has to be post-exposure-baked after exposure and before developing.

Subsequently, the passivation insulating layer 37 and the gate insulating layer in the openings are selectively removed by using the photosensitive resin pattern 88 as a mask, and the glass substrate 2 and the electrode are exposed at the same time. Generally, the passivation insulating layer 37 made from SiNx and the gate insulating layer 30 are removed by dry etching using the fluorinated gas, such as $CH_4$, $SF_6$, or the mixture thereof. The heat-resistant metal layers 34A and 34B can be etched by the fluorinated gas, but the Al and the Cu of the low-resistance metal layer cannot. As shown in FIG. 2(d), the low-resistance metal layer is functioning as a mask. The heat-resistant metal layer 34A and the gate insulating layer 30A under the low-resistance metal layer 35A, and the heat-resistant metal layer 34B and the gate insulating layer 30A under the low-resistance metal layer 35B is over-etched to result in side etching. Accordingly, the overhang appears at the periphery of the low-resistance metal layer 35A, and 35B exposed in the openings 64, and 38. However, the pixel electrode is cut off in the following process of forming the pixel electrode if the overhang continues to exist, and disconnections occur between the low-resistance metal layer 35A and the electrode terminal of the data line, and the low-resistance metal layer 35B and the pixel electrode. In addition, it is difficult to avoid the transparent conductive layer, such as ITO or IZO eliminating through reduction as the photoresist stripping treatment uses alkali-stripping solution and the material of the low-resistance metal layer 35A and 35B is Al.

As shown in FIG. 1(e) and FIG. 2(e), the overhang of the low-resistance metal layer 35A and 35B in the openings 34, and 38 is then removed to expose the heat-resistant metal layer 34A and 34B thereunder; and this is a key characteristic of the present invention. While removing the low-resistance metal layer 35A and 35B, the selectivity of the heat-resistant metal layer 34A and 34B is higher than that of the low-resistance metal layer 35A and 35B. Therefore, a phosphoric acid solution, an alkali sodium hydroxide (NaOH) solution, or an alkali potassium hydroxide (KOH) is used to remove the low-resistance metal layer 35 if the material of the low-resistance metal layer 35 is Al. Otherwise, an iron chloride solution ($FeCl_3$), or a copper chloride ($CuCl_2$) solution is used to remove the low-resistance metal layer 35 if the material of the low-resistance metal layer 35 is Cu. However, in Embodiments 2, 4, 5, and 6 (excepting Embodiments 1, and 3), the layer under the heat-resistant metal layer 34A, and 34B in the openings is the amorphous silicon layer, and the sodium hydroxide (NaOH) solution, or an alkali potassium hydroxide (KOH) therefore cannot be used in order to avoid the amorphous silicon layer being eliminated. As the material of the low-resistance metal layer 35 is Al and the material of the heat-resistant metal layer 34 is Mo, the phosphoric acid solution used to remove Al must have added thereto an additive of nitric acid to avoid the Mo from being eliminated. Moreover, it is necessary to increase the thickness of the Mo so as to offset the reduction thickness of the Mo. In view of the above, silicide or Ta is the material that can be used easily and without restriction. For example, Mo silicide ($MoSi_2$), like the amorphous silicon layer 31, and 33, can be dry-etched by the fluorinated gas or etched by an etching-solution of a fluoric acid containing a small amount of nitric acid. The Mo silicide ($MoSi_2$) is not a well-known conductive material in the region of the present TFT liquid crystal display device, but is used as a heat-resistant metal layer in the early TFT liquid crystal display device.

After espousing the heat-resistant metal layer 34A and 34B in the openings 64 and 38, a layer of ITO, IZO, or the mixture thereof functioning as the transparent conductive layer 91 of approximately 0.1 µm in film thickness is deposited on the glass substrate 2 using a vacuum film-depositing equipment such as an SPT, as shown in FIG. 1(f) and FIG. 2(f). Generally, if the thickness of the coated transparent conductive layer 91 is smaller than 0.1 µm, the transparent conductive layer 91 coated on the lateral side of the photosensitive resin pattern 88 is small due to its counter-tapers cross section.

The lateral side of the photosensitive resin pattern 88 is dissolved first as the photosensitive resin pattern 88 is removed by using a resist stripping solution or a specific organic solution. Accordingly, the transparent conductive layer 91 on the photosensitive resin pattern 88 is easy to strip, i.e. lift-off. As shown in FIG. 1(g) and FIG. 2(g), the pixel electrode 22 in the openings 38 containing a pixel-electrode-forming-region and part of the drain electrode made by heat-resistant metal layer 34 on the glass substrate, the electrode terminal 5A of the scan line in the opening 63 containing part 5 of the scan line, the electrode terminal 6A of the data line in the openings 64 containing part of the data line made by the heat-resistant metal layer 34A, and the electrode terminal of the storage capacity line (not labeled with a number) in the opening 65 containing part of the storage capacity line 16 are self-integrated at the same time, and the passivation insulating layer 37A on the glass substrate 2 is exposed. As a result, a complete active substrate is obtained. In addition, as the substrate is heated to improve the quality of the transparent conductive layer 91 and the heating temperature is over in the process of coating the transparent conductive layer 91, the photosensitive resin pattern 88 deteriorates and is hard to remove. Accordingly, the heating temperature of the substrate of 150° C. or below is preferred.

Finally, the liquid crystal panel of Embodiment 1 is completed by assembling the active substrate 2 and the color filter 9. As for the structure of the storage capacitance 15, a structural example of the storage electrode (a diagonal line going up to the right-hand side 50), is formed as the drain wire 21 and the storage capacity line 16 is overlapped on a flat surface through a gate insulating layer 30A. Another structural example of the storage electrode 15 is illustrated in Embodiment 2. In this embodiment, as with the conventional embodiments, a transparent conductive short circuit line 40 is formed in the opening 66 at the periphery of the active substrate 2. Moreover, stripes in the area between the electrodes 5A/6A and short circuit line 40 are formed to obtain high resistance that is necessary for measures to counter static electricity.

In addition, part 5 of the scan line and part of the storage capacity line 16 in the openings 63 and 65 are exposed after removing the passivation insulating layer 37 and the gate insulating layer 30. Therefore, the material of the scan line cannot use Al only. Usually, the scan line is a laminate of Al and the heat-resistant metal layer, such as Ti, or Cr. If the size of the opening 63 is smaller that of the part 5 of the scan line, the part 5 of the scan line, which is composed of an upper layer of a heat-resistant metal layer and a lower layer of Al, cannot be eliminated in the process of removing the low-resistance metal layer 35A and 35B made from Al because the heat-resistant metal layer is exposed in the opening 63. In this situation, the size of the part 5 of the scan line is decided by the size of the electrode terminal of the scan line. In another aspect, if the scan line 11 is made of one layer of Al (Ta) or Al (Nd) which is the aluminum alloy containing several percent (%) of Ta, or Nd with high heat-resistance, the aluminum alloy is eliminated while removing the Al thin film layer (i.e. the low-resistance metal layer 35A and 35B). For this reason, the scan line, as the source/drain wires 12 and 21, is composed of a lower layer of the heat-resistant metal layer and an upper layer of the Al alloy, and the electrode terminal containing part 5 of the scan line made by the heat-resistant metal layer is then formed so that the electric connection is ensured. With this structure, the size of the opening 63 is larger that the part 5 of the scan line. Compared with the conventional electrode line composed of three layers, the scan line 11, as the source/drain wires, composed of two layers is preferred, and the materials, the equipment, the facilities and the amount of equipment for manufacturing films are reduced. Therefore, the manufacturing cost can be reduced relative to the prior art.

In Embodiment 1, the opening 38, which corresponds to the storage capacity line 16, is divided into two parts due to the storage capacity line 16 crosscutting the pixel unit. Accordingly, the pixel electrode 22 is divided into two parts. As shown in FIG. 1(*d*), the drain electrode 21 is exposed in both parts of the openings 38, and overlaps part of the storage capacity line 16. Thus, the storage capacity 15 can be obtained without the need of the storage capacity line 16. The corresponding design is shown in Embodiment 2, in which the opening 38 and the pixel electrode 22 do not need to be divided.

In this embodiment, the active substrate can be obtained by using four photomasks for forming the scan line, islanding the semiconductor layer, forming the source/drain wires, and simultaneously forming the openings and the pixel electrode without using the halftone exposure technology. Therefore, with regard to the pattering process, the size management reaching a common level is allowed. In addition, the scan line and the data line can be a laminate of two layers so that the manufacturing cost can be reduced. The data line of a laminate of two layers is a characteristic described in all embodiments of the present invention.

As in the conventional four-mask process, islanding the semiconductor layer and forming the source/drain wires with one photomask by using the halftone exposure technology can further reduce the number of the manufacturing processes. The relative description is illustrated in Embodiment 2.

Embodiment 2

Figure 3:
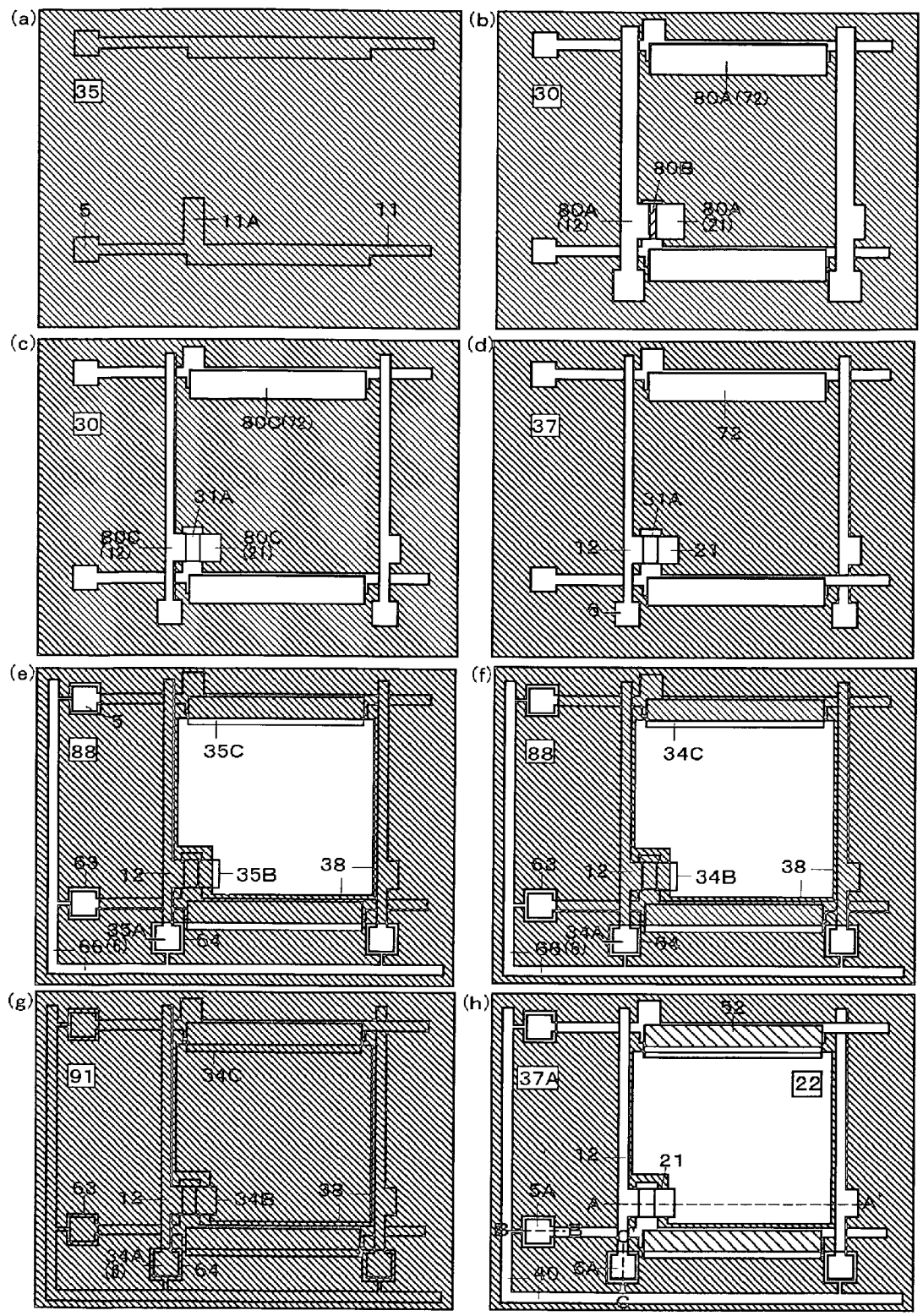
FIG. 3 is a plane view of the active substrate according to Embodiment 2 of the present invention.
Figure 4:
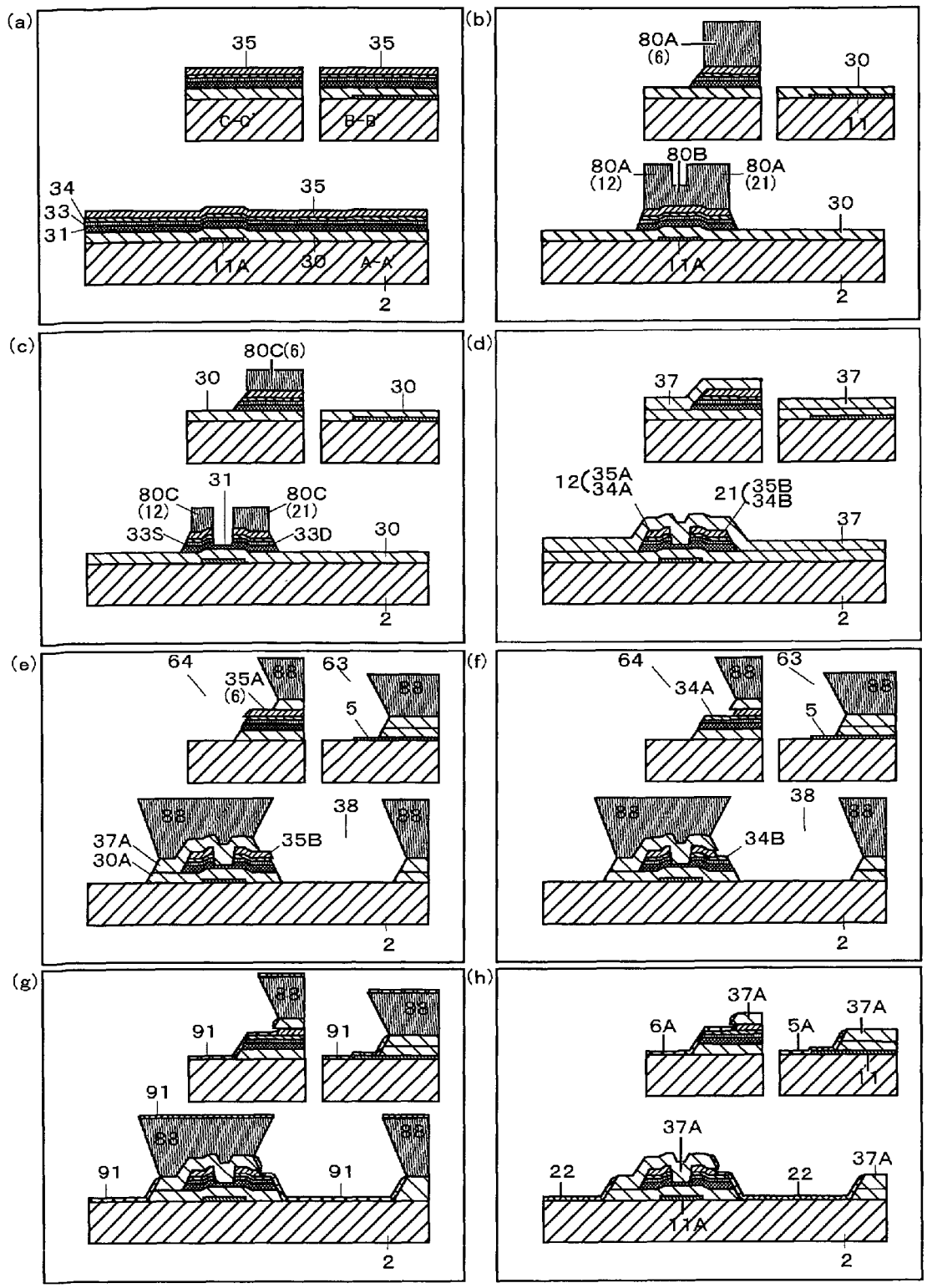
FIG. 4 is a cross section view of the manufacturing processes for the active substrate according to Embodiment 2 of the present invention.

As shown in FIG. 3(*d*) and FIG. 4(*d*), the manufacturing method of Embodiment 2 is similar to the conventional four-mask process until the passivation insulating layer 37 is coated except that the source/drain wires 12 and 21 are a laminate of the heat-resistant metal layer 34A, 34B and the low-resistance metal layer 35A, 35B. Besides, the storage capacity line 16 is not a necessary device in the array design. Thus, the storage electrode 72 is disposed on the scan line when the source/drain wires 12 and 21 are formed.

Then, as shown in FIG. 3(*e*) and FIG. 4(*e*), a photosensitive resin 88 with an counter-taper cross section and of a pattern having openings 38, 63, and 64 in the pixel-electrode-forming-region containing part of the drain electrode 21 and part of the storage electrode 72, the part 5 of the scan line 11 outside the active area, and the part 6 of the data line 12 outside the active area are formed. Afterwards, the passivation insulating layer 37 and the gate insulating layer 30 in the openings are removed to expose the glass substrate 2 and the aforementioned electrodes by using the photosensitive resin pattern 88 as a mask. Thus, part of the data line 12 in the opening 64 (i.e. the heat-resistant metal layer 34A that is disposed under the low-resistance metal layer 35A, the second amorphous silicon layer 33S, the first amorphous silicon layer 31A, and the gate insulating layer 30A in the opening 64), part of the drain wire 21 in the opening 38 (i.e. the heat-resistant metal layer 34B that is disposed under the low-resistance metal layer 35B, the second amorphous silicon layer 33D, the first amorphous silicon layer 31A, and the gate insulating layer 30A in the opening 38), and part of the storage electrode 72 in the opening 38 (i.e. the heat-resistant metal layer 34C that is disposed under the low-resistance metal layer 35C, the second amorphous silicon layer 33C (not shown in FIGs), the first amorphous silicon layer 31A, and the gate insulating layer 30A in the opening 38) are side etched due to over-etching. Accordingly, as in Embodiment 1, overhang appears at the peripheries of the low-resistance metal layer 35A, 35B, and 35C exposed in the openings 64 and 38.

Next, as in Embodiment 1, the low-resistance metal layer 35A, 35B, and 35C in the openings 64 and 38 is removed so as to eliminate the overhang simultaneously and to expose the heat-resistant metal layer 34A, 34B, and 34C thereunder as shown in FIG. 3(*f*) and FIG. 4(*f*).

As shown in FIG. 3(*g*) and FIG. 4(*g*), a transparent conductive layer 91, such as ITO, IZO, or the mixture thereof, of approximately 0.1 μm in film thickness is deposited on the glass substrate 2 using a vacuum film-depositing equipment such as an SPT after exposing the heat-resistant metal layer 34 in the opening 34A, 34B, and 34C.

Then, the photosensitive resin pattern 88 is removed by using the resist-stripping solution to lift off the transparent conductive layer 91 disposed thereon. Accordingly, as shown in FIG. 3(h) and FIG. 4(h), the pixel electrode 22 disposed on the glass substrate 2 in the opening 38 that is located in the pixel-electrode-forming-region containing the heat-resistant metal layer 34B of partial drain electrode 21 and the heat-resistant metal layer of the storage electrode 72, the electrode terminal 5A of the scan line in the opening 38 containing the part 5 of the scan line, and the electrode terminal 6A of data line in the opening 64 containing the heat-resistant metal layer 34A of the data line, are self-integrated and the passivation insulating layer 37A is exposed at the same time. As a result, the manufacturing of active substrate 2 is accomplished.

Finally, the active substrate 2 and the color filter 9 are assembled to complete the liquid crystal panel of Embodiment 2. As shown in FIG. 3(h), a structural example of the storage capacity 15 (a diagonal line going up to the right-hand side 52), which is formed as (the overhang of) the front section of the scan line and the storage electrode 72, which is a laminate of the low-resistance metal layer 35C and the heat-resistant metal layer 34C on the scan line, are overlapped on a flat surface through the gate insulating layer 30A, the first amorphous silicon layer 31E, and the second amorphous silicon layer 33E (not shown in FIGs). Accordingly, the pattern design of the Embodiment 1, in which the scan line 11 and the storage capacity line 14 are formed simultaneously, and this embodiment can be the same. In Embodiment 2, the insulating layer of the storage capacity 15 is composed of a laminate of the gate insulating layer and the first amorphous silicon layer 31E of 0.2 μm in thickness. Thus, to obtain the same storage capacity 15 as Embodiment 1, the area of the storage electrode 72 needs to be increased, and aperture ratio is accordingly decreased. In addition, the measures against static electricity of this embodiment are the same in Embodiment 1.

In this embodiment, the active substrate can be obtained by using three photomasks for forming the scan line, simultaneously forming the semiconductor layer and the source/drain wires through the halftone exposure technology, and simultaneously forming the openings and the pixel electrode. Therefore, the manufacturing cost can be largely reduced relative to the prior art. Moreover, as in Embodiment 1, the scan line and the data line can be a laminate of two layers. However, the pattern-size management of the source/drain wires must be strict due to the halftone exposure technology. As in the disclosure of Patent document 3 (Japanese Unexamined Patent Application Publication 2005-17669), the process of forming the scan line and the process of forming the semiconductor layer can be achieved by using one photomask or the active substrate can be manufactured by three photomasks through the halftone exposure technology. The relative description is illustrated in Embodiment 3.

Embodiment 3

At first, a first metal layer of 0.1-0.3 μm in thickness, a heat-resistant metal layer made by Cr for example, is deposited on a principal plane of a glass substrate 2 by using a vacuum film-depositing equipment such as the SPT. In Embodiment 3, as the insulating layer formed on the lateral side of the gate insulating layer is an organic insulating layer, the material of the scan line is not resisted. Besides, as the insulating layer formed on the lateral side of the gate insulating layer is an anode-oxidizing layer, the anode-oxidizing layer must has be insulating. In this embodiment, taking account of the high resistance of Ta metal and the poor heat-resistance of Al metal, the structure of the scan line can be a laminate of Ta/Al/Ta or Ta/Al(Ta, Zr, Nd) alloy to reduce the resistance of the scam line, wherein Ta can be replaced by metal silicide. Moreover, the Ta/Al(Ta, Zr, Nd) alloy can contain several percent (%) of Ta, Zr, or Nd to increase the heat-resistance of the alloy.

Next, three kinds of thin film layers including a first silicon nitride (SiNx) layer 30 functioning as a gate insulating layer, a first amorphous silicon layer 31 containing no impurities functioning as the channel of the insulating gate type transistor, and a second amorphous silicon layer 32 containing impurities functioning as a source/drain electrodes of the insulating gate type transistor, are deposited in sequence over the entire surface of the glass substrate 2 by using a PCVD equipment with thicknesses of 0.3, 0.2, and 0.05 μm respectively for example. Then, as shown in FIG. 5(a) and FIG. 5(b), a photosensitive resin pattern 88A of 2 μm in thickness on the semiconductor-forming-region 83A above the gate electrode 11A, and a photosensitive resin pattern 88B of 1 μm in thickness on the forming-region 83B(11) of the scan line 11 and the forming-region 83B(16) of the storage capacity line 16 are formed simultaneously by halftone exposure technology, see the patent document 3 in detail. Subsequently, the second amorphous silicon layer 33, the first amorphous silicon layer 31, the gate insulating layer 30, and the first metal layer are selectively removed to expose the glass substrate 2 by using the photosensitive resin pattern 83A and 83B as a mask. In this embodiment, the pattern-width of the scan line 11 is 10 μm at least due to the resistance thereof. Thus, the manufacture and the performed size-management of the photomask used to form the region 83B (the middle-color-tone region or the gray region) are easy.

Next, the photosensitive resin patterns 83A and 83B are reduced in film thickness by 1 μm or more by ashing methods such as oxygen plasma to eliminate the photosensitive resin patterns 82B, expose the second amorphous silicon layer 33B (not shown in figures) and 33C simultaneously, and leaving photosensitive resin patterns 83C whose thickness is reduced in the semiconductor-forming-region. In this embodiment, Since the pattern width of the photosensitive resin pattern 83C (black region), i.e. the semiconductor-layer-region, is the total of the distance between the source/drain wires and mask overlaying accuracy, the width would be 10-12 μm when the distance between the source-drain wires is 4-6 μm and the overlaying accuracy is ±3 μm. Therefore, this dimension is not very accurate. However, the resist pattern is reduced in thickness isotropically by 1 μm when resist patterns 83A are converted to 83C. Thus, not only the dimension would be 2 μm smaller but also the mask overlaying accuracy during the formation of the source/drain wires would be ±2 μm by reducing 1 μm in accuracy, and effects of the latter is bigger than the former during the process. Therefore, it is preferable to strengthen anisotropy in order to regulate the pattern dimension's changes in the oxygen plasma treatment such as RIE, and furthermore, ICP and TCP that has a plasma source with higher density is preferred. Otherwise, the treatment of increasing the designed-dimension of the resist patterns 83A according the estimation of the changing-amount of the resist-pattern dimension, or of consulting the exposure and developing conditions of corresponding process to increase the pattern-dimension of the resist-pattern is also preferred.

Afterwards, as shown in FIG. 5(b) and FIG. 6(b), a semiconductor-layer-region composed of a laminate of the second amorphous silicon layer 33A and the first amorphous silicon layer 31A on the gate electrode 11A is formed by using the photosensitive resin pattern 83C whose thickness is reduced as a mask. Thus, the gate insulating layer 30A on the scan line 11 and the gate insulating layer 30B on the storage capacity line 16 are exposed.

After removing the photosensitive resin pattern 83C, an insulating layer 76 is formed on the lateral side of the scan line 11 and the storage capacity line 16 (not shown in figures). The anode-oxidizing is done by applying a plus (+) electric potential to the aforementioned electrode lines and immersing the glass substrate 2 in a chemical solution mainly containing ethylene glycol. For example, the electrode line of a laminate of Ta and Al alloy can convert to a laminate of tantalum oxide ($Ta_2O_5$) and aluminum oxide ($Al_2O_3$) with 0.3 μm thickness by applying a voltage of 200V. As the electric-deposition condition disclosed in [Not Patent document 1], November 2002 issue of one monthly publication of "polymer processing", a polyimide resin layer of 0.3 μm in thickness is formed by using an electric-deposition solution of polyimide having pendant carboxyl group and applying several voltage. In addition, by forming the insulating layer 76, the pin-holes formed in the gate insulating layer 30A and 30B are immersed in the insulating layer of aluminum oxide or polyimide resin. Thus, short occurred between scan line 11, the storage capacity line 16, and the data line 12 can be prevented.

Next, a heat-resistant metal layer, such as a thin film layer 34 of $MoSi_2$, of approximately 0.1 μm in film thickness and a low-resistance metal layer, such as a thin film layer 35 of Al, of approximately 0.3 μm in film thickness are deposited by using a vacuum film-depositing equipment such as an SPT in the process of forming the source/drain wires. Subsequently, as shown in FIG. 5(c) and FIG. 6(c), the thin film layers are etched in sequence by using fine-processing technology with the photosensitive resin pattern. Thus, the data line 12 functioning as the source wire of the insulating gate type transistor composed of a laminate of the heat-resistant metal layer 34A and the low-resistance metal layer 35A partially overlapping the gate electrode 11A, and the drain wire 21 of the insulating gate type transistor composed of a laminate of the heat-resistant metal layer 34B and the low-resistance metal layer 35B partially overlapping the gate electrode 11A are selectively formed. At the same time, by using the photosensitive resin pattern as a mask, the second amorphous silicon layer 33A and the first amorphous silicon layer 31A are etched in sequence until the first amorphous silicon layer 31A remains a thickness of 0.05-0.1 μm. Accordingly, the source electrode 33S and the drain electrode 33D made by the second amorphous silicon layer are separated.

As Embodiment 1, after forming the source/drain wires 12 and 21, a transparent and insulating second SiNx layer functioning as a passivation insulating layer 37 and of 0.3 μm in thickness is formed over the entire surface of the glass substrate 2. Then, as shown in FIG. 5(d) and FIG. 6(d), a photosensitive resin 88 with a anti-taper cross section and of a pattern having openings 38, 63, 64, and 65 in a pixel-electrode-forming-region containing part of the drain wire 21, in the part 5 of the scan line 11 outside the active area, and in the part 6 of the data line 12 outside the active area on a passivation insulating layer after the passivation insulating layer is formed. Subsequently, by using the photosensitive resin pattern 88 as a mask, the passivation insulating layer 37 and the gate insulating layer 30A in the openings 63 and 65, and the passivation insulating layer 37 in the openings 38 and 64 are selectively removed. Thus, the part 5 of the scan line 11, part of the storage capacity line 16, part of the drain wire 21, the glass substrate 2, and the part 6 of the data line 12 are exposed. At this time, the low-resistance metal layer 35A and 35B is functioning as a mask, and the heat-resistant metal layer 34A under the low-resistance metal layer 35A and the heat-resistant metal layer 34B under the low-resistance metal layer 35B are side etched. As a result, overhang are formed at the periphery of the low-resistance metal layer 35A that are exposed in the openings 64 and 38.

Then, as shown in FIGS. 5(e) and 6(e), the low-resistance metal layer 35A and 35B in the openings 64 and 38 are removed to eliminate the overhang and to expose the heat-resistant metal layer 34A and 34B thereunder.

After exposing the heat-resistant metal layer 34A and 34B in the openings 64 and 38, as shown in FIG. 5(f) and FIG. 6(f), a layer of ITO, IZO, or the mixture thereof functioning as the transparent conductive layer 91 of approximately 0.1 μm in film thickness is deposited on the glass substrate 2 using a vacuum film-depositing equipment such as an SPT.

Next, the photosensitive resin pattern 88 is removed to lift off the transparent conductive layer 91 by using a resist-stripping solution. Subsequently, as shown in FIG. 5(g) and FIG. 6(g), the pixel electrode 22 in the openings 38 containing a pixel-electrode-forming-region and part of the drain electrode made by heat-resistant metal layer 34 on the glass substrate, the electrode terminal 5A of the scan line in the opening 63 containing part 5 of the scan line, the electrode terminal 6A of the data line in the openings 64 containing part of the data line made by the heat-resistant metal layer 34A, and the electrode terminal of the storage capacity line (not labeled with a number) in the opening 65 containing part of the storage capacity line 16 are self-integrated, and at the same time, the passivation insulating layer 37A on the glass substrate 2 is exposed. Then, a complete active substrate is obtained.

The liquid crystal panel of Embodiment 3 is completed by assembling the active substrate 2 and the color filter 9. In this embodiment, the structure of the storage capacity 15 is the same as the Embodiment 1, the electrode lines extends to the outer-periphery of the active substrate 2 in order to form the insulating layer on the lateral sides of the scan line 11 and the storage capacity line 16, and the short-circuit line 40 cause short circuit between the outer-periphery of the active substrate 2 and the electrode lines. Therefore, the thin pattern used to connect the electrode terminal 5A of the scan line and the short-circuit line 40 is useless. In this embodiment, the pattern-width of the short-circuit line 40, which is located near the scan line, is reduced to obtain high resistance for measures against static electricity.

When the etching-stop insulating gate type transistor which having a protective insulating layer on its channel is used, openings and pixel electrodes can formed simultaneously as illustrate in Embodiment 4 to Embodiment 6. When the low-resistance metal layer used as the material of the source/drain wires is Cu, the protective insulating layer can prevent the channel from being polluted by the etching-solution for etching Cu due to its fine ability to protective the channel.

Embodiment 4

At first, a first metal layer, such as Cr as an example of an metal layer with high heat-resistance, of approximately 0.1-0.3 μm in film thickness is deposited on a main surface of a glass substrate 2 using a vacuum film-depositing equipment such as an SPT. Then, as shown in FIG. 7(a) and FIG. 8(a), a gate electrodes 11A functioning as a scan line 11, and a storage capacity line 16 are formed selectively using fine-processing technology. As the description illustrate above, the scan line is a laminate of a heat-resistant metal layer and Al alloy. Besides, as Embodiment 2, storage capacity line 16 in the pattern design of this embodiment is not needed.

Next, three kinds of thin film layers including a first SiNx layer 30 functioning as a gate insulating layer, a first amorphous silicon layer 31 containing no impurities functioning as the channel of the insulating gate type transistor, and a second SiNx layer functioning as a insulating layer for protecting the channel, are deposited in sequence over the entire surface of the glass substrate 2 by using a PCVD equipment with thicknesses of 0.3, 0.05, and 0.1 µm respectively for example. Afterwards, the second SiNx layer is treated by fine-processing technology. Accordingly, as shown in FIG. 7(b) and FIG. 8(b), the width of the remained second SiNx layer functioning as the protective insulating layer 32D (the etching-stop layer or the channel-protective layer) is thinner than that of the gate electrode 11A, and the first amorphous silicon layer 31 is exposed.

Subsequently, a second amorphous silicon layer 32 containing impurities such as phosphorous is deposited with thicknesses of 0.05 µm over the entire surface of the glass substrate 2 by using the PCVD equipment. Subsequently, a heat-resistant metal layer such as a Mo silicide thin film layer 34 of about 0.1 µm in thickness, a low-resistance metal layer such as an Al thin film layer 35 of about 0.3 µm in thickness are deposited in sequence by using a vacuum-film-depositing equipment such as the SPT. Then, as shown in FIG. 7(c) and FIG. 8(c), by the fine-processing technology using a photosensitive resin pattern, a source wire functioning as a data line 12 of the insulating-gate type transistor composed of a laminate of the heat-resistant metal layer 34A and the low-resistance metal layer 35A partially overlapping the protective insulating layer 32D, and a drain wire 21 of the insulating-gate type transistor composed of a laminate of the heat-resistant metal layer 34B and the low-resistance metal layer 35B partially overlapping the protective insulating layer 32D are selectively formed. At this time, the source electrode 33S an the drain electrode 33D of the second amorphous silicon layer 33 are separated.

In this embodiment, the Mo silicide, as the amorphous silicon layer 31 and 33, can be dry-etched by the fluorinated gas. Therefore, after removing the Al thin film layer 35 by using the photosensitive resin pattern as a mask, the Mo silicide thin film layer and the second amorphous silicon layer 33 in the region between the source/drain wires 12 and 21 are removed to expose the protective insulating layer 32D, and the first amorphous silicon layer 31 in other region are removed to expose the gate insulating layer 30. The insulating gate type transistor manufactured by this method is called the etching-stop insulating gate type transistor, for the etching of the second amorphous silicon layer 33 is automatically completed in an environment where the secondary SiNx layer 32D exists.

After forming the source/drain wire 12 and 21, as Embodiment 2, a transparent and insulating second SiNx layer functioning as a passivation insulating layer 37 is formed with a thickness of about 0.3 µm over the entire surface of the glass substrate 2. Next, as shown in FIG. 7(d) and FIG. 8(d), a photosensitive resin 88 with a anti-taper cross section and of a pattern having openings 38, 63, 64, and 65 in a pixel-electrode-forming-region containing part of the drain wire 21, in part 5 of the scan line 11 outside the active area, in part 6 of the data line 12 outside the active area, and in part of the storage capacity lines 16 is formed. Subsequently, the passivation insulating layer 37 and the gate insulating layer 30 in the openings are selectively removed by using the photosensitive resin pattern 88 as a mask, and the glass substrate 2 and the aforementioned electrodes are exposed simultaneously. At this time, as Embodiment 2, the heat-resistant metal layer 34A, the second amorphous silicon layer 33S, the first amorphous silicon layer 31A, and the gate insulating layer 30A under the low-resistance metal layer 35A of partial data line in the opening 64, and the heat-resistant metal layer 34B, the second amorphous silicon layer 33D, the first amorphous silicon layer 31A, and the gate insulating layer 30A under the low-resistance metal layer 35B of partial drain wire in the opening 38 are over-etched to result in side etching. Accordingly, overhang appears at the periphery of the low-resistance metal layer 35A and 35B exposed in the openings 64 and 38.

Then, as shown in FIG. 7(e) and FIG. 8(e), the low-resistance metal layer 35A and 35B is removed to eliminate to the overhang and to expose the heat-resistant metal layer 34A and 34B thereunder.

After exposing the heat-resistant metal layer 34A and 34B in the openings 64 and 38, as shown in FIGS. 7(f) and 8(f), a layer of ITO, IZO, or the mixture thereof functioning as the transparent conductive layer 91 of approximately 0.1 µm in film thickness is deposited on the glass substrate 2 using a vacuum film-depositing equipment such as an SPT.

Next, the photosensitive resin pattern 88 is removed by using the resist-stripping solution to lift off the transparent conductive layer 91. Subsequently, as shown in FIG. 7(g) and FIG. 8(g), the pixel electrode 22 in the openings 38 containing a pixel-electrode-forming-region and part of the drain wire 21 made by the heat-resistant metal layer 34B on the glass substrate 2, the electrode terminal 5A of the scan line in the opening 63 containing part 5 of the scan line, the electrode terminal 6A of the data line in the openings 64 containing part of the data line made by the heat-resistant metal layer 34A, and the electrode terminal of the storage capacity line (not labeled with a number) in the opening 65 containing part of the storage capacity line 16 are all self-integrated at the same time, and the passivation insulating layer 37A on the glass substrate 2 is exposed. As a result, a complete active substrate 2 is obtained.

The liquid crystal panel of Embodiment 4 is completed by assembling the active substrate 2 and a color filter 9. In this embodiment, as shown in FIG. 7(c), an example of the storage capacity 15 (a diagonal line going up to the right-hand side 50) is formed by overlapping the drain wire 21 and the storage capacity line 16 on a flat surface through the gate insulating layer 30, the first amorphous silicon layer 31E, and the second amorphous silicon layer 33E (all not shown in figures). The storage capacity 15 of this embodiment is similar to that of Embodiment 2 except the difference of film thickness of the first amorphous silicon layer 31E. However, in Embodiment 2, the storage capacity 15 contains the front part of the scan line 11 and the storage electrode 22 that connects the pixel electrode 22 (drain wire 21). Additionally, the measures against static electricity of this embodiment are the same as that of Embodiment 1.

In this embodiment, the active substrate can be obtained by using four photomasks for forming the scan line, forming the protective insulating layer, forming the source/drain wires, and simultaneously forming the openings and the pixel electrode without using the halftone exposure technology. Therefore, the size management of every patterning process allows reaching a common level.

The passivation insulating layer 37 made by SiNx is used to protect the active substrate 2. Theoretically, the passivation insulating layer 37 protects at least the channel of the insulating gate type transistor and the data line 12, but has no need to protect the drain wire 21. The reason is that the driving signals that are applied to the liquid crystal cells are essentially alternating currents. The voltage of opposing electrode 14 is adjusted (flicker reduction adjustment) at the time of image testing in order to reduce the direct current components between the opposing electrode 14 and pixel electrodes 22. Therefore, insulating layers are required only on the data lines 12 to prevent direct current components from flowing. Accordingly, the active substrate using the etching-stop insulating gate type transistor, of which the protective insulating layer is formed on the channel, can change the passivation insulating layer 37 into a passivation of a new configuration. Thus, the manufacturing cost could be reduced.

Embodiment 5

In embodiment 5, through the same manufacturing processes of embodiment 4, the second SiNx layer functioning as a protective insulating layer 32D and formed above the gate electrode 11A is processed by fine-processing technology until the width of the second SiNx layer is smaller than that of the gate electrode 11A and the first amorphous silicon layer 31 is exposed, as shown in FIG. 9(b) and FIG. 10(b).

Subsequently, a second amorphous silicon layer 32 containing impurities such as phosphorous is deposited with thicknesses of 0.05 μm over the entire surface of the glass substrate 2 by using the PCVD equipment. Then, a heat-resistant metal layer such as a Mo silicide thin film layer 34 of about 0.1 μm in thickness, and a low-resistance metal layer such as an Al thin film layer 35 of about 0.3 μm in thickness are deposited in sequence by using a vacuum-film-depositing equipment such as the SPT. Next, as shown in FIG. 9(c) and FIG. 10(c), by fine-processing technology using a photosensitive organic insulating layer pattern 86A, 86B, a source wire functioning as a data line 12 of the insulating-gate type transistor composed of a laminate of the heat-resistant metal layer 34A and the low-resistance metal layer 35A partially overlapping the protective insulating layer 32D, and a drain wire 21 of the insulating-gate type transistor composed of a laminate of the heat-resistant metal layer 34B and the low-resistance metal layer 35B partially overlapping the protective insulating layer 32D are selectively formed.

This selective pattern is formed through removing the Al thin film layer 35 by using the photosensitive organic insulating layer pattern 86A, 86B as a mask, at first. Then the Mo silicide thin film layer 34 and the second amorphous silicon layer 33 between the source/drain wires 12, 21 are removed to expose the protective insulating layer 32D and, simultaneously, the first amorphous silicon layer 31 in some other regions is also removed to expose the gate insulating layer 30. Accordingly, the second amorphous silicon layer 33 is separated and functioning as the K source electrode 33S and the drain electrode 33D.

At this time, as the description of Japanese Unexamined Patent Application Publication 2004-317685, an important characteristic of embodiment 5 is that the photosensitive organic insulating layer pattern 86A, 86B is formed with a thickness of 3 μm, for example, in the forming-region 86A of the data line 12 and with a thickness of 1.5 μm, for example, in the forming-region 86B(21) of the drain electrode 21 and the forming-region 86B(6) of the data line 6 outside the active area by halftone exposure technology. Compared with the prior embodiments in which the source/drain wires 12, 21 are formed by exposure one time and etching two times, the variation factors in the pattern width of the source/drain wires 12, 21, that are formed by exposure one time and etching one time, are reduced in embodiment 5. Therefore, the pattern precisions of the size management of the source/drain wires 12, 21 and the size management between the source/drain wires 12, 21 in embodiment 5 are easy as compared with the conventional halftone exposure technology. In addition, compared the channel etching insulating gate type transistor with the etching-stop insulating gate type transistor, it can be seem that the ON current of the latter is determined by the size of the protective insulating layer 32D or the size between the source/drain wires 12, 21, and the process management of the latter is easier than that of the former.

After forming the source/drain wires 12, 21, the photosensitive organic insulating layer pattern 86A and 86B of 1.5 μm in thickness is eliminated by ashing such as oxygen plasma ashing method and the photosensitive organic insulating layer pattern 86B is removed. As shown in FIG. 9(d) and FIG. 10(d), the drain electrode 21 and part 6 of the data line are exposed, and simultaneously the residual photosensitive resin pattern 86C whose thickness has been reduced is preserved on the data line 12. In the above-mentioned oxygen plasma treatment, when the photosensitive resin pattern 86C is isotropically reduced and making its pattern width finer, the top surface of the data line 12 is exposed, and the reliability of the liquid crystal display device is lowered. Therefore, it is desirable to increase the anisotropy in the oxygen plasma treatment with RIE (reactive ion etching), or TCP (transfer coupled plasma) or ICP (inductive coupled plasma) having a higher density plasma source to control changes in the pattern dimensions.

Afterwards, as embodiment 1, the a photosensitive resin 88 with a counter-taper cross section and of a pattern having openings 38, 63, 64, and 65 in a pixel-electrode-forming-region containing part of the drain wire 21, in part 5 of the scan line 11 outside the active area, in part 6 of the data line 12 outside the active area, and in part of the storage capacity lines 16 is formed, as shown in FIG. 9(e) and FIG. 10(e). The difference between embodiment 5 and embodiments 1 to 4 is that no passivation insulating layer 37 are formed on the glass substrate 2. Part of the drain electrode 21 and part 6 of the data line 12 are exposed in the openings at the time when forming the openings 38 and 64. Accordingly, photosensitive resin pattern 88 are used as the mask to selectively remove the gate insulating layer 30 in the openings 38, 63, 64, and 65, and the glass substrate 2, the part 5 of the scan line 11, and part of the storage capacity line 16 are exposed simultaneously. At this time, as embodiment 2, part of the data line 12 in the opening 64 (i.e. the heat-resistant metal layer 34A under the low-resistance metal layer 35A, the second amorphous silicon layer 33S, the first amorphous silicon layer 31A, and the gate insulating layer 30A in the opening 64), and part of the drain wire 21 in the opening 38 (i.e. the heat-resistant metal layer 34B under the low-resistance metal layer 35B, the second amorphous silicon layer 33D, the first amorphous silicon layer 31A, and the gate insulating layer 30A in the opening 38) are side etched due to over-etching. Accordingly, overhang appears at the peripheries of the low-resistance metal layer 35A and 35B exposed in the openings 64 and 38.

Next, as shown in FIG. 9(f) and FIG. 10(f), the low-resistance metal layer 35A, 35B in the openings 64, 38 are removed to eliminate the overhang and expose the heat-resistant metal layer 34A, 34B under the electrodes.

As the aforementioned description, after exposing the heat-resistant metal layer 34A, 34B in the openings 64, 38, a layer of ITO, IZO, or the mixture thereof functioning as the transparent conductive layer 91 of approximately 0.1 μm in film thickness is deposited on the glass substrate 2 using a vacuum film-depositing equipment such as an SPT, as shown in FIGS. 7(f) and 9(f).

Then, the photosensitive resin pattern 88 is removed by using the resist-stripping solution to lift off the transparent conductive layer 91. Subsequently, as shown in FIG. 9(h) and FIG. 10(h), the pixel electrode 22 in the openings 38 containing a pixel-electrode-forming-region and part of the drain wire 21 made by the heat-resistant metal layer 34B on the glass substrate 2, the electrode terminal 5A of the scan line in the opening 63 containing part 5 of the scan line, the electrode terminal 6A of the data line in the openings 64 containing part of the data line made by the heat-resistant metal layer 34A, and the electrode terminal of the storage capacity line (not labeled with a number) in the opening 65 containing part of the storage capacity line 16 are all self-integrated at the same time, and the gate insulating layer 30A on the glass substrate 2, the protective insulating layer 32D, the photosensitive organic insulating layer pattern 86C, and the drain electrode 21 which has the low-resistance metal layer on its surface are exposed. As a result, a complete active substrate 2 is obtained.

The liquid crystal panel of Embodiment 5 is completed by assembling the active substrate 2 and a color filter 9. In embodiment 5, an important point is that the material of the photosensitive organic insulating layer is not a photosensitive resin mainly containing novolac resin but a photosensitive resin with high impurity and high heat-resistant, which mainly contains acryl resin or polyimide, because the photosensitive organic insulating layer pattern 86C contacts the liquid crystal. Moreover, the material of the photosensitive organic insulating layer becomes flowing while been heated and covers the lateral side of the data line 12 to enhance the reliability of the liquid crystal display device. In this embodiment, the structure of the storage capacity 15 is the same as the embodiment 1. As shown in FIG. 9(d), an structural example of the storage electrode (a diagonal line going up to the right-hand side 50) is formed as the drain wire 21 and the storage capacity line 16 being overlapped on a flat surface through a gate insulating layer 30A, the first amorphous silicon layer 31E, and the second amorphous silicon layer 33E (not shown in the figure). Moreover, as embodiment 2, the insulating layer of the storage capacity 15 is a laminate of the gate insulating layer 31A and the first amorphous silicon layer 31E containing no impurities. However, the thickness of the first amorphous silicon layer disclosed in embodiment 2 is 0.2 μm, and the thickness of the first amorphous silicon layer disclosed in embodiment 5 is 0.05 μm. Therefore, the aperture ratio of the embodiment 5 is smaller than that of the embodiment 2. In addition, the measures against static electricity of this embodiment are the same as embodiment 1.

In embodiment 5, the active substrate can be manufactured through the process of forming the scan line, the process of islanding the semiconductor layer, the process of forming the protective insulating layer, the process of forming the source/drain wires by using halftone exposure technology, and the process of forming the openings and the pixel electrode simultaneously. Therefore, the active substrate can be manufactured with four photomasks, and the manufacturing cost thereof can be reduced. As embodiment 2, the halftone exposure technology is used in this embodiment. However, unlike embodiment 2, the size management of every patterning process allows reaching a common level because of the tolerance of the variation of the pattern size. In addition, the structures of the scan line and the data line can be a laminate of two layers.

As in the disclosure of Patent document 4 (Japanese Unexamined Patent Application Publication 2005-19664), the scan line and the protective insulating layer can be formed by using the halftone exposure technology with one photomask. Accordingly, the steps of manufacturing a active substrate can be reduced as illustrated in embodiment 6.

Embodiment 6

Firstly, a first metal layer, such as Cr as an example of an metal layer with high heat-resistance, of approximately 0.1-0.3 μm in film thickness is deposited on a main surface of a glass substrate 2 using a vacuum film-depositing equipment such as an SPT. Then, as embodiment 3, as the insulating layer formed on the lateral side of the gate insulating layer is an organic insulating layer, the material of the scan line is not resisted. Besides, as the insulating layer formed on the lateral side of the gate insulating layer is an anode-oxidizing layer, the anode-oxidizing layer must has be insulating.

Next, three kinds of thin film layers including a first silicon nitride (SiNx) layer 30 functioning as a gate insulating layer, a first amorphous silicon layer 31 containing no impurities and functioning as the channel of the insulating gate type transistor, and a second amorphous silicon layer 32 containing impurities and functioning as a source/drain electrode of the insulating gate type transistor, are deposited in sequence over the entire surface of the glass substrate 2 by using PCVD equipment with thicknesses of 0.3, 0.2, and 0.05 μm respectively for example. Subsequently, as the disclosure of Patent document 4, a photosensitive resin pattern 81A, 81B with a thickness of 2 μm is formed in the forming region 81A of the protective insulating layer above the gate electrode 11A and with a thickness of 1 μm is formed in the forming region 81B(11) of the scan line 11 and the forming region 81B(16) of the storage capacity line 16 by using halftone exposure technology, as shown in FIG. 11(a) and FIG. 12(a). Then, the protective insulating layer 32, the first amorphous silicon layer 31, the gate insulating layer 30, and the first metal layer are selectively removed by using the photosensitive resin pattern 81A, 81B as a mask to expose the glass substrate 2. While the influence of the width of the scan line 11 on the resistance is minimum, the pattern width is usually 10 μm or more. Thus, the manufacture and the performed size-management of the photomask used to define the region 83B (i.e. the middle-color-tone region or the gray region) become easy.

Next, the photosensitive resin patterns 81A and 81B are reduced in film thickness of 1 μm or more by ashing methods such as oxygen plasma to eliminate the photosensitive resin patterns 81B and expose the second SiNx layer 32A (not shown) and 32B. Simultaneously, photosensitive pattern 83C are leaved exactly because the film in the forming region of a protective insulating layer is thinned. In this embodiment, Since the pattern width of the photosensitive resin pattern 83C (black region), i.e. the forming region of the protective insulating layer, is the total of the distance between the source/drain wires and mask overlaying accuracy, the width would be 10-12 μm when the distance between the source-drain wires is 4-6 μm and the overlaying accuracy is +3 μm. Therefore, this dimension is not very accurate. However, the resist pattern is reduced in thickness isotropically by 1 μm when resist patterns 81A are converted to 81C. Thus, not only the dimension would be 2 μm smaller but also the mask overlaying accuracy during the formation of the source/drain wires would be ±2 μm by reducing 1 μm in accuracy, and effects of the latter is bigger than the former during the process. Therefore, it is preferable to strengthen anisotropy in order to regulate the pattern dimension's changes in the oxygen plasma treatment such as RIE, and furthermore, ICP and TCP that has a plasma source with higher density is preferred. Otherwise, the treatment of increasing the designed-dimension of the resist patterns 81A according the estimation of the changing-amount of the resist-pattern dimension, or of consulting the exposure and developing conditions of corresponding process to increase the pattern-dimension of the resist-pattern is also preferred.

Subsequently, as shown in FIG. 11(b) and FIG. 12(b), the second SiNx layer 32B is etched to form a protective insulating layer 32D by using the reduced photosensitive resin pattern 81C as a mask, and the width of the protective insulating layer 32D is smaller that of the gate electrode 11A. At the same time, the first amorphous silicon layer 31A above the scan line 11 and the first amorphous silicon layer 31B above the storage capacity line 16 are also exposed.

After removing the photosensitive resin pattern 81C, as embodiment 3, an insulating layer 76 (which is labeled as a lateral insulating layer) is formed on the lateral side of the scan line 11 and the storage capacity line 16 (not shown). The anode-oxidizing is done by applying a plus (+) electric potential to the aforementioned electrode lines and immersing the glass substrate 2 in a chemical solution mainly containing ethylene glycol. For example, the electrode line composed of a laminate of Ta and Al alloy can convert to a laminate of tantalum oxide ($Ta_2O_5$) and aluminum oxide ($Al_2O_3$) with 0.3 µm thickness by applying a voltage of 200V. In the condition of electric deposition, a polyimide resin layer of 0.3 µm in thickness is formed by using an electric-deposition solution of polyimide having pendant carboxyl group and applying several voltage. In addition, short occurred between scan line 11, the storage capacity line 16, and the data line 12 can be prevented.

Next, a second amorphous silicon layer containing phosphorous impurities of approximately 0.05 µm in film thickness is formed on the entire surface of the glass substrate 2 by using a PCVD equipment. Then, a heat-resistant metal layer, such as a thin film layer 34 of Mo silicide, of approximately 0.1 µm in film thickness and a low-resistance metal layer, such as a thin film layer 35 of Al, of approximately 0.3 µm in film thickness are deposited by using a vacuum film-depositing equipment such as an SPT. Subsequently, as shown in FIG. 11(c) and FIG. 12(c), through using fine-processing technology with the photosensitive organic insulating layer pattern 86A, 86B as a mask, the data line 12 functioning as the source wire of the insulating gate type transistor composed of a laminate of the second amorphous silicon layer 33S, the heat-resistant metal layer 34A, and the low-resistance metal layer 35A partially overlapping the protective insulating layer 32D, and the drain wire 21 of the insulating gate type transistor composed of a laminate of the second amorphous silicon layer 33D, the heat-resistant metal layer 34B, and the low-resistance metal layer 35B partially overlapping the protective insulating layer 32D are selectively formed.

At this time, as embodiment 5, by using the halftone exposure technology, a photosensitive organic insulating layer pattern 86A, 86B with a thickness of 3 µm, for example, is formed in the forming region 86A of the data line 12 and with a thickness of 1.5 µm, for example, in the forming region 86B(21) of the drain electrode 21 and the forming region 86B(6) of the part 6 of the data line outside the active area.

After forming the source/drain wires 12, 21, the photosensitive organic insulating layer pattern 86A and 86B of 1.5 µm in thickness is eliminated by ashing such as oxygen plasma ashing method and the photosensitive organic insulating layer pattern 86B is removed. As shown in FIG. 11(d) and FIG. 12(d), the drain electrode 21 and the part 6 of the data line are exposed, and simultaneously the photosensitive resin pattern 86C(12) whose thickness has been reduced is preserved on the data line 12.

Next, as shown in FIG. 11(e) and FIG. 12(e), a photosensitive resin 88 with a counter-taper cross section and of a pattern having openings 38, 63, 64, and 65 in a pixel-electrode-forming-region containing part of the drain wire 21, in part 5 of the scan line 11 outside the active area, in part 6 of the data line 12 outside the active area, and in part of the storage capacity lines 16 is formed. Then, the gate insulating layer 30A, 30B in the openings 63, 65 is selectively removed to expose the part 5 of the scan line 11 and part of the storage capacity line 16 by using the photosensitive resin pattern as a mask. From the beginning of forming the openings, part of the drain electrode and the glass substrate 2 are exposed in the opening 38, and the part 6 of the data line 12 and the glass substrate 2 are exposed in the openings 64. At this time, the low-resistance metal layer 35A, 35B is functioning as a mask. Then, the heat-resistant metal layer 34A and the second amorphous silicon 33S under the low-resistance metal layer 35A and the heat-resistant metal layer 34B and the second amorphous silicon 33D under the low-resistance metal layer 35B are side-etched. Accordingly, overhang appears at the peripheries of the low-resistance metal layer 35A and 35B exposed in the openings 64 and 38.

Subsequently, the overhang are eliminated by removing the low-resistance metal layer 35A, 35B in the openings 64, 33, and at the same time, the heat-resistant metal layer 34A, 34B under the aforementioned electrodes is exposed, as shown in FIG. 11(f) and FIG. 12(f).

After exposing the heat-resistant metal layer 34A, 34B in the openings 64, 38, a layer of ITO, IZO, or the mixture thereof functioning as the transparent conductive layer 91 of approximately 0.1 µm in film thickness is deposited on the glass substrate 2 using a vacuum film-depositing equipment such as an SPT, as shown in FIG. 11(g) and FIG. 12(g).

Then, the photosensitive resin pattern 88 is removed by using the resist-stripping solution to lift off the transparent conductive layer 91. Subsequently, as shown in FIG. 11(h) and FIG. 12(h), the pixel electrode 22 in the openings 38 containing a pixel-electrode-forming-region and part of the drain wire 21 made by the heat-resistant metal layer 34B on the glass substrate 2, the electrode terminal 5A of the scan line in the opening 63 containing part 5 of the scan line, the electrode terminal 6A of the data line in the openings 64 containing part of the data line made by the heat-resistant metal layer 34A, and the electrode terminal of the storage capacity line (not labeled with a number) in the opening 65 containing part of the storage capacity line 16 are all self-integrated at the same time, and the gate insulating layer 30A, 30B on the glass substrate 2, the protective insulating layer 32D, the photosensitive organic insulating layer pattern 86C, and the drain electrode 21 which has the low-resistance metal layer on its surface are exposed. As a result, a complete active substrate 2 is obtained.

The liquid crystal panel of Embodiment 6 is completed by assembling the active substrate 2 and a color filter 9. In embodiment 6, the material of the photosensitive organic insulating layer is not a photosensitive resin mainly containing novolac resin but a photosensitive resin with high impurity and high heat-resistant, which mainly contains acryl resin or polyimide due to the reason that the photosensitive organic insulating layer pattern 86C contacts the liquid crystal. In this embodiment, the structure of the storage capacity 15 is the same as embodiment 5. Moreover, as embodiment 3, the aforementioned electrode lines extend to the outer-periphery of the active substrate 2 in order to form the insulating layer on the lateral sides of the scan line 11 and the storage capacity line 16, and the short-circuit line 40 cause short circuit between the outer-periphery of the active substrate 2 and the electrode lines. Therefore, the thin pattern used to connect the electrode terminal 5A of the scan line and the short-circuit line 40 is useless. In this embodiment, the pattern-width of the short-circuit line 40, which is located near the scan line, is reduced to obtain high resistance for measures against static electricity.

In embodiment 6, the active substrate can be manufactured through the process of forming the scan line and the protective insulating layer simultaneously by using halftone exposure technology, the process of forming the source/drain wires by using halftone exposure technology, and the process of forming the openings and the pixel electrode simultaneously. Therefore, the active substrate can be manufactured with three photomasks, and the manufacturing cost thereof can be reduced. In addition, as embodiment 5, the size management of every patterning process allows reaching a common level because of the tolerance of the variation of the pattern size. Moreover, the structures of the scan line and the data line can be a laminate of two layers.

The active substrates disclosed in embodiment 1 to 6, which use transparent and conductive pixel electrode 22 and opposing electrode 14 as their electrode, and these active substrates, are the active substrates of the TN type liquid crystal display device. In the following description, a liquid crystal display device with wide view angle can be obtained by change the pattern of the openings (the pixel electrode) without modifying the manufacturing methods of the active substrate 2 described above.

Embodiment 7

Figure 13:
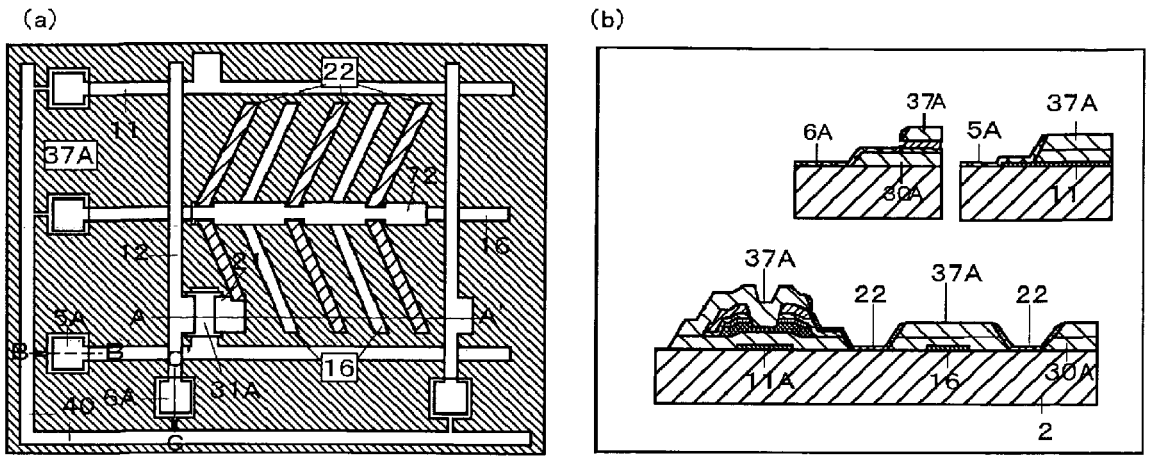
FIG. 13 is a plane view and a cross sectional view of the active substrate according to Embodiment 7 of the present invention.

Unlike the TN type liquid crystal display device, the IPS (In-plane switching)-type liquid crystal display device has an opposed electrode formed on the first transparent insulating substrate and a pixel electrode that is separated from the opposed electrode in a predetermined distance and in pair with the opposed electrode to control the electric field in the horizontal direction. FIG. 13(*a*) and FIG. 13(*b*) show another suitable and basic structure of the active substrate 2 of the present invention. In the pixel, an opposed electrode 16 having zone-shaped branches is simultaneously functioning as the storage capacity line that is formed together with the scan line at the same time. The opposed electrode 16 is separated from the zone-shaped pixel electrode 22 in a predetermined distance. Moreover, the pixel electrode 22 is not necessary to be made of the transparent and conductive ITO or IZO. The pixel electrode 22 can be a metal layer with a thickness of 0.1 μm. However, as the pixel electrode 22 is a metal layer, the short-circuit line 40 used to counter static electricity must be formed by other ways. Furthermore, the color filter 9 of the IPS type liquid crystal display device doesn't comprise an opposing electrode 14. The numeral 72 refers to the storage electrode formed together with the source/drain wires 12, 21. Besides, as embodiment 2, the storage electrode 72 can be formed on the front part of the scan line 11A as the storage capacity 15 comprises the storage capacity line 16 and the insulating layer comprising the gate insulating layer 30A. In this situation, the opposed electrode 16 is mostly called a common electrode because the opposed electrode 16 is not functioning as the storage capacity line. Further, plural zone-shaped pixel electrodes 22 can connect to each other through the storage electrode 72.

The electric potential of each opposed electrode 16 and each pixel electrode 22 are specified. Because the electric field in the horizontal direction controls the liquid crystal molecular, the space between the opposed electrode 16 and the pixel electrode 22 is the region of displaying images. As the aforementioned description, the region of the opposed electrode 16 and the pixel electrode 22 cannot display image even though the opposed electrode 16 and the pixel electrode 22 are transparent conductive layers. Therefore, in IPS liquid crystal display device, the pattern widths of the opposed electrode 16 and the pixel electrode 22 are expected to be as small as possible so that the aperture ratio can be improved. The space between the opposed electrode 16 and the pixel electrode 22 corresponds to the cell thickness (gap) of the TN type liquid crystal display device. However, the main reason to cause bright spot is that the pattern widths of the opposed electrode 16 and the pixel electrode 22 are not uniform. Accordingly, the pattern width, which occurs few fluctuations, is preferred. So far, none of the pattern widths are less than 4 μm.

FIG. 13(*a*) and FIG. 13(*b*) show a device manufactured by the four-photomask process corresponding to embodiment 1. However, it is possible that the array design of this device corresponds to a four-photomask process or a three-photomask process of other embodiments. One of the characters of the IPS-type liquid crystal display device according to the present invention is that the liquid crystal display device is difficult to get built-in. Compared with the gate insulating layer whose forming temperature is low, the passivation insulating layer 37 is irrelative to whether the electric-charges is accumulated due to bad film quality or not. Several years ago, as the TN-type liquid crystal display device (not shown in the figures), the passivation insulating layer functioning as a protective layer is formed entirely on the active substrate of the IPS-type liquid crystal display device. Therefore, burn-in is easily occurred while the liquid crystal display device is operated for a long time or at high temperature, and the liquid crystal display device needs to be tested by etching for a long time and product-inspecting followed for quality control. On the contrary, the IPS-type liquid crystal display devices according to all the embodiments of the present invention don't comprise the insulating layers on the pixel electrodes 22. Thus, in the IPS-type liquid crystal display devices corresponding to the manufacturing processes described in embodiment 1 to 4, the laminate of the passivation insulating layer 37A and the gate insulating layer 30A or 30B is disposed on the opposed electrode 16. In the IPS-type liquid crystal display devices corresponding to the manufacturing processes described in embodiment 5 and 6, only the gate insulating layer 30A or 30B are disposed on the opposed electrode 16. Accordingly, the contribution ratio of the passivation insulating layer 30A is low and the burn-in on the liquid crystal display panel can be prevented. Moreover, the IPS-type liquid crystal display panels comprise no passivation insulating layer 37A. Therefore, the IPS-type liquid crystal display panels do not suffer burn-in theoretically.

In embodiment 7, the gate insulating layer 30A or 30B or a laminate of the passivation insulating layer 37A and the gate insulating layer 30A or 30B is located on the opposed electrode 16 of the IPS-type liquid crystal display device. Hence, short between the opposed electrode 16 and the pixel electrode 22 are difficult to occurred. Moreover, it should be notice that the bright-spots caused by the variation of the distance between the opposed electrode 16 and the pixel electrode 22 because these electrodes are made of different conductive films and formed by using different photomasks.

Embodiment 8

Figure 14:
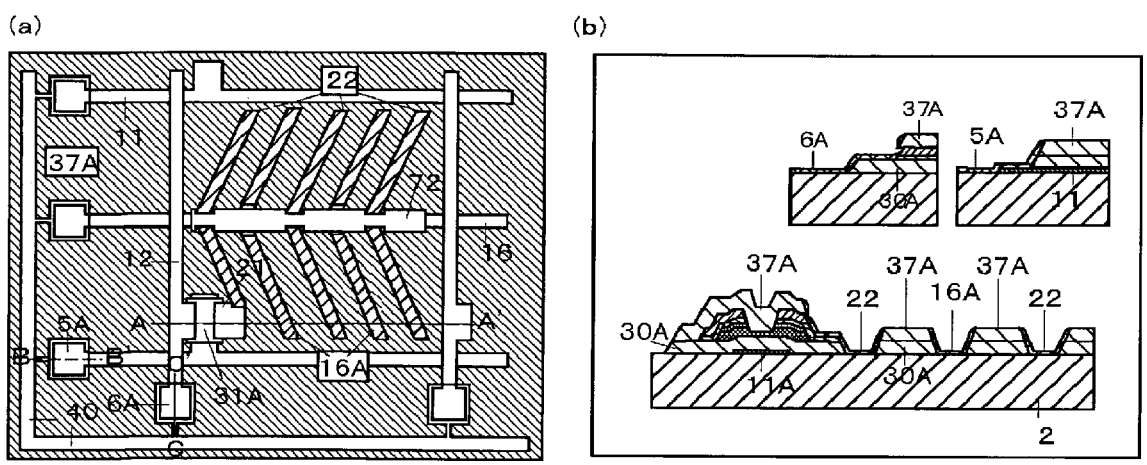
FIG. 14 is a plane view and a cross sectional view of the active substrate according to Embodiment 8 of the present invention.

In addition, the opposed electrode can be formed with other conductive structure different from the storage capacity line. FIG. 14(*a*) and FIG. 14(*b*) shows the active substrate 2 of other IPS-type liquid crystal display panel manufactured by the four-photomask process corresponding to embodiment 1 and the relative description is illustrated in embodiment 8. However, the array designs correspond to the manufacturing processes of embodiment 2 to 6 are also possible. Therefore, this active substrate 2 can be manufactured through the steps of forming openings (not shown in the figure), which are different from the openings 38, 63, 64, and 65, in the opposed-electrode-forming-region that contains partial storage capacity line (i.e. the common line) 16; removing the insulating layer in the openings to expose the storage capacity line 16 and the partial glass substrate; and simultaneously forming the pixel electrode 22 and the opposed electrode 16A in the opposed-electrode-forming-region that contains partial storage capacity line 16. As embodiment 7, the pixel electrode 22 is not necessary to be made of transparent conductive ITO or IZO. In this embodiment, the pixel electrode 22 can be a metal layer with a thickness of about 0.1 μm.

In embodiment 8, there is no level difference between the pixel electrode 22 and the opposed electrode 16A because both of them are located on the glass substrate 2. Therefore, the alignment treatment is easy, and the contrast ratio of the display image is improved. In addition, because there is no insulating layers on the pixel electrode 22 and the opposed electrode 16A, the electric charges will not be accumulated and the burn-in will not occurred.

The opposed electrode 16A and the pixel electrode 22 of the IPS-type liquid crystal display panel according to embodiment 8 are made of same conductive thin film and formed by using same photomask. Unlike the structure of the IPS-type liquid crystal display panel according to embodiment 7, the distances between the opposed electrode 16A and the pixel electrode 22 of this embodiment are nearly the same, and short is easy occurred between these electrodes. Therefore, it should pay attention to the existence of the dusts or the foreign bodies that may cause short or broken between electrodes.

Unlike the LCD device using the TN-type or IPS-type liquid crystal, the LCD device using homeotropic liquid crystal doesn't need to be treated by alignment treatment but need a component functioning as an alignment-regulating mean formed on at least one, preferably two, of the glass substrates that constitute a liquid crystal cell. At the beginning of the development of commercial vertical-alignment-type LCD, the component with a fish-paste cross section, which has a width of 10 μm and a height of about 2 to 3 μm, is made of photosensitive resin and located on the active substrate 2 and color filter 9. This component is given a label of "protrusion". The protrusion's forming processes may affect the manufacturing cost of vertical-alignment-type LCD, and the following development therefore is to increase the components of the active substrate 2 without increasing the quantities of the manufacturing processes of the active substrate 2.

Embodiment 9

Figure 15:
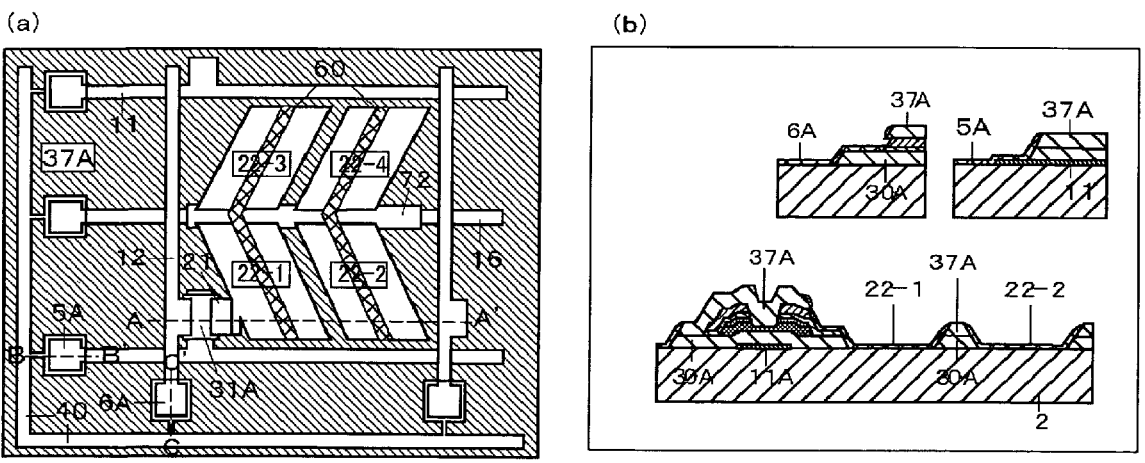
FIG. 15 is a plane view and a cross sectional view of the active substrate according to Embodiment 9 of the present invention.

As the aforementioned description, the pixel electrode is self-integrated and formed in the openings that disposed on the insulating layer of the active substrate. By using the insulating layers that are next to and connect to the pixel electrode to function as the protrusions, an active substrate 2 of a vertical-alignment-type liquid crystal panel corresponding to the four-mask process that is illustrated in embodiment 1 can be obtained, as shown in FIG. 15(*a*) and FIG. 15(*b*). Numeral 72 refers to the storage electrode. The storage electrode 72 and the source/drain wires 12, 21 are formed at the same time. A storage capacity 15 is composed of the storage electrode 72, the storage capacity line (the common electrode) 16, and a insulating layer, that comprises the gate insulating layer, sandwiched therebetween. Moreover, plural zone-shaped, transparent, and conductive pixel electrodes 22-1 to 22-4 are connected to each other by the storage electrode 72. Also, the array-designs correspond to the manufacturing processes according to embodiment 2 to 6 are easy to be achieved. In most circumstance, nearly corresponding to the center part of the pixel electrodes 22-1 to 22-4 that are separated and formed with zone-shapes, plural protrusions 60, which are made of photosensitive resin and have fish-paste cross sections, are formed on the active substrate 2 and the transparent and conductive opposing electrode 14 that is disposed on a main surface of the color filter 9 opposite to the active substrate 2. In addition, the pixel electrodes 22-1 and 22-3 are nearly perpendicular to each other, and so do the pixel electrodes 22-2 and 22-4. Accordingly, while a voltage is applied to the liquid cell, the tilted-direction of the liquid crystal molecules are aligned and divided into four directions, and therefore, the viewing-angle can be increased. Furthermore, as the protrusions 60 are changed, partial opposing electrode 14 can be removed to form slits though strength for regulating alignment is low.

In the structures correspond to the manufacturing processes of embodiment 1, 2, and 4, each fish-paste-shaped protrusion in the gap of the pixel electrodes 22-1 and 22-2 is a laminate composed of the passivation insulating layer 37A and the gate insulating layer 30A, as shown in FIG. 15(*b*). In the structure corresponds to the manufacturing process of embodiment 3, each fish-paste-shaped protrusion is composed of the passivation insulating layer 37A only. In the structure corresponds to the manufacturing process of embodiment 5, each fish-paste-shaped protrusion is composed of the gate insulating layer 30A only. In the structure corresponds to the manufacturing process of embodiment 6, no protrusions but the glass substrate exists in the gap of the pixel electrodes 22-1 and 22-2. In other words, in the structure corresponds to the manufacturing process of embodiment 6, there is no protrusion but a slit of the pixel electrode is located in the gap. Moreover, because the vertical-alignment-type liquid crystal molecules are vertically aligned along the lateral side of the fish-paste-shaped protrusion, the longer the lateral side of the protrusion is (i.e. the larger the height of the protrusion is or the lower the slope of the protrusion is), the larger the strength for regulating the liquid crystal molecules is. Thus, the response speed of the LCD corresponding to the manufacturing process of embodiment 1, 2, and 4 are the fastest, the response speed of the LCD corresponding to the manufacturing process of embodiment 3, and 5 are the next, and the response speed of the LCD corresponding to the manufacturing process of embodiment 6 is the slowest.

Embodiment 10

In the method of manufacturing an active substrate of the present invention, the pixel electrode 22 is integrated and formed in the openings that are located on the insulating layer of the active substrate 2 by lift-off through using the photosensitive resin pattern 88 with a counter-taper cross section. Generally, it is well-known that the cross-sectional shape of the photosensitive resin pattern is changed depending on the film thickness, the pre-baking time, the exposure quantity, and the developing time, which are usually decided by the user and consulting the standard recipes that are recommended by the resist-maker.

In the situation of using the photosensitive resin pattern 88 with a counter-taper cross section, as the angle of the counter-taper is large, the top of the photosensitive resin pattern 88 can effectively functions as a mask and only the forming-region of the transparent conductive layer 91 that disposed in the openings 38, 63, 64, and 65 can be controlled effectively. FIG. 16(*a*) and FIG. 16(*b*) show a plan view drawing and a cross-section view drawing according to embodiment 10, respectively. However, the insulating layer at the periphery of the openings is a laminate of the gate insulating layer and the passivation insulating layer 37A, the gate insulating layer 30A only, or the passivation insulating layer 37A only. Therefore, through considering the thickness of the insulating layer and the angle of the taper formed by dry-etching as forming the openings, the maximum amount that can be controlled is not more than 1 µm. Thus, in the TN-type LCD and the IPS-type LCD, even the dimension of the pixel electrode 22 is controlled with a large extent, the quality of the display image is nearly not been affected.

Nevertheless, in the vertical-alignment-type LCD, the fish-paste-shaped component, which is made of the insulating layer and formed between the pixel electrodes 22-1 and 22-2 and between the pixel electrodes 22-3 and 22-4, is functioning as the protrusions. Therefore, as the pixel electrode is formed on the lateral side of the protrusions and a voltage is applied to the liquid crystal cell to tilt the liquid crystal molecules, it should consider the electric field of the liquid crystal cell that may reversely act on the strength for alignment regulating.

The processes of forming the photosensitive resin patterns 88 shown in FIG. 17(*a*) and FIG. 2(*d*) of embodiment 1 are the same. In the processes of forming the photosensitive resin pattern 88 as shown in FIG. 17(*a*), the photosensitive resin pattern 88 can increase the angle of the counter-taper, that is the cross-sectional shape of the photosensitive resin pattern, by adjusting the pre-baking temperature and time, the exposure conditions, the heat conditions after exposure, or the developing conditions, for example. Thus, as shown in FIG. 17(*b*), a photosensitive resin pattern 88*a* whose cross sectional shape is a counter-taper with a large angle can be obtained. According to the aforementioned reasons and compared with FIG. 18(*a*) and FIG. 18(*b*) which respectively show the pixel electrodes 22-1 and 22-2 obtained through the structures corresponding to FIG. 17(*a*) and FIG. 17(*b*), it is known that the pixel electrode formed on the lateral side of the protrusion, that is a laminate composed of the gate insulating layer 30A and the passivation insulating layer 37A (or the gate insulating layer 30A only, or the passivation insulating layer 37A only) can be prevented. Moreover, due to the large angle of the counter-taper, the thickness of the photosensitive resin pattern 88 can be increased and the pixel electrode formed on the lateral side of the protrusion can be prevented further. In addition, compared with FIG. 15(*a*) and FIG. 16(*a*), it is known that the plan arrangement and the pattern dimension of the active substrates of these two figures are almost the same while the angle of the counter-taper of the photosensitive resin pattern 88 is changed.

In the vertical-alignment-type LCD panel, as the pixel electrode is formed on the lateral side of the protrusion, the strength, which is generated due to the protrusion, for regulating alignment is reduced by the affect of the partial electric field on the periphery of the pixel electrode. Also, the response speed of the liquid crystal panel is reduced. Therefore, corresponding the aforementioned processes of the present invention, the pixel electrode is possible to be formed in the openings only so that the response speed can be improved. This character is not seen in the conventional vertical-alignment-type LCD.

As the aforementioned description, the four-mask process and the three-mask process of the present invention can reduce the manufacturing cost by reducing the manufacturing processes. These processes of the present invention further have the advantages of simplifying the manufacturing management, improving the contrast ratio by easy alignment treatment, or improving the response speed. In addition, regardless of the difference between the TN-type LCD panel, the IPS-type LCD panel, and the vertical-alignment-type LCD panel, the loss from the producing-methods preparation change accompanied with the equipment change can be avoided because the manufacturing processes of the active substrates are still the same. Thus, the production line can be built with large scale for mass production.

What is claimed is:

1. A liquid crystal display device, comprising:
    a first transparent insulating substrate having a main surface which comprises an active area, a pixel-electrode-forming-region in the active area, and a plurality of electrode-terminal-forming-regions outside the active area;
    a gate electrode and at least a gate wire formed on the main surface of the first transparent insulating substrate, wherein the gate wire has an electrode-terminal disposed in one electrode-terminal-forming-region, and the gate wire is disposed in the pixel-electrode-forming-region;
    a gate insulating layer formed over the main surface of the first transparent insulating substrate;
    a semiconductor layer, having a channel, formed on the gate insulating layer above the gate electrode;
    a source wire and a drain wire, formed on the semiconductor layer, comprising a low-resistance metal layer and a heat-resistant metal layer which is selectively removed by an etching gas for etching the gate insulating layer, wherein in the drain wire, part of the heat-resistant metal layer is covered by the low-resistance metal layer and part of the heat-resistant metal layer is covered by a pixel electrode;
    an electrode-terminal disposed in another electrode-terminal-forming-region, formed on the gate insulating layer and electrically connected to the source wire;
    a protective layer, comprising a passivation insulating layer, a protective insulating layer, a photosensitive organic insulating layer, or the combination thereof, disposed over the main surface of the first transparent insulating substrate;
    a plurality of openings formed in the pixel-electrode-forming-region and the electrode-terminal-forming-regions, wherein part of the drain wire formed by the heat-resistant metal layer, part of the first transparent insulating substrate, part of the gate wire, and part of the electrode-terminal are exposed in the openings;
    a pixel unit comprising the pixel electrode formed in the pixel-electrode-forming-region, wherein the pixel electrode is connecting to the drain wire;
    a second transparent insulating substrate opposed to the first transparent insulating substrate; and
    a liquid crystal layer disposed between the first transparent insulating substrate and the second transparent insulating substrate;
    wherein the pixel electrode, the electrode-terminal of the gate wire, and the electrode-terminal of the second source wire are made of the same conductive film.

2. The liquid crystal display device of claim 1, further comprising a first amorphous silicon layer containing no impurity, a second amorphous silicon layer containing impurities, a source electrode, and a drain electrode;

wherein the semiconductor layer comprises the first amorphous silicon layer on the gate insulating layer and above the gate electrode, and the first amorphous silicon layer is formed in an island-shape with a width greater than that of the gate electrode;

the second amorphous silicon layer, simultaneously functioning as the source electrode and the drain electrode, is formed on the first amorphous silicon layer and partially overlaps the gate electrode;

the source wire and the drain wire are formed on the source electrode, the drain electrode, and the gate insulating layer; and the passivation insulating layer is formed on the topmost layer on the first transparent insulating substrate except in the regions where the openings are located.

3. The liquid crystal display device of claim 1, further comprising a first amorphous silicon layer containing no impurity, and a second amorphous silicon layer containing impurities;

wherein the semiconductor layer comprises the first amorphous silicon layer, and the first amorphous silicon layer is formed on a gate insulating layer with a thinner thickness in the region where the channel is located and with a thicker thickness in the region where the first amorphous silicon layer partially overlaps the gate electrode and connects to the region where the channel is located;

the second amorphous silicon layer is formed on the first amorphous silicon layer except in the region where the channel is located;

the source wire and the drain wire are self-integrated with the channel and formed on the second amorphous silicon layer; and the passivation insulating layer is formed on the topmost layer on the first transparent insulating substrate except in the regions where the openings are located.

4. The liquid crystal display device of claim 1, further comprising a source electrode, a drain electrode, a lateral insulating layer different from the gate insulating layer, a first amorphous silicon layer containing no impurity, and a second amorphous silicon layer containing impurities;

wherein the lateral insulating layer is formed on the lateral sides of the gate wire and the gate electrode;

the semiconductor layer, comprising the first amorphous silicon layer on the gate insulating layer and above the gate electrode, is formed in a shape of an island and;

the second amorphous silicon layer, simultaneously functioning as the source electrode and the drain electrode, is formed on the first amorphous silicon layer;

the source wire and the drain wire are formed on the source electrode, the drain electrode, and the first transparent insulating substrate; and the passivation insulating layer is formed on the topmost layer on the first transparent insulating substrate except in the regions where the openings are located.

5. The liquid crystal display device of claim 1, further comprising a source electrode, a drain electrode, and a second amorphous silicon layer containing impurities;

wherein the protective insulating layer is formed on the channel;

the source and the drain wire, partially overlapping the protective insulating layer, comprise the heat-resistant metal layer, the low-resistance metal layer, and the second amorphous silicon layer which simultaneously functioning as the source electrode and the drain electrode; and the passivation insulating layer is formed on the topmost layer on the first transparent insulating substrate except in the regions where the openings are located.

6. The liquid crystal display device of claim 1, further comprising a source electrode, a drain electrode, and a second amorphous silicon layer containing impurities;

wherein the protective insulating layer is formed on the channel;

the source wire and the drain wire, partially overlapping the protective insulating layer, comprise the heat-resistant metal layer, the low-resistance metal layer, and the second amorphous silicon layer which simultaneously functioning as the source electrode and the drain electrode; and the photosensitive organic insulating layer is formed on the second source wire except in the electrode-terminal-regions outside the active area.

7. The liquid crystal display device of claim 1, further comprising a source electrode, a drain electrode, a first amorphous silicon layer containing no impurity, a second amorphous silicon layer containing impurities, and a lateral insulating layer;

wherein the lateral insulating layer, different from the gate insulating layer, is formed on the lateral sides of the gate wire and the gate electrode;

the semiconductor layer comprises the first amorphous silicon layer, and the first amorphous silicon layer is formed in a shape of an island on the gate insulating layer and above the gate electrode;

the protective insulating layer, disposed on the channel, is formed on the first amorphous silicon layer and self-integrated with the gate wire, and the width of the protective insulating layer is less than that of the first amorphous silicon layer;

the source and the drain wire, comprising the heat-resistant metal layer, the low-resistance metal layer, and the second amorphous silicon layer which simultaneously functioning as the source electrode and the drain electrode, are formed on part of the protective insulating layer, the first amorphous silicon layer, and the first transparent insulating substrate; and the photosensitive organic insulating layer is formed on the source wire except in the electrode-terminal-regions outside the active area.

8. The liquid crystal display device of claim 1, further comprising an opposed electrode, wherein the opposed electrode is formed together with the gate wire simultaneously on the first transparent insulating substrate, the pixel electrode is separated from the opposed electrode in a predetermined distance and in pair with the opposed electrodes, and the opposed electrode and the pixel electrode control the electric field in the horizontal direction.

9. The liquid crystal display device of claim 1, further comprising an opposed electrode, wherein the opposed electrode is formed together with the gate wire on the first transparent insulating substrate simultaneously; an opening is formed in the region where the opposed electrode is formed; the gate insulating layer in the opening is removed to expose part of the opposed electrode and the first transparent insulating substrate; and the opposed electrode and the pixel electrode, which are separated from the opposed electrode in a predetermined distance and in pair with the opposed electrodes, control the electric field in the horizontal direction.

10. The liquid crystal display device of claim 1, further comprising a first alignment-regulating component, and a second alignment-regulating component;

wherein the liquid crystal layer is composed of homeotropic liquid crystal that is vertically aligned when no voltage is applied;

the first alignment-regulating component is formed on the first transparent insulating substrate for controlling the alignment direction of the liquid crystal when a voltage is applied to the liquid crystal, and the first alignment-regulating component is located between the pixel electrodes formed in zone-shapes and made of transparent conductive layers on the first transparent insulating substrate;

the second alignment-regulating component is formed on the second transparent insulating substrate for controlling the alignment direction of the liquid crystal when a voltage is applied to the liquid crystal.

11. The method for manufacturing the liquid crystal display device of claim 10, wherein the size of the pixel electrode, formed in the zone-shape, is controlled by a cross-sectional shape of a counter-taper photosensitive resin.

12. A method for manufacturing a liquid crystal display device made by filling liquid crystal between a first transparent insulating substrate and a second transparent insulating substrate opposed to the first transparent insulating substrate or a color filter, which comprises the following steps:

(A) forming a transistor comprises a gate wire, a gate insulating layer, a semiconductor layer, a channel, a source wire, and a drain wire on a main surface of a first transparent insulating substrate, wherein the source wire and the drain wire comprise a low-resistance metal layer and a heat-resistant metal layer that is selectively removed by an etching gas for etching the gate insulating layer wherein the drain wire, part of the heat-resistant metal layer is covered by the low-resistance metal layer and part of the heat-resistant metal layer is covered by a pixel electrode;

(B) forming a passivation insulating layer on the first transparent insulating substrate, and subsequently forming a photosensitive resin pattern, on the passivation insulating, with an counter-taper shape and of a pattern having openings in a pixel-electrode-forming-region inside an active area and a plurality of electrode-terminal-forming-regions outside the active area;

(C) removing the passivation insulating layer and the gate insulating layer in the openings by using the photosensitive resin pattern as a mask, and exposing part of the drain wire, the first transparent insulating substrate, part of the gate wire, and part of the source wire in the openings;

(D) removing the exposed low-resistance metal layer in the openings to expose part of the drain wire and part of the second source wire that made of the heat-resistant metal layer;

(E) forming a conductive film on the first transparent insulating substrate; and (F) removing the photosensitive resin pattern to form a pixel electrode in the pixel-electrode-forming-region, an electrode terminal of the gate wire in one electrode-terminal-forming-region, and an electrode terminal of the source wire in another electrode-terminal-forming-region.

13. The method for manufacturing a liquid crystal display device of claim 12, wherein the transistor in step (A) is formed by the following steps:

(A11) forming the gate wire, the gate insulating layer, and the semiconductor layer with a shape of an island, wherein the semiconductor layer is formed by stacking a first amorphous silicon layer containing no impurity, and a second amorphous silicon layer containing impurities;

(A12) forming the source wire and the drain wire by using a photosensitive resin pattern; and (A13) selectively removing the second amorphous silicon layer between the source wire and the drain wire by using the photosensitive resin pattern, that is used for forming the source and the drain wire, as a mask.

14. The method for manufacturing a liquid crystal display device of claim 12, wherein the transistor in step (A) is formed by the following steps:

(A21) forming the gate wire, the gate insulating layer, a first amorphous silicon layer containing no impurity, a second amorphous silicon layer containing impurities, the heat-resistant metal layer which can be removed by an etching gas for etching the gate insulating layer, and the low-resistance metal layer in sequence;

(A22) forming a photosensitive resin pattern in the region corresponding to the source wire, the drain wire and the channel, wherein the thickness of the photosensitive resin pattern in the region where the channel is located is thinner than that in the region where the source wire and the drain wire are located;

(A23) removing the low-resistance metal layer, the heat-resistant metal layer, the second amorphous silicon layer, and the first amorphous silicon layer by using the photosensitive resin pattern as a mask to expose the gate insulating layer;

(A24) reducing the thickness of the photosensitive resin pattern to expose the low-resistance metal layer in the region where the channel is located; and (A25) removing the low-resistance metal layer, the heat-resistant metal layer, and the second amorphous silicon layer between the source wire and the drain wire by using the photosensitive resin pattern with a reduced thickness as a mask.

15. The method for manufacturing a liquid crystal display device of claim 12, wherein the transistor in step (A) is formed by the following steps:

(A31) forming a metal layer, the gate insulating layer, a first amorphous silicon layer containing no impurity, and a second amorphous silicon layer containing impurities in sequence;

(A32) forming a photosensitive resin pattern in the region corresponding to the semiconductor layer, and the thickness of the photosensitive resin pattern in the region where the semiconductor is formed is greater than that in other regions;

(A33) removing the second amorphous silicon layer, the first amorphous silicon layer, the gate insulating layer, and the metal layer by using the photosensitive resin pattern as a mask to expose the first transparent insulating substrate;

(A34) reducing the thickness of the photosensitive resin pattern to expose the second amorphous silicon layer;

(A35) patterning the second amorphous silicon layer, and the first amorphous silicon layer by using the photosensitive resin pattern with a reduced thickness as a mask, and exposing the gate insulating layer and the lateral side of the gate wire;

(A36) forming a lateral insulating layer different from the gate insulating layer on the exposed lateral side of the gate wire;

(A37) forming the source wire and the drain wire, comprising the heat-resistant metal layer that can be removed by an etching gas for etching an insulating layer and the low-resistance metal layer, by using a photosensitive resin pattern as a mask; and (A38) removing the second amorphous silicon layer between the source wire and the drain wire by using the photosensitive resin pattern, used for forming the source wire and the drain wire, as a mask.

16. The method for manufacturing a liquid crystal display device made by filling liquid crystal between a first transparent insulating substrate and a second transparent insulating substrate opposed to the first transparent insulating substrate, which comprises the following steps:

(A) forming a transistor comprising a gate wire, a gate insulating layer, a semiconductor layer, and a protective insulating layer on a main surface of a first transparent insulating substrate;

(B) forming a second amorphous silicon layer containing impurities, a heat-resistant metal layer which is selectively removed by an etching gas for etching the gate insulating layer, and a low-resistance metal layer;

(C) patterning the second amorphous silicon layer, the heat-resistant metal layer, and a low-resistance metal layer to form a source wire and a drain wire;

(D) forming an insulating layer for protecting at least the source wire in an active area;

(E) forming a photosensitive resin pattern, on the first transparent insulating substrate, with an counter-taper shape and of a pattern having openings in a pixel-electrode-forming-region inside the active area, and in a plurality of electrode-terminal-forming-regions outside the active area;

(F) removing the gate insulating layer in the openings by using the photosensitive resin pattern as a mask, and exposing part of the drain wire, part of the first transparent insulating substrate, part of the gate wire, and part of the source wire in the openings;

(G) removing the exposed low-resistance metal layer in the openings to expose part of the drain wire and part of the source wire that are made of the heat-resistant metal layer;

(H) forming a conductive film on the first transparent insulating substrate; and (I) removing the photosensitive resin pattern to form a pixel electrode in a pixel-electrode-forming-region, an electrode terminal of the gate wire in one electrode-terminal-forming-region, and an electrode terminal of the source wire in another electrode-terminal-forming-region.

17. The method for manufacturing a liquid crystal display device of claim 16, the transistor in step (A) is formed by the following steps:

(A11) forming the gate wire, the gate insulating layer, a first amorphous silicon layer containing no impurity, and the protective insulating layer for protecting a channel;

(A12) retaining the protective insulating layer on a gate electrode with a width less than the width of the gate electrode, and exposing the first amorphous silicon layer; and (A13) forming the passivation insulating layer, functioning as the insulating layer for protecting the gate wire, on the first transparent insulating substrate.

18. The method for manufacturing a liquid crystal display device of claim 16, the transistor in step (A) is formed by the following steps:

(A21) forming the gate wire, the gate insulating layer, a first amorphous silicon layer containing no impurity, and the protective insulating layer for protecting a channel;

(A22) retaining the protective insulating layer on a gate electrode with a width less than the width of the gate electrode, and exposing the first amorphous silicon layer;

(A23) forming a photosensitive organic insulating layer pattern, functioning as the insulating layer for protecting the source wire and the drain wire, wherein the thickness of the photosensitive organic insulating layer pattern in the region, uncovering the semiconductor layer, is thinner than that in the region covering the semiconductor layer;

(A24) removing the low-resistance metal layer, the heat-resistant metal layer, the first amorphous silicon layer, and the second amorphous silicon layer by using the photosensitive organic insulating layer pattern as a mask to expose the gate insulating layer, and the protective insulating layer; and (A25) reducing the thickness of the photosensitive organic insulating layer pattern to expose the drain wire, and part of the source wire.

19. The method for manufacturing a liquid crystal display device of claim 16, wherein the transistor in step (A) is formed by the following steps:

(A31) forming a metal layer, the gate insulating layer, a first amorphous silicon layer containing no impurities, and the protective insulating layer for protecting the channel;

(A32) forming the photosensitive resin pattern in the region corresponding to the gate wire and the protective insulating layer, wherein the thickness of the photosensitive resin in the region where the gate wire is located is thinner than that in the region where the protective insulating layer is located;

(A33) removing the protective insulating layer, the first amorphous silicon layer containing no impurities, the gate insulating layer, and the metal layer by using the photosensitive resin pattern as a mask to expose the first transparent insulating substrate;

(A34) reducing the thickness of the photosensitive resin pattern to expose the protective insulating layer;

(A35) retaining the protective insulating layer on a gate electrode with a width less than the width of the gate electrode by using the photosensitive resin pattern with a reduced thickness as a mask, and exposing the first amorphous silicon layer and the lateral sides of the gate wire;

(A36) forming a lateral insulating layer different from the gate insulating layer on the expose lateral sides of the gate wire;

(A37) forming a photosensitive organic insulating layer pattern, functioning as an insulating layer for protecting the source wire and the drain wire, wherein the thickness of the photosensitive organic insulating layer pattern in the region, uncovering the semiconductor layer, is thinner than that in the region covering the semiconductor layer;

(A38) removing the low-resistance metal layer, the heat-resistant metal layer, the second amorphous silicon layer, and the first amorphous silicon layer by using the photosensitive organic insulating layer pattern as a mask to expose the gate insulating layer, and the protective insulating layer; and (A39) reducing the thickness of the photosensitive organic insulating layer pattern to expose the drain wire, and part of the source wire.

* * * * *